(12) United States Patent
Lof et al.

(10) Patent No.: US 6,671,585 B2
(45) Date of Patent: Dec. 30, 2003

(54) SYSTEM, METHOD AND COMPUTER PROGRAM PRODUCT FOR ENHANCING COMMERCIAL VALUE OF ELECTRICAL POWER PRODUCED FROM A RENEWABLE ENERGY POWER PRODUCTION FACILITY

(75) Inventors: Per-Anders Kristian Lof, Vallingby (SE); Lars Gustaf Ingolf Gertmar, Vasteras (SE); Lars Anders Tommy Andren, Orsundsbro (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/326,130

(22) Filed: Dec. 23, 2002

(65) Prior Publication Data

US 2003/0126060 A1 Jul. 3, 2003

Related U.S. Application Data

(62) Division of application No. 09/839,220, filed on Apr. 23, 2001, now Pat. No. 6,512,966, which is a division of application No. 09/749,999, filed on Dec. 29, 2000.

(51) Int. Cl.⁷ .............................. G05D 5/00; G05D 9/00; G06F 17/60; G06F 17/00

(52) U.S. Cl. ............................ 700/291; 705/36; 705/37; 705/412

(58) Field of Search ................................. 700/286, 291; 705/35, 36, 37, 412

(56) References Cited

U.S. PATENT DOCUMENTS

| | | |
|---|---|---|
| 4,400,659 A | 8/1983 | Barron et al. |
| 4,556,801 A | 12/1985 | Gervasio et al. |
| 6,320,272 B1 | 11/2001 | Lading et al. |

FOREIGN PATENT DOCUMENTS

WO WO 01/77525 10/2001

OTHER PUBLICATIONS

Non–controllable production in the Nordel System (full translation), The Nordel Annual Meeting 2000, The Nordel Network Group, May 2000.

(List continued on next page.)

*Primary Examiner*—Albert W. Paladini
*Assistant Examiner*—Ryan Jarrett
(74) *Attorney, Agent, or Firm*—Oblon, Spivak, McClelland, Maier & Neustadt, P.C.

(57) ABSTRACT

A method, system and computer program product enhance the commercial value of electrical power produced from a wind turbine production facility. Features include the use of a premier power conversion device that provides an alternative source of power for supplementing an output power of the wind turbine generation facility when lull periods for wind speed appear. The invention includes a communications infrastructure and coordination mechanism for establishing a relationship with another power production facility such that when excess electrical power is produced by the wind turbine facility, the excess may be provided to the power grid while the other energy production facility cuts back on its output production by a corresponding amount. A tracking mechanism keeps track of the amount of potential energy that was not expended at the other facility and places this amount in a virtual energy storage account, for the benefit of the wind turbine facility. When, the wind turbine power production facility experiences a shortfall in its power production output it may make a request to the other source of electric power, and request that an increase its power output on behalf of the wind turbine facility. This substitution of one power production facility for another is referred to herein as a virtual energy storage mechanism. Furthermore, another feature of the present invention is the use of a renewal power exchange mechanism that creates a market for trading renewable units of power, which have been converted into "premier power" and/or "guaranteed" by secondary sources of power source to provide a reliable source of power to the power grid as required by contract.

5 Claims, 34 Drawing Sheets

OTHER PUBLICATIONS

Implementing Short–term Prediction at Utilities, L. Landberg et al, Final Report to the European Commission, Jan. 1996 to Dec. 1998, pp. 1–16.

Implementation of Short–Term Prediction, L. Landberg et al, 1999 European Wind Energy Conference, Mar. 1–5, 1999, pp. 57–62.

Short–Term Winding Forecast, Development and Application of a Mesoscale Model, Bruce Bailey et al, 1999 European Wind Energy Conference, Mar. 1–5, 1999, pp. 1062–1065.

Investigation of the Effects of Wind Speed Forecasts and Economic Evaluation of the Increased Penetration of Wind Energy for the Island of Crete, E. Akylas et al, 1999 European Wind Energy Conference, Mar. 1–5, 1999, pp. 1074–1077.

Advanced Short–Term Forecasting of Wind Power Production, G. Kariniotakis et al, European Wind Energy Conference, Oct. 1997, pp. 751–754.

Statistical Methods for Predicting Wind Power, Torben Skov Nielsen et al, European Wind Energy Conference, Oct., 1997, pp. 755–758.

Experiences with Statistical Methods for Wind Power Prediction, T. S. Nielsen, et al, 1999 European Wind Energy Conference, Mar. 1–5, 1999, pp. 1066–1069.

Short Term Prediction of Wind Speed and Power Output for a Wind Turbine with Neural Networks, H. G. Beyer et al, 1994 European Wind Energy Association Conference and Exhibition, Oct. 10–14, 1994, pp. 349–352.

Can Wind Power Be Sold in a Deregulated Electricity Market?, Bent Sorensen et al, 1999 European Wind Energy Conference, Mar. 1–5, 1999, pp. 375–378.

Growth Potentials of Wind Power in a Liberalized Energy Market, Dr. Ferdinand Lutz et al, 1999 European Wind Energy Conference, Mar. 1–5, 1999, pp. 508–511.

| Wind Turbine ID | Quantity of Produced Power | Time Period | Statistical Indicator |
|---|---|---|---|

FIG. 12

| Power Unit ID | Quantity of Produced Power | Time Period | Offer Price |
|---|---|---|---|

FIG. 13

| Power Unit ID | Quantity of Produced Power | Time Period | Bid Price |
|---|---|---|---|

FIG. 14

| Guaranteed Power Unit ID | Quantity of Produced Power | Time Period | Price |

FIG. 15

| Guaranteed Power Unit ID | Quantity of Delivered Power | Confirmation of Delivery |

FIG. 16

| Amount by which output voltage is below threshold | Corresponding tap setting on voltage compensation mechanism |

FIG. 17

| Wind Turbine ID | Quantity of Produced Power | Time Period |

FIG. 18

SYSTEM, METHOD AND COMPUTER PROGRAM PRODUCT FOR ENHANCING COMMERCIAL VALUE OF ELECTRICAL POWER PRODUCED FROM A RENEWABLE ENERGY POWER PRODUCTION FACILITY

This application is a Division of application Ser. No. 09/839,220 Filed on Apr. 23, 2001, now U.S. Pat. No. 6,512,966 which is a divisional of application Ser. No. 09/749,999, filed Dec. 29, 2000.

BACKGROUND OF THE INVENTION

1. Field of the Invention

The present invention is directed to a system, method and computer program product that relates to a renewable power production facility, such as a wind turbine generated power production facility that produces electrical power that is applied to a power grid. More specifically, the present invention is directed to systems, methods and computer program product for enhancing the commercial value of electric power produced by wind turbine facilities so as to make that electric power as commercially valuable and fungible as electric power produced by other plants such as fossil fuel power plants, hydroelectric plants, nuclear plants and the like.

2. Discussion of the Background

Wind power is a "natural" power production source that instinctively should be regarded as an optimum source of energy for producing electric power. Wind power does not require the burning of fossil fuels, does not result in nuclear waste by-products, does not require the channeling of water sources, and does not otherwise disturb the environment. On the other hand, wind power is a variable (stochastic) power generation source, thus not offering power production facilities the type of control that the power production and grid facility would like to have in producing commercially reliable power. To address this variability issue, even the early pioneers of wind power attempted to identify ways to "store" wind generated electric power in times of excess, so as to later compensate for times when there are lulls in the wind. For example, Poul La Cour (1846–1908) from Denmark, was one of the early pioneers in wind generated electricity. Poul La Cour built the world's first electricity generating wind turbine in 1891. This design included DC generators and stored energy as hydrogen. Poul La Cour was concerned with the storage of energy because he used the electricity from his wind turbines for electrolysis in order to produce hydrogen for the gas lights in his school. This concept of energy storage has not been abandoned and even modern inventors of wind turbine electric generation facilities are still trying to identify ways to use physical media to store the energy produced by windmills (see e.g., U.S. Pat. No. 5,225,712, which uses fuel cells, batteries, and the like as physical media to store electrical power). In the early days, wind energy plants were generally isolated from one another and provided small scale generation facilities. Through a variety of experiments wind energy plants have generally evolved and now a common theme is to group a number of wind turbines together so as to form farms that can generate up to tens of megawatts via the aggregation of smaller plants that produce slightly above only one megawatt each. Most modern rotor blades on large wind turbines are made of glass fiber reinforced plastics (GRP). These wind power plants are today planned to grow slightly above three megawatts per unit, limited by a reliable size of the wind turbine, (the "propeller").

A perplexing task that has somewhat stifled the use of wind power plants is that there has been no commercially viable way, in light of the price of fuel generated by other power plants, to effectively store electricity generated by windmills during periods of peak production, so as to make up for periods when the wind slows. As a consequence, the capital cost, lack of production control, size, and reliability problems limited the proliferation of such wind plants between the periods of 1890 and 1970. As a consequence, the use of wind power declined sharply both with the spread of steam-engines and with the increase in scale of electrical power utilization. Thus, windmills generally were only limited for small scale processes and were unable to compete with large scale steam powered electrical power facilities. Furthermore, the commercial cost of such wind-generated power was much greater compared to those with generating systems based on coal, oil, gas and hydro.

Nevertheless, being strong advocate for windmills, Denmark pioneered the effort between the era of 1970 and 1985 to bring back windmill technology in an attempt to make windmill generated electricity a mainstay of modern electric generation plants. To this end, Denmark established some rules regarding grid connections from the windmills, (e.g., Specifications for Connecting Wind Farms to the Transmission Network", ELTRA I/S ELT 1999-411a., as well as Swedish documents TAMP-1122400 and DAMP-1101300, Sv. Elverksforeningen, the entire contents of which being incorporated herein by reference).

As recognized by the present inventors, there are several drawbacks associated with using wind power systems. First, it should be recognized that there is a strict frequency control on the AC power that is provided to the grid. For example, in the power grid in Europe, the AC frequency is held generally constant at 50 hertz, with an attempt to maintain a maximum frequency variation between plus or minus 0.1 hertz. This means that there must be a continuous balance between the input of energy and the output of electrical power in such an AC system. If consumption is greater than production, the grid frequency drops. If production is greater than consumption, the grid frequency rises. Thus, power companies that provide power to the electric grid must be coordinated so that those adding power are doing so at a time when the demand for that power exists, and also is done in coordination with other providers. While there is a system that is employed to coordinate the activities of different power producers as will be discussed with respect to FIGS. 2–4, the present discussion will now focus on conventional wind turbine electrical power production facilities so as to further explain conventional practice for how to design such facilities.

A number of different options have been attempted to make wind turbine generated power facilities more reliable and predictable, thus "more mainstream" as compared to other power production facilities. In a first typical windmill power generation facility, an asynchronous machine is used that acts as a generator but also inherently consumes reactive power from the AC grid. Consequently, the facility employs a fixed capacitor bank so as to compensate the amount of reactive power that is consumed, thus providing for a more reasonable power factor (cosine of the angle between current and voltage). However, as recognized by the present inventors, there is a risk with such systems, namely where the capacitor bank causes the system to become self-magnetized thus causing the frequency to differ by as much as tens of hertz from the standard oscillation frequency after a fault occurs.

Many wind power plants are erected with a speed adaptation mechanism (usually a gearbox) between the wind turbine and the electric generator so that an AC frequency produced by the wind turbine generator matches that of the power grid. These systems use a mechanical gearbox to increase the speed of the generator shaft. However, the use of this mechanical gearbox increases the cost by three to five times the cost of the generator, also having dramatic increases in the mean time between failure, and mean time to repair of the device, thus not making these designs commercially competitive with the more reliable and less costly fossil fuel power production facilities.

Some windmill-based systems attempt to address power quality aspects at the grid connection, which often manifest themselves as a tower shadow that provides a low-frequency periodic disturbance. This low-frequency periodic disturbance is referred to as "flicker" (e.g. about a 1 hertz variation) that provides for an inconsistent wavering light or power production. These facilities provide static-VAR compensators (SVC) or local energy storage units to provide compensation power.

More elaborate schemes have been developed to make wind-power more competitive with other types of power in the market. Once again the systems are based on the use of energy storage. FIG. 1 is an example of such a system. As seen in FIG. 1, a turbine blade 12 turns at a rate related to wind speed. Some control may be asserted by adjusting the pitch of the blades, as well as by providing an amount of torque adjustment to control the generator by way of generator controllers and active rectifiers. Notably, the system in FIG. 1 can be divided into three components. The first component is between the turbine and the output of the active rectifiers (Rectifier A and Rectifier B). The second component is the DC link between the output of the active rectifiers and the inverters. The last part of the link is between the inverters and the utility grid. The function of the first part of the system (i.e. between the blade 12 and the active rectifier) is to convert the wind into variable speed electrical power, and then rectify that variable frequency AC into a DC voltage. Thus, the output of the first part is a DC voltage that is coupled onto a DC line (see e.g. the line disposed between the active rectifier and the inverter). This DC line then passes this frequency independent electrical power to a location in which an inverter is maintained. At the inverter, an inverter controller 50, 52 is used to produce pulse width modulation (PWM) signals so as to actuate switches within respective inverters thus generating output signals at any particular AC frequency, namely the grid's frequency. A power factor controller may be used to control how the waveform is generated so that the output waveform has a power factor that is consistent with requirements placed on that particular windmill.

Reactive power is important to the operation of an AC power grid. As discussed in U.S. Pat. No. 4,941,079, the contents of which being incorporated herein by reference, some of the advantages are explained. In all AC generator stations of the power utilities, such control is typically achieved through a speed governor and a field excitation regulator. The PWM converter is not encumbered by the long time constants associated with the speed governors and with the generator field inductance. For this reason, the PWM converter is expected to surpass the performance of the AC generator station in providing dynamic enhancement in the utility system. Thus, the general state of the art suggests that the use of power electronics, such as pulse width modulation-based (PWM) converters, provides reactive power control separate from active power control. However, as recognized by the present inventors, rotating electric machines, like generators and compensators, possess not only an ability to control reactive power, but also an overload capability which is superior to all types of power electronics systems, especially PWM IGBT (Insulated Gate Bipolar Transistor), with very limited overload capability. Furthermore, rotating electric machines are able to control the amount of reactive or active power seen from a power source connected to the machine. The primary control of the reactive power is achieved by an automatic voltage regulator (AVR), which controls the magnitude of the output voltage waveform and thereby can control the magnitude of the terminal voltage at the machine. The corresponding control of the active power is achieved by the automatic load-frequency control (ALFC) loop, which uses the frequency as an indirect measure of the active power balance in the grid.

In an improvement to the system shown in FIG. 1, U.S. Pat. No. 5,225,712 describes the use of energy storage devices, based on hydrogen and fuel cells, electrochemical accumulator batteries or the like as a substitute to the capacitors placed on the DC line between the active rectifiers and the inverters shown in FIG. 1. However, as recognized by the present inventors, such devices have a very high cost per kWh compared to the sales price and are sometimes used at the DC voltage link so as to balance power fluctuations as a result of wind gusts and wind lulls.

Recently there have been a number of wind power plants that have been erected at wind farms with constant-speed and/or variable-speed units connected to the same point in the electric power distribution grid. These systems, simplify the power quality issues like the remedial use of static-VAR compensators, discussed above, as well as simplifying maintenance and operation. The present inventors recognize that such connections have not simplified the power grid starting procedures, maintenance, fault handling based on large-short-circuit power, etc. With regard to fault handling, it is noted that grid operators require, desirably, the ability of a power plant to produce high short-circuit power conditions so that there is sufficient electrical current available to trip circuit breakers on the transmission grid, should a fault be detected. One of the problems with conventional wind power plants is that they do not possess this capability, thereby creating a potential hazard for devices that are connected to the grid.

The discussion up to this point has been focused on different techniques that have been attempted in wind power plant facilities to adapt the electricity generated from wind power to make the power suitable for application onto transnational, national, or regional power grids. However, as recognized by the present inventors, there is yet another shortcoming besides simply the application of the power to the power grids, namely the commercial viability and scalability of the electricity generated from wind power as an economic competitor with other types of electric power. In order to appreciate the limitations with wind generated electric power, a discussion of how other types of power is handled is in order. The present discussion will be directed primarily to that in Scandinavian countries, although it is equally applicable in other countries and regions where electric power deregulation has been instituted. Many of these topics are addressed in "The Swedish Electricity Market and the Role of Svenska Kraftnat", published by Svenska Kraftnat, the National Swedish Grid Company, 1999, available at www.svk.se.

As seen in FIG. 2, electricity producers generate power and feed it into a network, either a national grid, regional network or local network. Network owners are responsible for transmitting the electrical power from the producer to the consumer. Consumers, which include everything from industries to households, take electricity from the electricity networks and consume it. Each consumer must have an agreement with an electricity trader to be able to buy electricity. The power trading company is in contact with its consumers and sells electricity to them. The power trader can have the role of electricity supplier and/or balance provider, both roles can exist within the same or different companies. The electricity supplier has the supply agreement with the consumer. The balance provider is financially responsible for the electricity that the trader sells always being in a state of balance with the electricity purchased so as to cover consumption. The balance providers provide "fine tuning" needed so as to make sure that the amount of power provided to the network matches the particular load at any given time, otherwise the grid frequency will vary. There are organized marketplaces, such as for example, power exchange Nord Pool, as well as brokers, that make standard agreements that make it easier for the participants in the power market to do their business with one another. The bulk of the trade in electricity on the market takes place via bilateral agreements between electricity producers and electricity traders.

FIG. 3 shows the contract network and daily flow of information between participants in the electricity market, which in the present example is Sweden. Grid customers (about 30) include electricity producers and regional network operators. Balance providers (about 50) are electricity suppliers that provide information regarding their operations to the balance authority and system operator. Included in this information is market information provided by the Nord Pool trading center, which is also exchanged between the balance providers and Nord Pool itself. The system operator also has balance obligation agreement settlement information which is exchanged between the balance provider and system operators. Based on system operator instruction, the balance providers provide up-to-date control over the amount of electrical energy (characterized in a short fall or surplus), that is applied to the grid based on load variations and other contracts that have been executed for power delivery to the grid. Furthermore, network owners total-up the measured production and consumption values each hour on their networks as well as for the balance providers that exist on the networks. The totals are then reported to the system operator as a balance settlement and to the balance providers.

As is clear from the detailed communications that exist between the different entities in FIG. 3, the operation of the grid must be planned. As a consequence, the system operator requires that balance providers submit under a balance obligation agreement, different required information. Among other things, this information includes production plans and load forecasts every evening prior to the coming delivery day, and when required update this information on a continuing basis. Using this data then, the system operator can estimate the load and assess whether bottlenecks may arise on the network. The system operator is also in regular contact with the control centers of electricity producers, regional and local network owners and system operators of the other Nordic countries. In order to coordinate information, the different system operators have agreed to distribute important information about the grid and balance services via Nord Pool's website, www.nordpool.com. This information includes historical information regarding the total reported production per country per hour, the total calculated consumption per country per hour, measured power exchanges between countries' systems per hour, available transmission capacity per hour, price and volume of trade and regulating power per country and per hour, as well as plans and information in real time, which includes network disruptions that have occurred which are of significance to the market, and other types of faults.

With regard to most of the power delivery, electricity power options are traded as part of a Nordic power exchange futures market. The combined use of electric power options and forward and future power contracts offers greater opportunity for spreading and handling of risk in power trading. A notable feature in how trading is performed, is that Nord Pool's electric power options are standardized and thus carry a number of fixed terms and conditions. For example, the forward contracts are based on two seasonal contracts and two year contracts. A new series is listed on the first trading day of the exercise day of the previous contract series. The exercise day is the third Thursday of the month before the first delivery month of the underlying instrument. Details of how the power exchange is performed is described in the document "Eloption", May 1, 1999, available from www.nordpool.com, the entire contents of which being incorporated herein by reference.

What is notable however, as recognized by the present inventors, is that electricity from wind power, and the limitation within a wind-variable system, is not well suited with the current state-of-the-art systems for providing power to the power grid. For example, the risk is high to a wind turbine provider for entering into a forward contract, given the stochastic nature of wind power, and thus the stochastic nature of a wind turbine as a power generation source, that could be expected to be generated by that provider at the time of delivery. While wind powered systems that employ physical assets as part of the system for providing actual energy storage present one potential solution. The inherent expense of such systems makes the opportunity to offer power during periods of low wind speed very expensive since the wind power operator needs to purchase the physical assets for storing the electrical power.

Aside from providing long term planning, there is also short-term balance requirements that may be placed on system operators for filling gaps or short falls in expected power demands or load variations. A time table for trading imbalance is shown in FIG. 4 which describes the dynamic nature of how balance regulation is performed. Balance providers and other participants can trade in electricity in order to plan their physical balances right up until just before delivery hour. By physical balance, it is meant that the production and purchasing are in balance with consumption and sale. Trading can take place on the spot market of the power exchange Nord Pool, which closes at noon the day before delivery. Alternatively, trading in electricity can take place on the adjustment market of the EL-EX power exchange from 3:00 on the day before up until two hours prior to delivery, or bilaterally. The system operator and balance regulator, regularly accepts bids (volume in power in MW) from producers who are willing to quickly (within 10 minutes at the outside) increase or decrease their level of production. Consumers, too, can submit bids for increasing or decreasing their level of consumption (known as load shedding). Balance settlement is performed at noon the day after delivery.

As recognized by the present inventors, a limitation with conventional wind power systems is that unless there is some physical media for storing the electrical power at the local generation facility, conventional systems cannot reliably perform in either the balance regulation or the longer term Nord Pool exchange, due to variability of the wind power. This concept is reflected in the article by Lennart S öder "The Operation Value of Wind Power in the Deregulated Swedish Market", Royal Institute of Technology, Sweden, Nordic Wind Power Conference 13-14, March 2000, page 5, paragraph 4.1.3, where it is explained that for wind power the construction of the exchange makes it difficult to put bids. The bids on Nord Pool have to be put 12 to 36 hours in advance of real delivery. Lennart Söder states that this makes it in reality nearly impossible to trade wind power bids since the forecasts normally are too bad for this time. Thus, wind power is generally recognized as a environmentally friendly type of power, however not as commercially valuable or fungible as other types of electricity such as that generated by fossil fuels.

To further emphasize this point, an article by Ackermann, T., et al. "Wind Energy Technology and Current Status: A Review", Renewable and Sustainable Energy Reviews, Paragammon Press, April 2000, pages 317–366, the entire contents of which being incorporated herein by reference, shows in FIG. 8 thereof (page 347) the probability of a change in power output as a percent of installed capacity. This analysis shows that with a probability of 30% the hourly mean wind power output from one hour to the next would be plus or minus 1% of the installed capacity, plus or minus 4% from one four hourly mean to the next and plus or minus 12% between the 12 hourly means. The largest change in power output to be expected between hourly mean power output values is about 40% of installed capacity. Long-term variations in wind speed, between one year and the next are usually quite low, as observed in this study. Thus, while short-term variations (within the 12-hour period) may be substantial, over the long haul (a year or more), the data appears to indicate that relatively small annual variations will occur. This is recognized by the present inventors as an issue of predictability, which would make wind power a viable asset in the Nord Pool exchanges provided there is a cost effective mechanism for storing energy that may later be released on demand to generate electrical power.

SUMMARY OF THE INVENTION

The present description of the invention is not intended to be limited to the discussion in the following few paragraphs in this section, but rather is a synopsis of selected facets of the present invention. For a more complete understanding of the present invention should be construed in light of this entire document. Nevertheless, an object of the present invention is to address the above-identified and other shortcomings of conventional systems and apparatuses using wind turbine technology.

Another feature of the present invention is to provide a system, method, and computer program product that convert electrical power generated from wind into premier power. In one embodiment, the premier power is ensured by a virtual energy storage mechanism. In another embodiment, or as a supplement to the first embodiment, an xM machine is employed as part of a co-active converter to ensure steady, fixed frequency power is reliably applied to the power grid.

Another feature of the present invention is to provide a system, method and computer program product for controlling communications between a wind power based electricity production facility and a virtual energy storage facility, so that excess electrical power produced by the wind power facility may be captured at the virtual energy storage facility by way of time-effective communication between the two facilities. The virtual energy storage facility may be used to generate electricity to compensate for periods when wind speed decreases.

Another feature of the present invention is to convert wind power into premier power so that wind power-based units of electrical power may be available for forward contracts as part of a "renewable exchange" that enables the transfer of wind power units (i.e., a predetermined amount of power), perhaps coupled or guaranteed power produced by other energy production facilities, so that electricity generated from wind power may also become a "fungible" source of electric power.

Another feature of the present invention is to incorporate a meteorological sensing and prediction mechanism so as to facilitate communications with a virtual energy storage facility so that the wind power may be reliably supplemented with energy either stored or released from a virtual energy storage facility.

A further feature of the present invention is the incorporation of a "co-active converter" that is able to provide substation short circuit power so as to have sufficient fault current to blow fuses or to operate circuit breakers as necessary to protect components connected to the grid when installation faults occur in the network.

A further feature of the present invention is the use of a co-active converter in connection with a number of different wind farms instead of just one co-active converter per wind production facility.

A further feature of the present invention is the use of a co-active converter as a mechanism for providing reactive power without relying solely on power electronics for providing reactive power.

Another feature of the present invention, in at least one embodiment, is to include a co-active converter at a wind power production facility where the co-active converter includes at least a static converter and a rotating converter, both device being able to withstand DC voltage stress.

Another object of the present invention is to include a prime mover that may be driven by vegetable oil, diesel, gas or the like to the shaft of the rotating converter in a co-active converter so as to carry out startup procedures if the power grid is completely down, i.e. black-grid start, thus enabling a capability to recover a dead grid as well as to assist in power priming procedures.

These and other objects and advantages made available by the present invention are accomplished with a wind-turbine-based facility that includes one or more wind-turbine generators that produce variable AC from a generator, converts the variable AC to DC, and then collects the DC in a collection and transmission grid. The output of the collection and transmission grid then is converted from DC-to-AC in a co-active converter. The co-active converter may take several forms, but in one embodiment includes a separately powered rotating machine with a compensator to provide reactive power control for the system regardless if the wind turbine devices are actually producing power. The combination of the wind turbine production facility with the co-active converter is coupled with a communication mechanism that coordinates communication between the wind production facility and a virtual energy storage device that produces electric power by releasing a predetermined amount of stored resources (e.g., water, if a hydro-plant) to compensate for commitments by the wind turbine facility. Likewise, excess power production at the wind turbine power production facility may be captured at the virtual energy storage facility in the form of potential energy (e.g., hydro reserve in the case of hydroelectric plant). This potential energy is fungible, in that it may be bought, sold or used to generate power at a later time. Thus, the potential energy has a real market value, the expected price for which varies based on load demands and availability of other energy sources, which may vary daily and seasonally, for example.

By creating "premier" power that is both reliable in terms of short term variation long term reliability as well as during fault conditions, the electrical power produced by a wind turbine generation facility according to the present invention is able to be coupled via "guaranteed" contracts with a virtual energy storage facility, thus making the electricity generated from wind power as fungible as other types of power sources. As a consequence, by creating the premier power, the opportunity exists for creating a renewable exchange to permit the transfer and obligation of wind generated electrical power in units that can be freely sold on the power market. Furthermore, creating "premier" power and providing a virtual energy storage mechanism for essentially preserving a potential energy associated with that "premier" power greatly enhances the commercial value of that power since that power is now made fungible (i.e., may be bought, sold or released on demand). Thus, unlike AC power produced from conventional renewable energy power production facilities, premier power is fungible, and thus may be traded for power (or reserve energy) associated with another power producer, such as a hydroelectric plant. Accordingly, creating a virtual energy storage facility, enables operators of renewable energy power production facilities to collect energy, which has an inherent market value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 12–18 are data structures for showing different components of messages to be distributed to different entities to coordinate operations between wind power production facilities and other facilities according to the present invention;

DETAILED DESCRIPTION OF THE INVENTION

Figure 1:
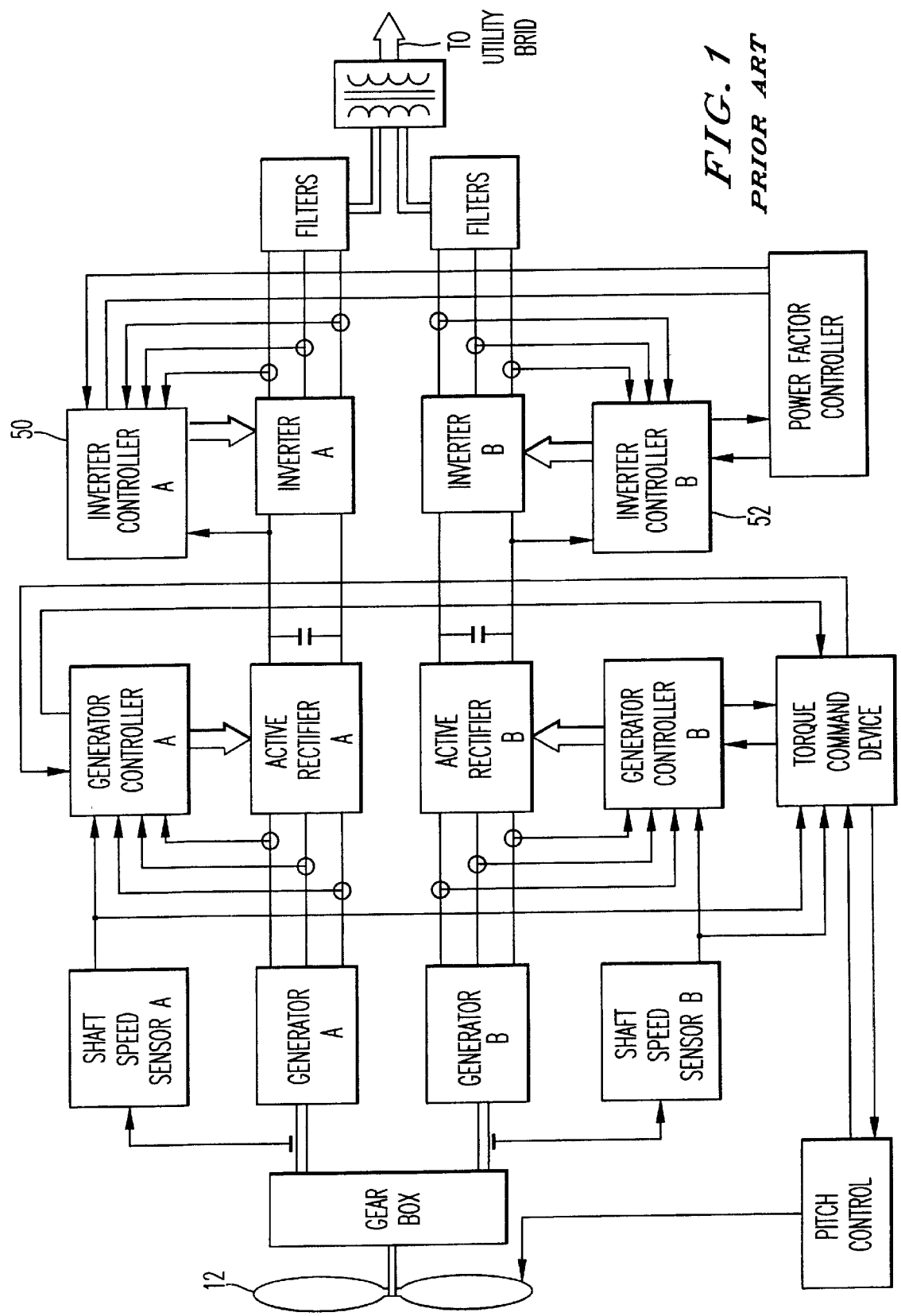
FIG. 1 is a block diagram of a conventional wind turbine facility that includes an active rectifier, DC link, and active inverter.
Figure 2:
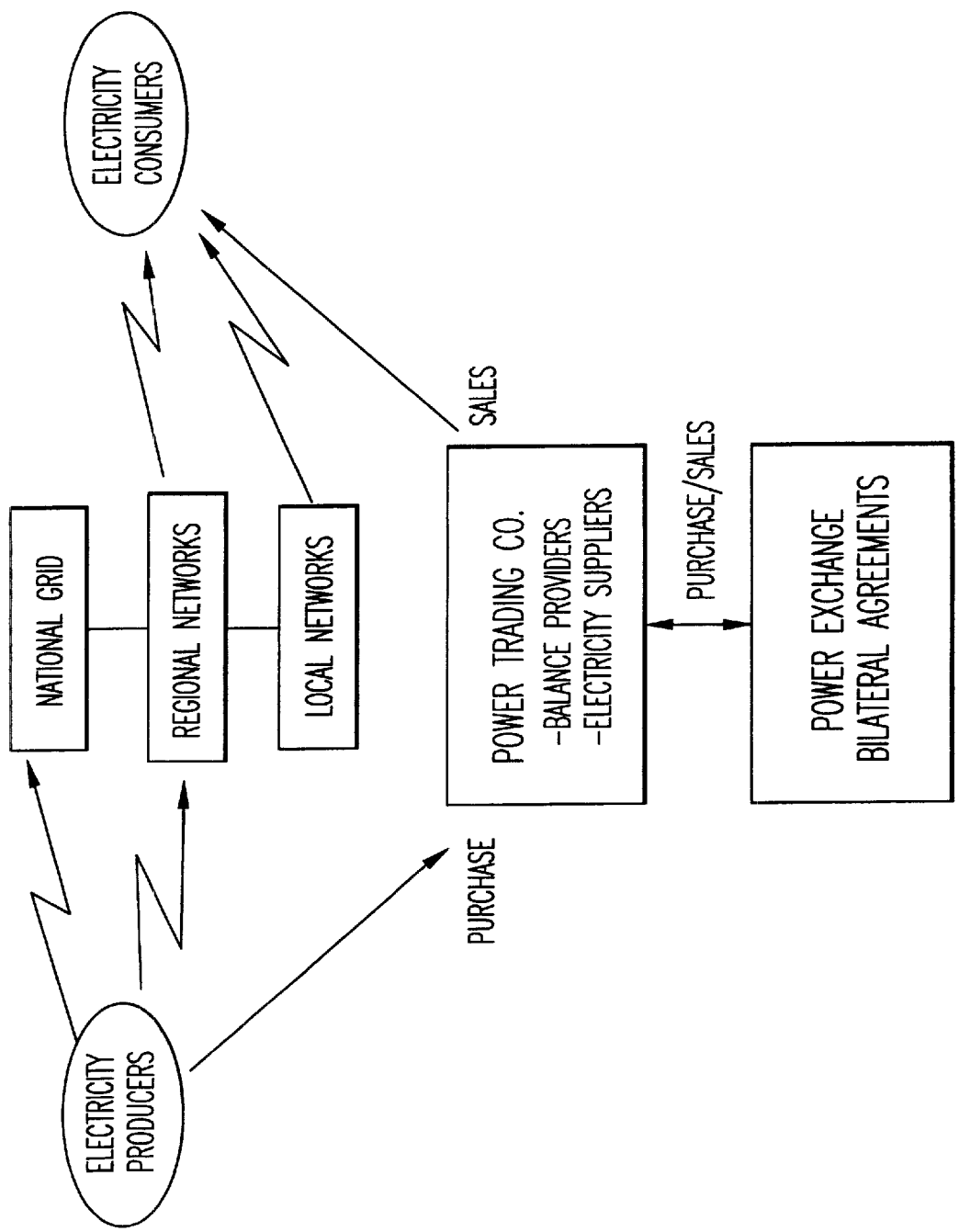
FIG. 2 is a block diagram showing how power units are traded on an exchange between electricity producers and power trading companies.
Figure 3:
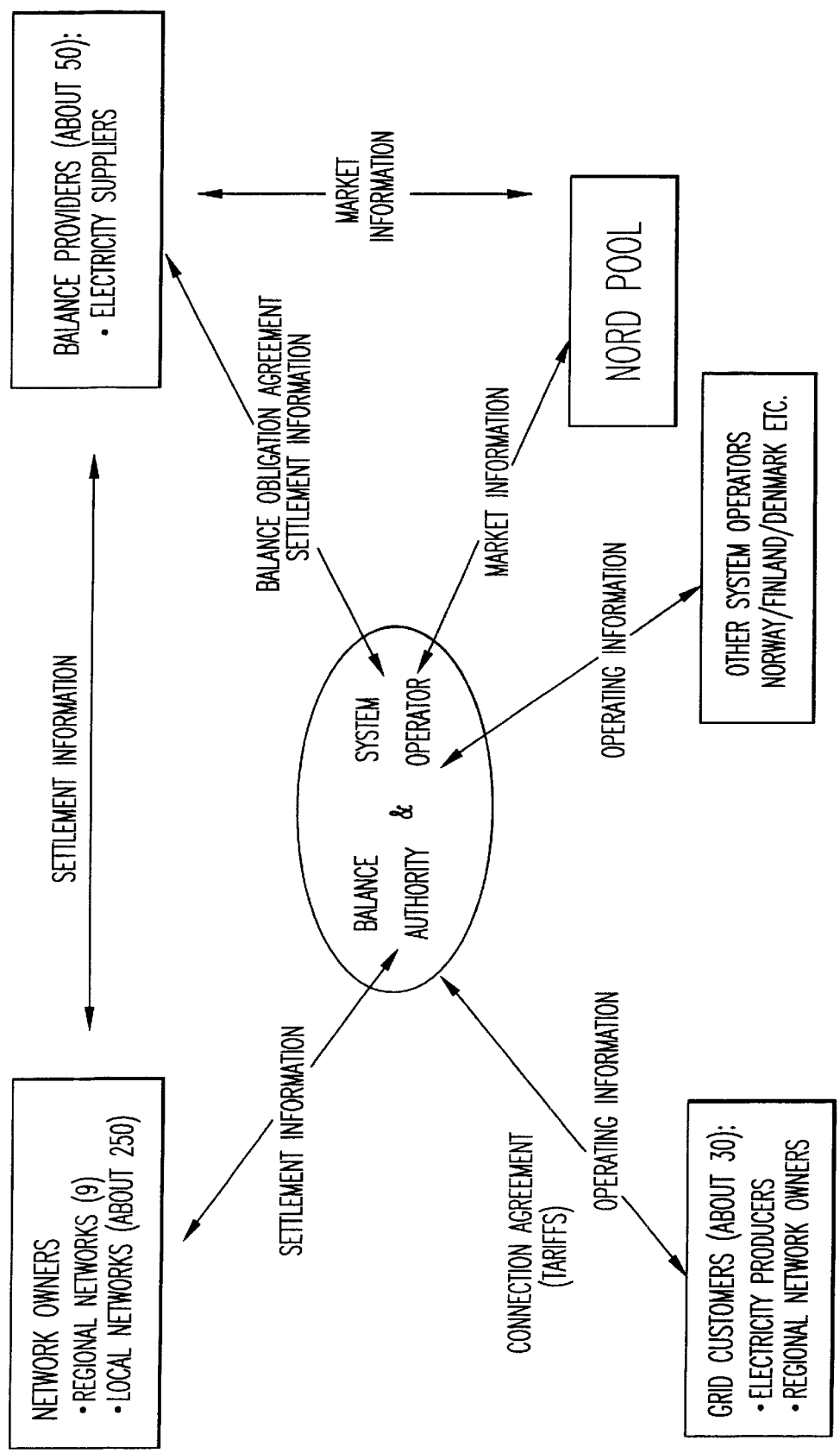
FIG. 3 is a block diagram showing how information is exchanged between a balance authority and system operator and different entities as part of an orchestrated electrical power system process.
Figure 4:
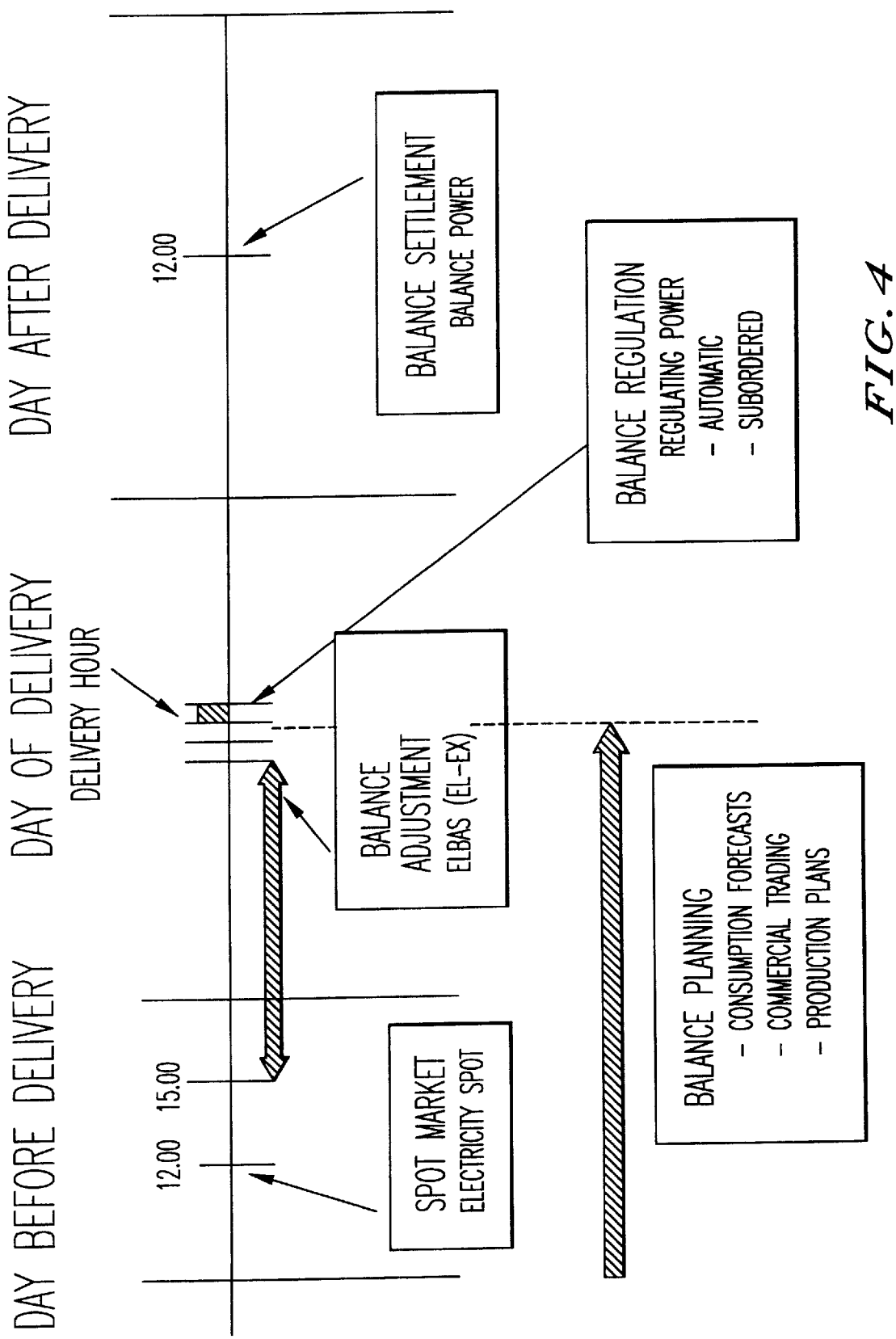
FIG. 4 is a timing diagram showing how balance regulation is performed on an exchange.
Figure 5:
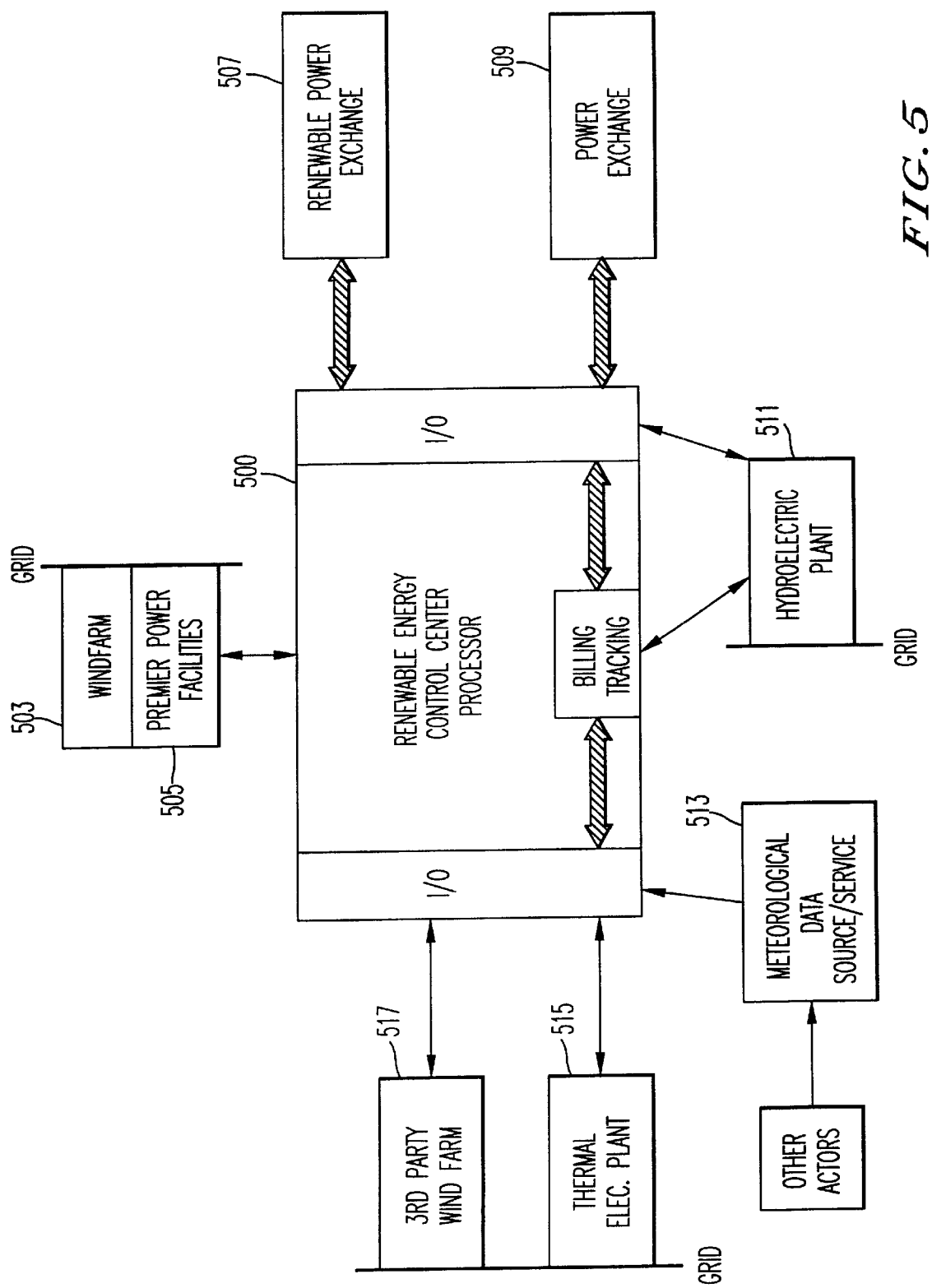
FIG. 5 is a block diagram of a system according to the present invention that includes a renewable energy control center processor.

Referring now to the drawings wherein like reference numerals refer to corresponding structures in the several views, FIG. 5 is a block diagram showing a control and communication infrastructure according to the present invention. A renewable energy control center processor 500 is shown, and a more detailed description of components of the processor is shown in FIG. 11 as will be discussed below. The control center processor 500 includes input/output (I/O) interfaces that connect to communication facilities at a renewable power exchange 507, the power exchange 509 (such as Nord Pool), alternative renewable energy sources such as a hydroelectric plant 511, meteorological data source information as well as service information 513, thermoelectric plants 515 (or other type of electrical generation power plants), third party wind farms 517 as well as a wind farm (which may be a single wind turbine) 503, which includes premier power facilities 505, shown in a form of a co-active converter embodiment. The control center processor 500 may also be included in the premier power facilities 505, in an alternative embodiment. A description of the wind farm 503 including the premier power facilities 505 is discussed further in reference to FIG. 10 as will be discussed below.

The control center processor 500 cooperates with the premier power facilities 505 and hydroelectric plant 511 (or alternatively thermoelectric plant 515 and/or third party wind farm 517) so as to make the electrical output from wind farm 503 a reliable source of electric power. The premier power facilities 505, in cooperation with the process 500 includes a capability to ensure that the form of electric power (stability of output waveform, ability to produce or sink reactive power, and provide short circuit power), when coupled with a "virtual energy storage" (VES) facility (hydroelectric plant 511 in this embodiment, although other plants may be used as discussed herein also as virtual energy storage sources as well) is producible in fungible energy units. More particularly, while the premier power facilities 505 places the output waveform from the wind farm 503 in a suitable form for connection to the power grid, it also includes an adequate short circuit current capability which is used when there is a fault in the grid and significant amount of current is required to trip circuit breakers in this fault mode of operation). The premier power facilities 505 also had an ability to provide reactive power to the grid at a position that is near the wind farm 503. As recognized by the present inventors, the longer term output power from the wind farm 503 may be made sufficiently predictable and reliable, in a business setting, such that units of the electrical power produced by the wind farm may be "guaranteed" by contractual relationships or other agreements with hydroelectric plant 511, in this example. These agreements are helpful in the event of a wind lull for the wind farm 503, where a control message is dispatched to the hydroelectric plant 511 to provide a compensating amount of electric power to offset the short fall from the wind farm. Using the cooperative arrangement the energy output obligation from the wind farm is achieved by asking the hydroelectric plant 511 to output sufficient power to compensate for the temporary short fall from the wind farm.

While the above discussion illustrates the case where the wind farm requires supplemental power to be produced at the virtual energy storage facility, the reciprocal relationship is equally important. When the wind farm produces more power than planned, the surplus power may be saved in the form of virtual energy at the virtual energy storage facility. Once stored, the stored energy is completely fungible and may be withdrawn upon request, or possibly even sold to a third party, for use under the control of that third party. Moreover, by having preserved a predetermined amount of energy in the virtual energy storage facility, the stored energy is available as a resource to be converted to electric power at the demand of the wind farm operator, or simply preserved for a longer period of time or sold to a third party. In this way, the virtual energy storage facility offers the equivalent of a bank account, where the "currency" is chemical or potential energy.

As will be appreciated throughout this discussion, by having recognized that the availability of rapid and real time communication between the control center processor and the hydroelectric plant 511, the water reserve held at the hydroelectric plant, may be used as a virtual energy storage facility for the wind farm 503. More particularly, in the event of over capacity production by the wind farm 503, the premier power facilities 505 communicates this condition to the control center processor 500, which sends a message to the hydroelectric plant 511, requesting that the hydroelectric plant 511 produce a corresponding lesser amount of electric power during this period of overproduction. The total output power from both the wind farm 503 and the hydroelectric plant 511 is thus held to be consistent with the aggregate delivery requirement for both the hydroelectric plant 511 and wind farm 503. Moreover, at any given time, the wind farm 503 and the hydroelectric plant have certain contractual obligations to produce predetermined amounts of power. This predetermined amount of power in the aggregate will equal a certain level of power. However, recognizing that for maximizing power output, the wind farm 503 does not have precise control over the amount of power it produces at any given instant in time, by communicating from the wind farm 503 to the hydroelectric plant the amount of overproduction, the hydroelectric plant 511 can adjust its output level so as to compensate for the surplus. Likewise, for a shortfall, the wind farm 503 may communicate to the hydroelectric plant the amount of extra power that the hydroelectric plant will need to generate in order to compensate for the shortfall by the wind farm 503. The hydroelectric plant 511 will thus be able to save a predetermined amount of its water reserve for use at a later time. This amount of water (or electrical equivalent) is held on account for the wind farm 503 for use at a later time. While not shown on this figure, any adjustment made in output power from the wind farm 503 and the hydroelectric plant 511 is communicated to a system operator so that the system operator may also dispatch commands regarding adjustments that may need to be made to reactive power control at the different facilities so as to balance the reactive power loads placed on the grid. If there is a large electric distance between the wind power mills and the virtual energy storage facility, these facilities are able to provide voltage support at least at two sites, independent of one another. In the preferred embodiment, the wind power park is able to provide the voltage support via the xM at the wind power park site, and at the hydroelectric plant voltage support is provided by synchronous generators, independent of whether the wind power turbines actually produce active power at the time of delivery. Thus, the present embodiment is able to provide adequate voltage control, which is able to kept to within a predetermined voltage limit at the point of common connection.

The connection between the premier power facilities 505, the renewable energy control center processor 500 and the hydroelectric plant 511 (as well as the other communication links shown in FIG. 5) may be made by way of an Internet connection, which may use a combination of land-lines, submarine cables, or wireless links such as point to point radio frequency links (e.g., microwave, satellite, MMDS or the like), or a combination thereof. Proprietary or leased wired or wireless links may be used as a substitute or to complement the Internet connection. In this case, the communications link between the renewable energy control center processor 500 and the hydroelectric plant 511 includes at least a portion of an Internet connection. The control center processor 500 includes a URL that is available for access by the respective wind farm operators and other electric power plant operators so that a Web based graphical interface (e.g., Web browser, such as "EXPLORER" offered by MICROSOFT) is presented to the operators of the different plants. These operations interface can thus monitor and control a "ganged" control operation of the wind farm 503 and the hydroelectric plant 511 for example. Thus, a change in power production (e.g., above or below planned amounts) at the wind farm 503, is immediately (preferably within a second, although in some cases with a lag time of a 10 seconds, or in some rare cases a minute or more) compensated for at the hydroelectric plant 511. A principal factor in determining the actual delay time is the response time of the hydroelectric plant 511 to a command from the wind farm 503 requesting that the gates at the hydroelectric plant 511 be opened or closed by some predetermined amount. When "ganged" control operation is used, and the response time of the hydroelectric plant 511 is routinely more than a few seconds, the processor 500 may use the data from the meteorological data source/service to predict the amount of surplus/shortfall that will need to be addressed at some predetermined period of time in the future (e.g., 10 seconds or more). In this way, the wind farm 503 (or alternatively the hydroelectric plant 511 itself) may dispatch an "anticipatory" control command to the hydroelectric plant 511, causing the hydroelectric plant 511 to begin to make the necessary adjustments for increasing/decreasing the power production based on the forecasted surplus/shortfall in power production from the wind farm 503 as a result of predicted wind speed increase or decrease.

The communication link is a secure link, provided with encryption such as by way of a virtual private network (VPN). Alternatively, instead of a Web interface using the Internet, digital communication links including proprietary links may also be used for interfacing the control processors at the hydroelectric plant 511 and the premier power facilities 505 by way of the control center processor 500 for example. In this way, when requests are made by the wind farm 503 to either increase or decrease the power production level at the hydroelectric plant 511, the processor (not shown in FIG. 5) at the hydroelectric plant 511 can verify that the premier power facilities 505 associated with the wind farm 503 has, in fact, saved up enough excess power by way of its virtual energy storage contract (or other obligation created with the hydroelectric plant 511) so as to contractually obligate the hydroelectric plant 511 to produce the requested power. Furthermore, the hydroelectric plant may simply serve as a "stand by" energy source, so as to guarantee the output power from a given wind farm. In this way, if the wind farm 503 would need a certain amount of power to compensate for a lull in the wind, the wind farm operator 503 may request that the hydroelectric plant 511 increase its power output level in the hydroelectric plant 511. Then on a request-by-request basis, may debit an account held by the wind farm operator 503 and report the debiting to the billing and tracking mechanism in the control processor 500 so that after a predetermined period of time the account may be reconciled and funds exchanged with the hydroelectric plant 511. This independent contractual linkage avoids the necessity and expense of having to purchase power on the spot market, which does not provide the kind of rapid response time that is most desirable so as to "guarantee" that the units of power provided by the wind farm (whether produced from the wind farm itself, or supplemented from output from the hydroelectric plant 511) are delivered as requested.

By providing, in a reliable fashion, units of electrical power that are at least partially derived from the wind farm 503, enables the wind generated electrical power to be on par with other types of power in a commercial setting. The present inventors have recognized that by making this power reliable both in terms of the quality of the power provided to the grid, and also in terms of the contractual reliability with which the wind power may be provided to the grid, perhaps by relationships with virtual energy storage facilities, wind power units may also be traded on a power market. As previously discussed, the power exchange 500 includes long term contracts for providing predetermined amounts of power to the grid. Thus, by being able to have guaranteed certain output levels of power from the wind farm, the wind farm operator may also participate in this power exchange by entering into forward contracts. It should be stated that while the present invention discusses wind power as a preferred embodiment it is also applicable for solar power for example or other time varying power production facilities.

Another feature made available by the present invention is the creation of a renewable power exchange 507, which includes units of power that may be traded from power production facilities that use renewable sources of power (solar, wind, hydro, for example). The renewable exchange is based on the principle that if certain power production facilities can reliably predict the amount of power they can produce at any given instant in time, then contractual relationships may be formed and units of power, that are perhaps guaranteed, or even made available by way of options contracts, may be traded in a virtual forum such as in a power exchange for renewable energy sources. The renewable power exchange will be based on the principle that units of power for some given period of time produced by the wind farm, may be predicted with a certain degree of accuracy, based on meteorological data source and prediction tool 513.

This meteorological prediction tool provides a statistical probability indicating the likelihood of the wind farm actually producing the amount of power contracted for a given period of time. Based on this statistical prediction, it is the availability of that information that is reviewable by different market participants at the renewable power exchange bidding on the unit of wind power energy produced by the wind farm at some given period of time.

Due to wind power being "green", this type of power is highly desirable and financial incentives are sometimes offered by different governments to provide this type of power, or even quotas placed on power providers for providing a certain amount of green power as part of their energy portfolio. By providing units of power that are available for sale, including the statistical likelihood of the reliability of providing that power, market participants in a renewable power exchange 507 may purchase the units of power from wind farm as a forward option. Market participants may include other wind farm operators such as the third party wind farm 517 who seek to increase the likelihood of delivering power for their respective contractual obligations by accumulating more power product resources. Other operators such as thermoelectric plant 515 or hydroelectric plant 511 operators may also purchase the units of wind power and use the control center processor 500 as a mechanism for guaranteeing that the hydroelectric plant 511 or thermoelectric plant 515 can increase its production in the cases when the wind farm in fact has a lull in wind and cannot produce the required amount of wind generated electric power. Likewise, the other operators may purchase from a wind farm operator a surplus of potential energy saved in the wind farm operator's virtual energy storage account. The potential energy assets will tend to accumulate in the wind farm operator's account if the wind turbines experience a greater than predicted amount of wind.

The price that a hydroelectric plant operator (or other type of operator) would be willing to pay would be a function of the level of renewable energy resources they presently have collected, or as a result of their optimization process, predict to have in the future. For example, the price a hydroelectric plant operator would be willing to pay for wind energy would be relatively high if the water reserve at the hydroelectric plant is relatively low or below expectation levels for that particular time during the season. On the other hand, if the hydroelectric plant operator has a larger than expected surplus of water reserve, and may even have to spill some of the water, it is unlikely that that hydroelectric plant operator would be willing to pay much for the power produced at the wind form operations. On the other hand, a thermoelectric plant operator would, on a unit by unit basis, be willing to pay for the green units of wind power in order to meet their governmental regulations. Purchasing units of power from a wind farm operator also saves on fuel, provided that the output levels and cost from the wind farm are sufficient to offset their reserve of fossil fuels.

Figure 6:
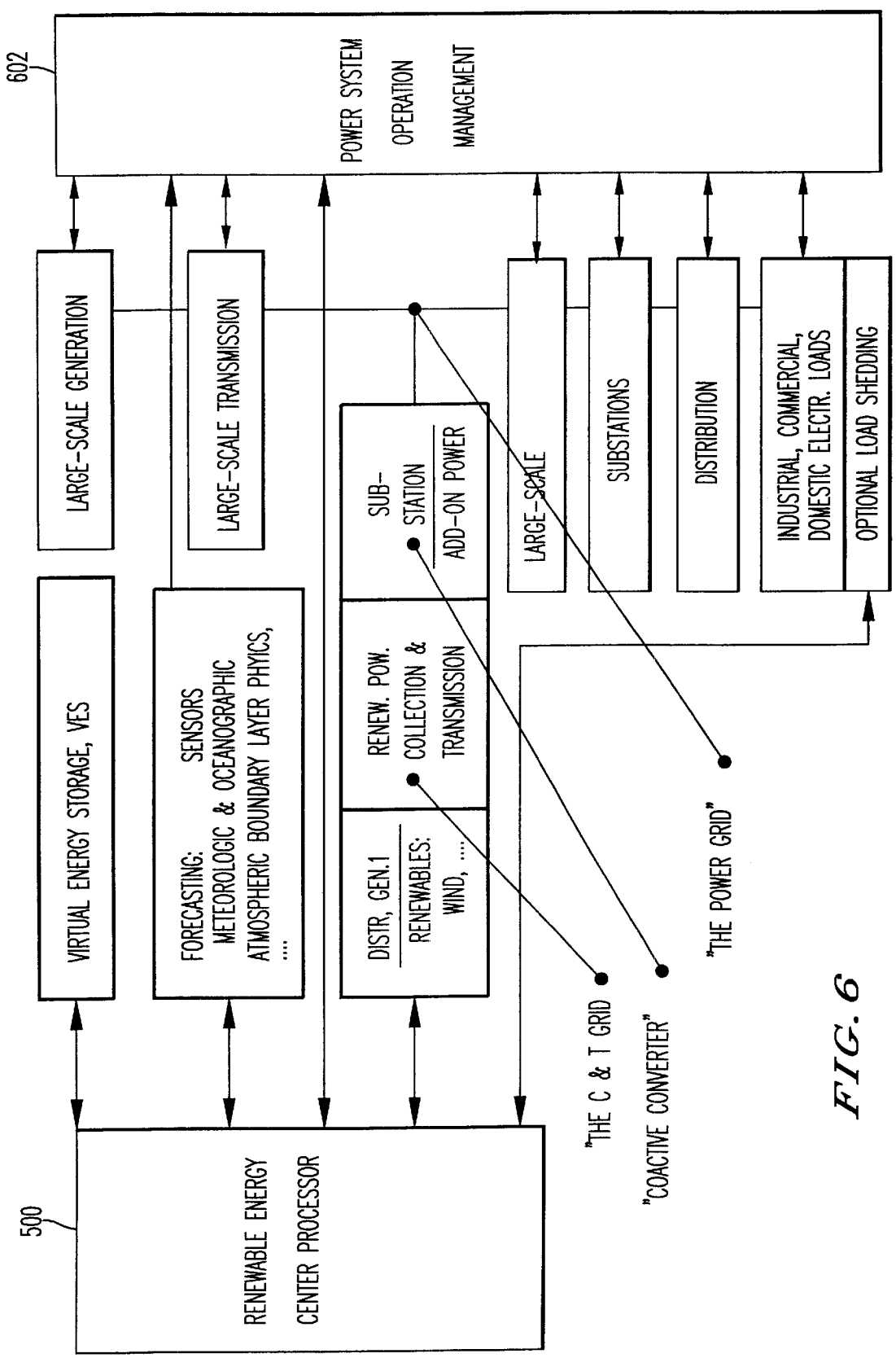
FIG. 6 is a block diagram showing how coordination between different components of distributed generation and distribution system using a renewable energy control center processor is performed according to the present invention.

FIG. 6 is a block diagram that shows the interrelationship between different components of an overall system that uses renewable power generation in cooperation with a virtual energy storage facility so as to provide more efficient and commercially valuable services for providing wind generated electric power. The renewable energy control center processor 500 is shown to cooperate with both the virtual energy storage mechanism, meteorological service, that includes sensors, weather forecasting, wind to electric power conversion calculations and the like in order to provide input to the processor 500 for identifying the likelihood with which a particular renewable energy producer will be able to provide a predetermined amount of power. The control center processor 500 also cooperates with a similar processor in a power system operation management mechanism 602. The power system operation management mechanism 602 coordinates both the purchase requirements for the power exchange as well as the balance operation, and directing different energy producers to provide certain amounts of power, including reactive power, in certain time frames so as to maintain a stable frequency operation and also avoid reactive power anomalies at certain locations on the grid.

The distribution generation 1, includes one or a plurality of different types of renewable energy sources. These renewable energy sources include wind, solar and possibly even hydroelectric sources. Since a plurality of different generators are used, the generators connect to a collection in transmission grid that collects the power (which in this embodiment is an HVDC link, which in turn connects to a substation that includes a co-active converter). The co-active converter handles the fluctuating power from the renewable energy sources and primes the power so as to make the output power substantially conform with that required on the power grid. Preferably, there is only one connection between the co-active converter from a single wind farm or multiple wind farms or a hybrid combination of wind farms with other types of renewable energy sources. It should be noted that this collection and transmission grid does not include complicated and expensive energy storage units located at the wind mills' DC voltage link.

The substation may also include an optional prime mover that can operate off of an external source of fuel such as vegetable oil, gas, diesel, or compressed air for example. This prime mover is able to fill the gap between the power that is actually sold, and the power that is available from the wind. The output of the power substation is provided to the power grid, which in the present context includes a transmission and distribution grid. The transmission and distribution grid interconnects both a large scale generation facility that connects with the virtual energy storage device, as well as other large scale generation facilities substations, distribution operations, as well as the loads that receive energy from the different electric power generation facilities.

The system operation management mechanism 602 coordinates with the different power production facilities to place regulations on the amount of power that is provided to the grid. Communications with the power system operation management may also be provided to the renewable energy control center processor 500 for restricting the amount of power that is provided from the renewable energy sources if appropriate. Furthermore, the renewable energy control center processor 500, as well as the power system operation management mechanism 602 that controls an optional feature for performing load shedding, cooperate to manage and balance the power that is actually produced versus the actual demand. Load shedding is achieved by contractual relationships (preferably) with certain customers who have agreed to have their power cut back at times of peak need. A feature of the present invention is that the renewable energy control center processor 500 may also contract, through private contracts, with separate optional load shedding customers who have agreed to have their power level demands fluctuate and diminished purposely when lulls in the wind power are observed. For example, while the virtual energy storage facility is one mechanism for converting the excess power produced by renewable power sources into tangible assets that may be turned into power at a later time (perhaps by increasing the water volume in a hydroelectric plant's reservoir), the load shedding operation in connection with the renewable energy control center processor provides a mechanism for reducing the demand obligations from selected customers who have agreed to have their power cut back in times of lowered output capacity from the wind turbines. Thus, a feature of the present invention is to coordinate periods of oversupply from a renewable energy source by storing power production resources at a virtual energy storage device, and also compensating for output power deficiencies by either requesting that a release from the reserve stored at the virtual energy storage facility produce power to offset the short fall, and/or institute power shedding operations at predetermined customers who have agreed to have their power cut back at times of lowered production capacity.

Figure 7:
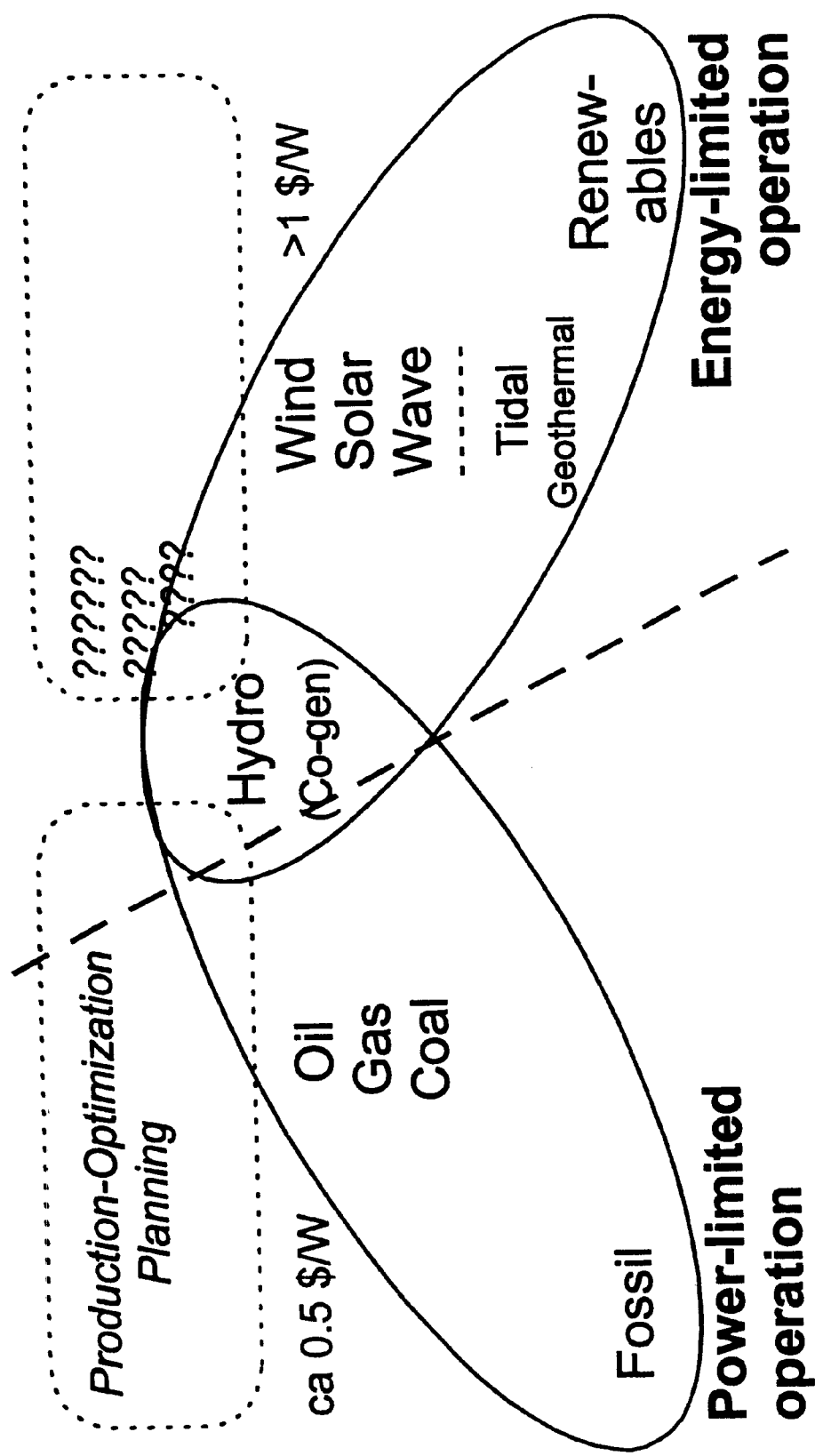
FIG. 7 shows an overlap between cooperative cogeneration of renewable energy and less costly power-limited operations so as to provide optimized guaranteed power production.

FIG. 7 is a conceptual diagram showing how the use of different types of renewable energy sources (such as wind, solar, wave, tidal, oceanic, based on ocean currents and/or wave action, or even geothermal), may be combined in a linked fashion with other types of conventional and controllable power production facilities such as fossil fuels or hydroelectric power generation. As noted in FIG. 7, the renewable energy sources are different from fossil fuels in that fossil fuels have power-limited operation (meaning that reserves for fuel sources may be stored and compiled without limit, but the output power by those facilities is limited). Such operations provide units of power of about 50 cents per watt. On the other hand, renewable energy sources operate in an energy limited operation where there is not an ability to store the source of power without limit.

Hydroelectric generation is somewhat different in that by using reservoirs and dams it is possible to control the amount of preserved fuel source (amount of water) which can be released at a controlled rate. Thus hydroelectric power can be considered to have some components of being both energy limited operation as well as power limited operation, which as identified by the present inventors is actually an opportunity for a shared relationship with other types of renewable energy sources. For example, hydroelectric operators cannot store an infinite amount of water volume, and thus must spill some of the water in the reserve if the supply becomes too great. Accordingly, hydroelectric operators must manage the reserves in a controlled fashion. Since renewable power from wind turbines provides a time-varying amount of power, the present inventors have recognized that cooperation between a hydroelectric operations plant and renewable energy source such as wind turbine farm has significant synergy in that by linking the two facilities one with a relatively short time constant (windpower) with one having a much longer and predictable time constant (hydroelectric generation), the aggregate enables the optimization of green power use. Furthermore, the combination of electricity from wind power with hydroelectric power provides for a reliable cooperative generation system that enhances the commercial value of the more volatile energy source such as wind power or solar power.

Figure 8:
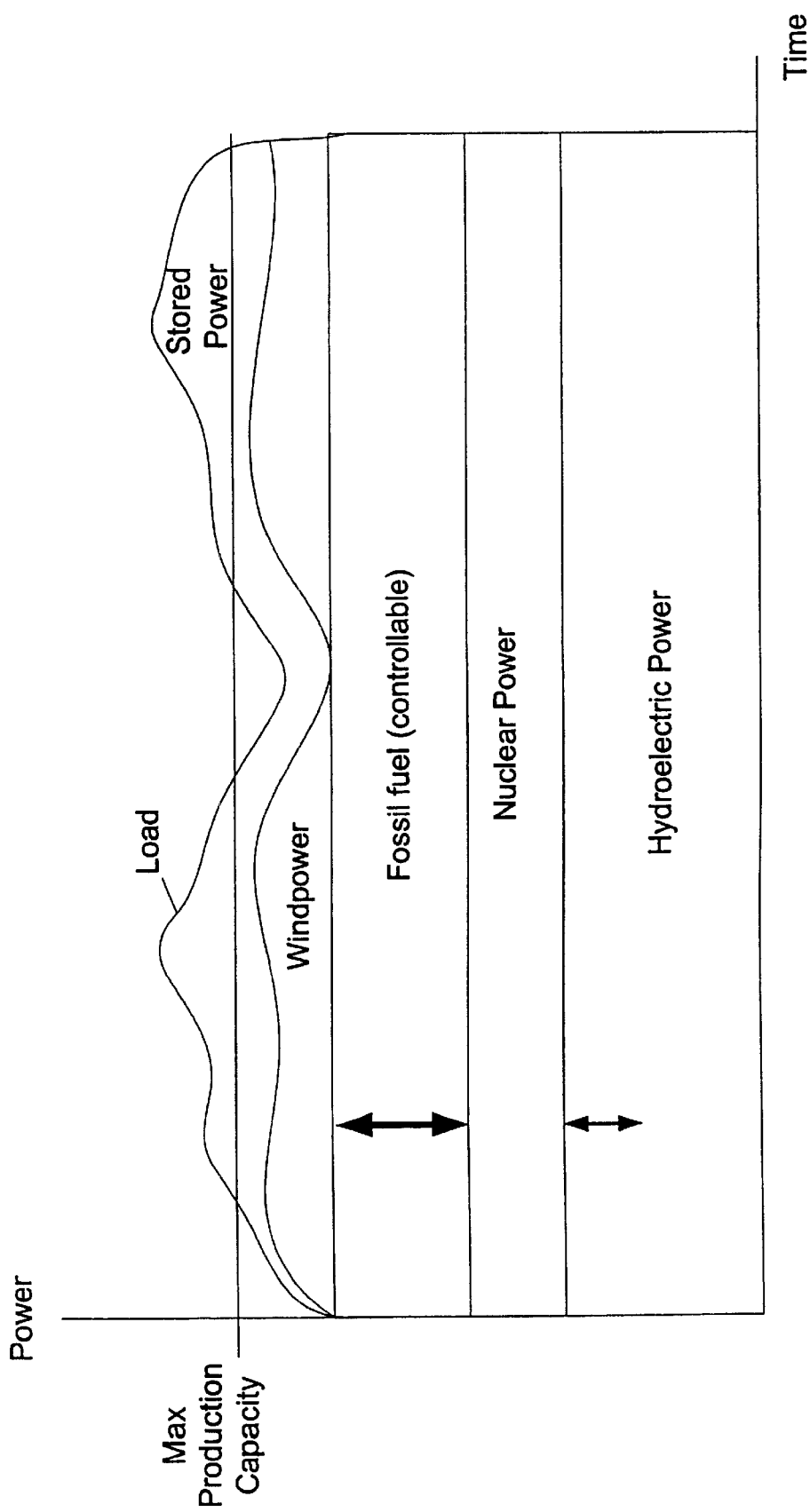
FIG. 8 is a graph showing how present use of wind power creates more substantial variations in balancing loads as viewed by system operators than according to the present invention.

FIG. 8 is a graph that shows the relative amount of electric power produced from different types of power facilities versus time (scale does not reflect actual systems necessarily). FIG. 8 shows generally that hydroelectric power which is a controllable resource to some extent (as indicated by the variable range with a limited dynamic range) provides a predetermined amount of power, albeit under a controlled operation. Nuclear power, which is also controllable, typically operates in a fixed fashion. Fossil fuel plants and hydroelectric power plants have a controlled amount of power output that can be operated from a full production capacity down to no production at all. Wind generated electric power however, because it is not considered to be main-stream type of power, is simply applied to the grid on an as produced basis, and responsibility falls on the balance provider to reduce the demand on the spot market to compensate for the amount of power that is applied to the grid by the wind operators.

By providing electricity from wind power in this fashion that is not in any way premier power (meaning that the wind power is not of the same quality as other sources of electrical power) places an increased burden on system operators. Moreover, the way wind power is conventionally handled, without an ability to plan in advance for the use of a predetermined amount of wind power, causes the wind power to be another stochastic variable that must be addressed by the system operator at the same time that varying loads are addressed. Thus, the burden on system planners is not only to match the amount of contracted power to meet an instantaneous load, but also to handle a varying amount of power that is applied to the power grid by wind turbine operators. Thus the concern over properly matching, without planned optimization for the amount of power that is produced is suboptimal. As seen in FIG. 8, the instantaneous power produced may be below maximum production capacity, and below a predetermined instantaneous load. When this occurs, then stored power may be needed to compensate for the lower than needed maximum power capacity. The other alternative is to perform load shedding so that the amount of load is reduced.

Figure 9:
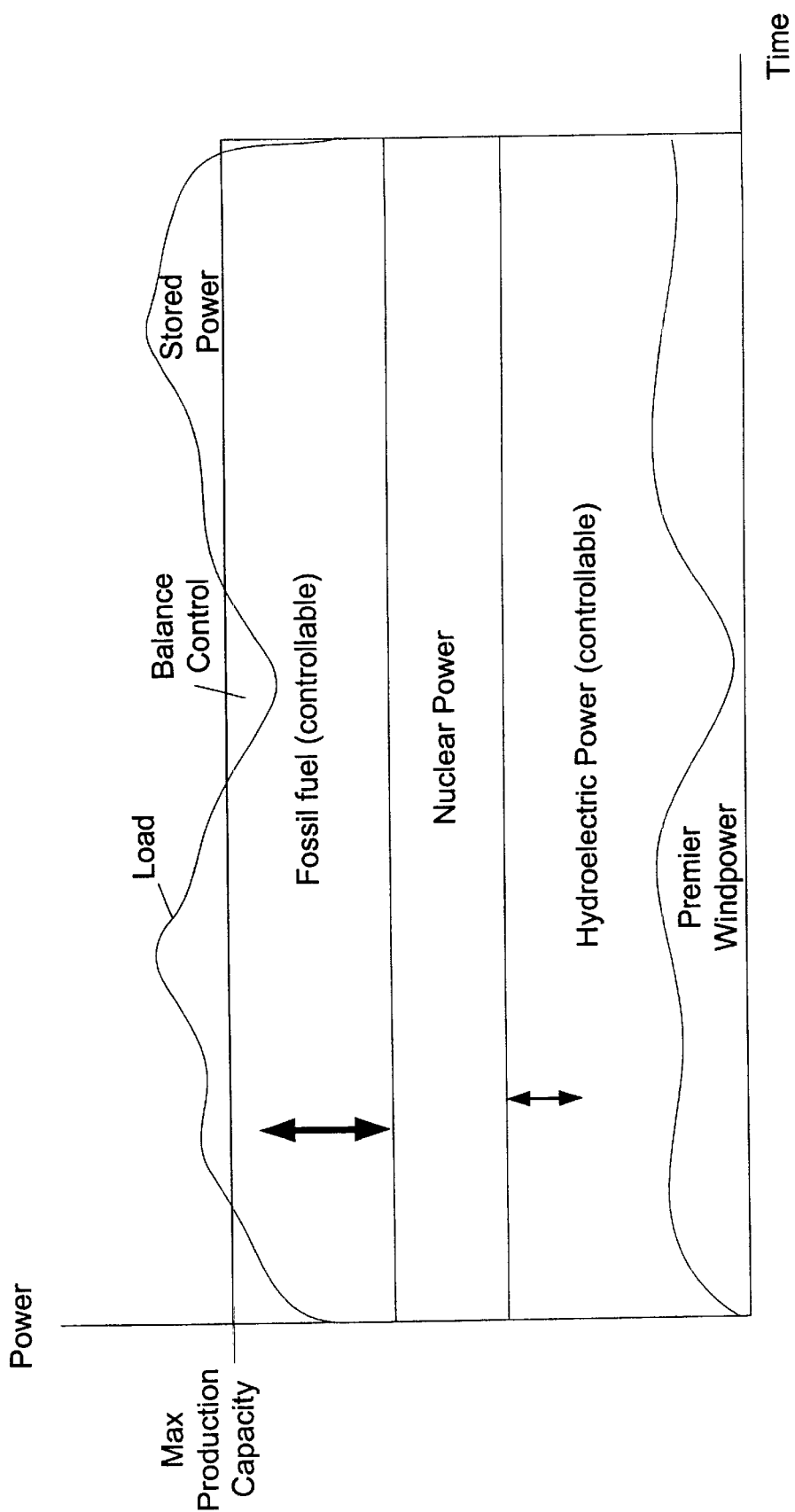
FIG. 9 is a graph showing how electricity generated from wind power, if made into premier wind power, can reduce load variation demands.

FIG. 9 is a graph like that shown in FIG. 8. However, in this case the wind power produced (or other type of renewable power source) is produced as premier power. Furthermore, a feature of the premier power is that the wind turbine facility has a coupling relationship with a virtual energy storage facility such as a hydroelectric power plant, such that the premier power is able to be handled just as conventional hydroelectric power, nuclear power or fossil fuel power "units" that are equally fungible and exchangeable in a market setting. This coupling relationship may be made with other energy sources, the suitability of which is determined by different market participants like those acting as traders dealing with at least one of the energy kinds from the following list: renewables including hydroelectric power, thermoelectric power like e.g. fossil or nuclear, combined heat and power (CHP), for example. By making premier power from wind it is possible to do forward production planning and optimization by the system operators. As a consequence, the number of random variables is reduced and as a consequence, the level of difficulty of balance control is reduced since the random variable primarily becomes the amount of load that is experienced by the grid operator from the consumers. In this way, market efficiencies are also improved as the burden on significant swings on the spot market to provide instantaneous power demands (to offset significant variations between predicted power levels) is reduced, thereby enabling power producers to more effectively manage and lower the cost for producing power that is applied to the grid. Furthermore, by making power from wind turbines into a fungible form of power units, enables wind power operators to sell the electric output therefrom in a longer term, such as in options and forward contracts.

Figure 10:
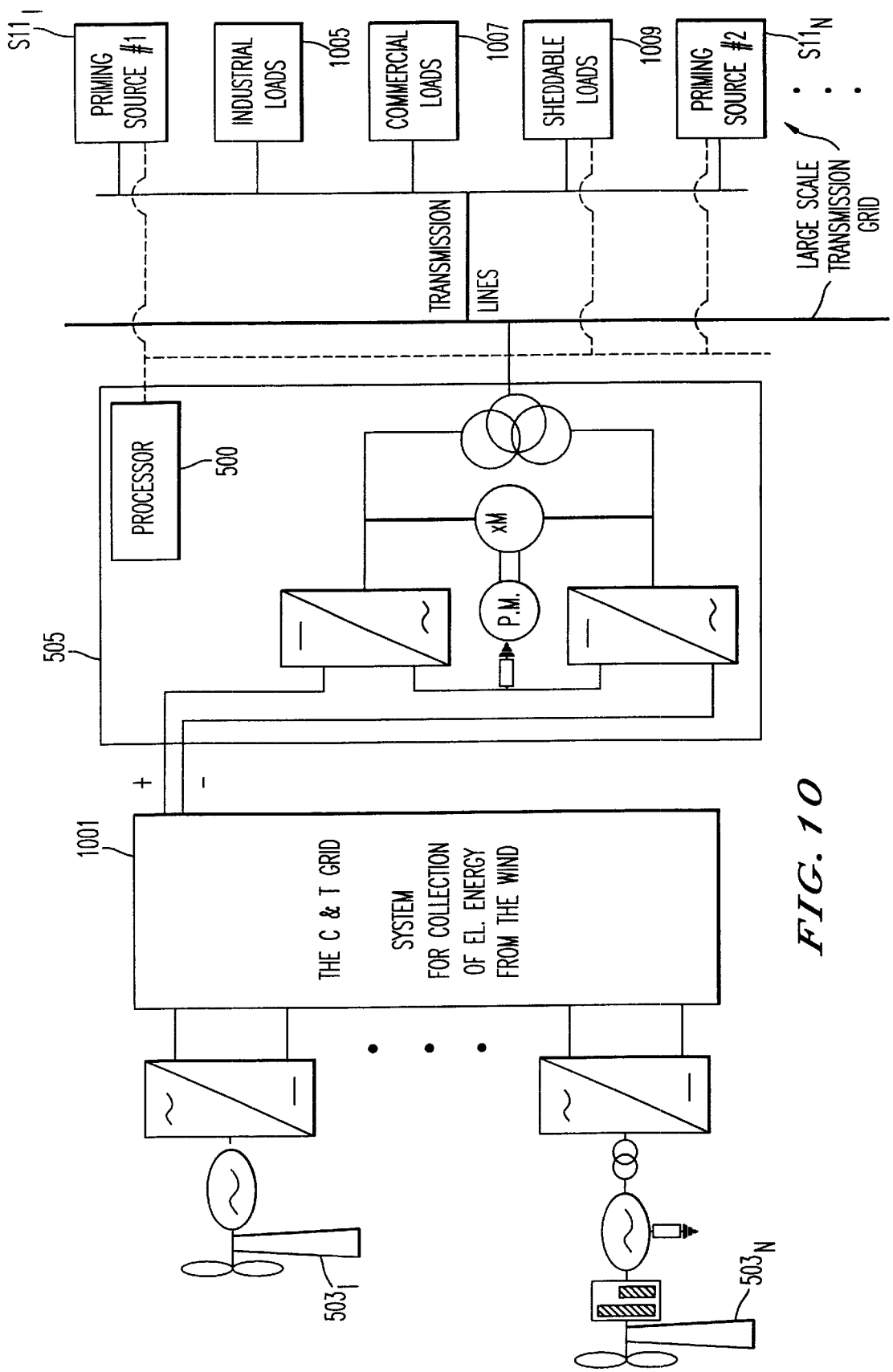
FIG. 10 is a block diagram showing how a cogeneration facility employed by the present invention coordinates with priming sources as well as provides premier power to a transnational grid according to the present invention.
Figure 11:
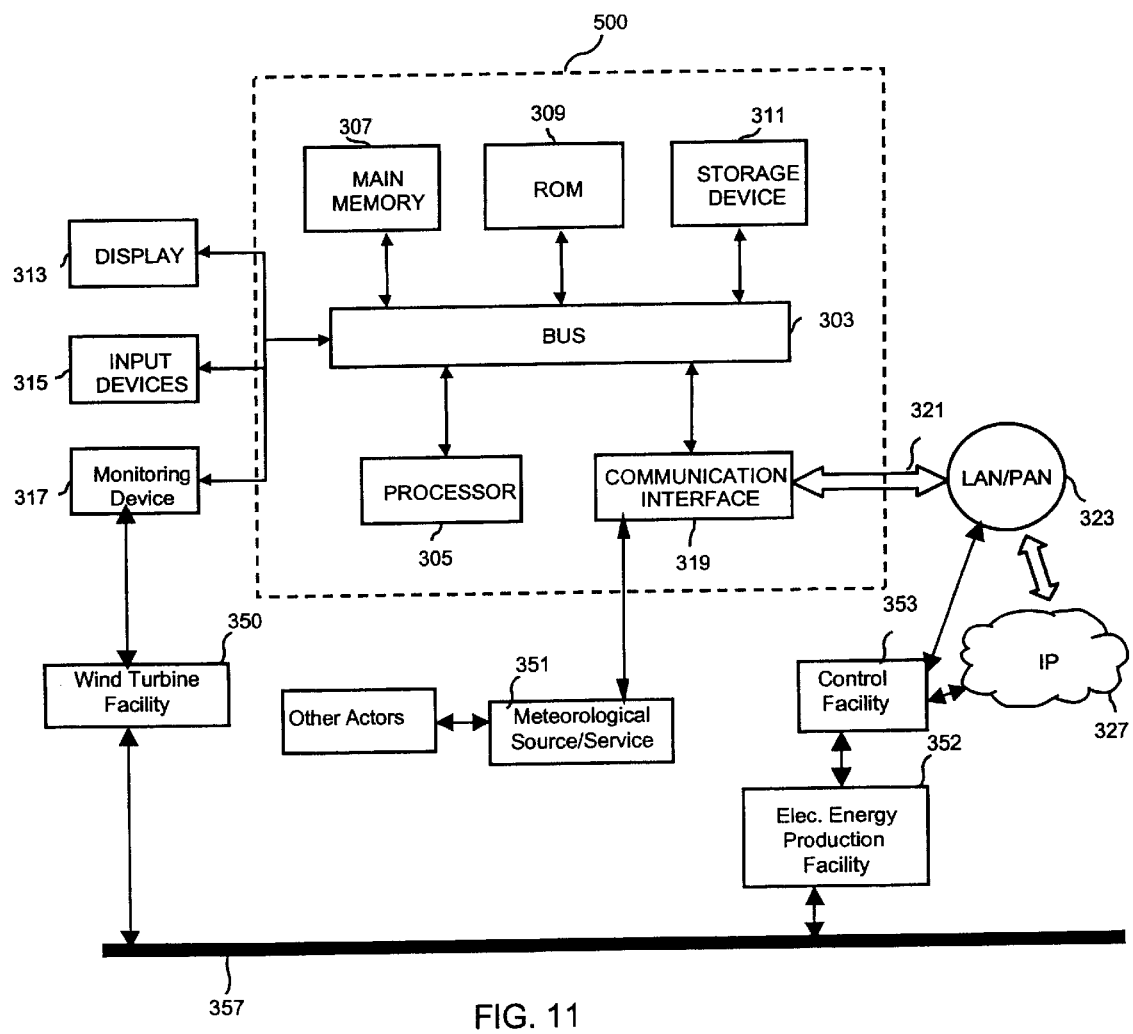
FIG. 11 is a block diagram showing components of a processor employed by the present invention to coordinate activities at the wind turbine facility for producing premier power.

FIG. 10 is a block diagram of a wind turbine electrical power production facility according to the present invention. The wind turbine electrical power production facility includes one or more converters, some of which may be embodied as co-active converters. Wind turbines $503_1$–$503_N$ are connected to respective generators and then to an AC-to-DC converter. In the wind turbine $503_N$, a transformer may be used between the generator and the AC-to-DC converter (s). A large number of wind turbine based generators may be used according to the present invention, as described in Swedish Patent Application 9904753-2, filed in the Swedish Patent Office on Dec. 23, 1999, or Swedish Patent Application 9904740-9, filed on the same day in the Swedish Patent Office, the entire contents of each of which being incorporated herein by reference. As seen in the wind turbine $503_1$, no transformer is used, as described in PCT/SE97/00878, filed on May 27, 1997, the entire contents of which being incorporated herein by reference.

The output of each AC-to-DC converters is a DC electricity source that is applied to a collection and transmission grid (C&T grid) 1001. A detailed description of how the collection transmission grid is established may be found in the above identified Swedish Patent Application 9904740-9 and thus will not be further discussed herein. With the DC power aggregated and distributed over a HVDC link, the positive and negative lines from this HVDC link are output from the collection and transmission grid 1001 and applied to a premier power facilities 505.

In the premier power facility 505 a processor 500 is used to control operations and to control communications between the wind farm facility and premier power facilities 505 and other systems such as priming source No. 1 511$_1$ or priming source No. 2 511$_N$. Likewise communication links (physical or wireless links) may connect to other systems and devices as shown previously in FIG. 5. Positive and negatives legs of the DC source from the collection and transmission grid 1001 are applied to first and second DC-to-AC inverters that produce output waveforms that match to the frequency and reactive power requirements of the transnational grid as shown. The DC-to-AC inverters (may be power electronics inverters that uses insulated gate bipolar transistors as switches to actively control switching operations by way of PWM control signals. Positioned across the output lines from the DC- to-AC inverters are a prime mover and a rotating electric machine referred to here as "xM". The prime mover may be any one of a gas engine, diesel engine, steam turbine, expander turbine, hydroelectric water wheel, water turbine or the like, perhaps even being supplied with compressed air storage facility. Mechanical energy imparted by the prime mover may be applied to the xM in order to operate the xM as a generator, one type of rotating electric machine. By employing the combination of the prime mover with the xM (or optionally just the xM by itself), the co-active converter provides a power "priming" operation that converts low-quality energy into premier electric powers discussed herein.

The co-active converter performs a frequency conversion function (e.g., converting from non-stable AC to a fixed, standard AC output, or more preferably converting an output from a high voltage DC link to a fixed, standard AC. However, the co-active converter also provides a controllable amount of active and reactive (independently controllable) the power grid. Thus, by incorporating a co-active converter, the present invention can adapt power from a renewable energy power production facility, which may have an unstable output and make the power suitable for meeting the specifications (e.g., reactive power control, short-circuit power, suppressed harmonics and the like) placed by grid operators on other power producers. As seen in FIG. 10, the coactive converter portion of the premier power facilities 505 is disposed between two sets of terminals (i.e., one set provided from the HVDC link from the C&T grid 1001 and the other being the connection to the Large scale transmission grid. Preferably, the co-active converter includes a DC-to-AC converter (shown), a rotating converter (shown), and a power transformer (shown), although other configurations are possible as well. The co-active converter includes at least one static or rotating converter from the following:

1. A frequency converter that operates to convert from between DC to a frequency standard (e.g., 50 Hz or 60 Hz) AC (shown);
2. A frequency converter that operates to convert from between variable low-frequency (e.g., 3 Hz to 10 Hz) AC to a frequency standard AC;
3. A frequency converter that operates to convert from constant low-frequency AC to a frequency standard AC;
4. A rotating converter that supplies reactive and/or active power to frequency standard AC; and
5. A power transformer that adapts a voltage level and provides for short circuit level operation, and is preferably a static device (as opposed to a rotating device).

The rotating converters are preferably a rotating electric machine that may act as a reactive compensator and optionally act as an electrical generator driven by a prime mover.

By having the prime mover, the rotating converter is able to offer the following advantages:

a. start-up the power grid after a major fault;
b. partly or wholly add active power (for helping to "prime" the power generated by the wind turbine);
c. partly or wholly supplying reactive power to the power grid and optionally to the frequency converter so as to prime the electrical power generated by the wind turbine;
d. reduce the low order harmonic pollution caused by the frequency converter;
e. support the active AC for the operation of the frequency converter;
f. release a dependency of the frequency converter's active and reactive control from one another (e.g., stationary, when implemented with thyristors valves, or during fault, based on transistor valves);
g. symmetrizing the power grid at the AC terminals of the co-active converter;
h. supply short-circuit power during fault operations.

With regard to the short-circuit power discussed above, the present inventors have recognized that having a sufficient reactive power capability during a time of short circuit fault and/or faults to ground, the co-active converter should have sufficient current capacity to trip a circuit protection device, such as a circuit breaker. Furthermore, with regard to the use of a prime mover, the present inventors have recognized that an additional energy supply capability from a rotating electric machine, driven by a prime mover does two things. First, it enables the supply of a failing energy— compared to prognosticated and sold energy—during normal operations. Second, it supplies energy for, normally rare, state-up procedures, such as a black-grid start. Furthermore, by having a xM (i.e., a rotating converter that is a rotating electric machine, a compensator, connected as a shunt element near a point on common connection to the power grid), as part of the co-active converter, the xM provides an energy storage capability that is useful during faults where the voltage sags and the transferable power capability from wind to grid is temporarily reduced to as low as 5 to 10% of nominal value during a fault time that may last 0.2 seconds (a power grid operator's specified conditions). Finally, the energy storage capability helps to eliminate voltage flicker due to tower shadow and wind gusts during normal operation.

The reactive power in the co-active converter is created in a combination of units: the DC-to-AC converters and the rotating electric machine (i.e. xM). The reactive power may then be transmitted to the AC power grid or held at zero if the utility demand is zero. Net-commutated converters will consume some reactive power provided by the xM, while self-commutated converters can consume or produce some reactive power. The present inventors have observed that, from a dynamics point of view, the self-commutated converter (which uses IGBTs as semiconductor valves) consumes reactive power provided by the xM. On the other hand, net-commutated converters (which use SCRs, thyristors, as power semiconductor valves) have an advantage in that their power semiconductor valves are fewer by a factor of 3 to 30, as compared with self-commutated converters.

Preferably, the xM is a two-winding machine with two sets of AC three-phase windings arranged in the stator and exposed to both AC and DC fields when in operation. While the xM may be a synchronous machine that operates at constant speed, it is preferable to use an adjustable speed machine that may uses brush-less drives or brush-based drives, such as Static Scherbius drives.

A feature of the premier power is that it allows the renewable energy source such as wind power to be afforded the advantages of other types of electrical power generation sources such as hydroelectric power without however the expensive bulk cost for energy storage such as with hydrogen or fuel cells or electric chemical actuator batteries or the like.

The processor 500 serves as a controller to control a mode of operation for the xM. The xM may also operate as a motor for example so as to serve as a sink of reactive power as well, thus the terminology "xM", referring to either a generator of a motor for example. Whether the output power is partially supplied from the xM or from only the DC to AC inverters, the output power is coupled onto transmission lines as part of the transnational grid. Of course, the connection may also be to feeder lines that connect to the transnational grid. The transmission lines of the transnational grid also include various loads, industrial loads 1005, commercial loads 1007, and sheddable loads 1009, previously discussed.

Due to the physical location of the connection between the premier power facilities 505 and other places on the transnational grid, it may be that the system operator requires that the premier power facilities 505 impart a certain amount of reactive power onto the grid so as to manage the reactive power balance in the grid. Reactive power is closely connected to voltage control, which is applied to ensure satisfactory operation and distribution of electrical power across the grid. FIG. 10 is helpful to illustrate this point in that if the premier power facilities 505 has a cooperative arrangement with one of the priming sources $511_1$, $511_N$, the premier power facilities 505 may input its source of electricity onto the transmission lines at one point of the grid, which in turn may be sinked at one of the commercial loads for example. Thus, although the electrons placed on the grid at the location of the premier power facilities 505 occurs at a specific location, there are certain access rights that may be need to be required (as will be discussed below) in order for the premier power facilities 505 to work cooperatively with the priming source $511_1$ because the priming source $511_1$ will have different access rights than the premier power facilities 505.

While the DC-to-AC inverters as part of the premier power facilities are shown, it should also be recognized that the inverters may take the form of variable low-frequency AC or constant low-frequency AC output from the collection and transmission grid 101. The frequency with which the inverters operate may be controlled to either operate at 50 Hz or 60 Hz AC, for example.

The components of the co-active converter located between the collection transmission grid 1001 and the AC link to the power grid may include several variations. The various embodiments that form the co-active converter includes at least one static or rotating converter from the following items:

1. A frequency converter that converts from DC to a standard frequency such as fixed 50 Hz or 60 Hz AC,
2. variable low-frequency AC to frequency standard AC,
3. frequency converter from constant low-frequency AC to frequency standard AC,
4. rotating converter supplying reactive and/or active power to frequency standard AC, or
5. a power transformer for voltage adaptation and for adjusting short circuit level where the frequency converter is preferably a static converter while a rotating converter is preferably a rotating electric machine that acts as a reactive compensator and optionally acts as an electric generator driven by a prime mover. The rotating electric machine may be either an AC shunt machine alone or the combination of an AC shunt machine and a series (e.g., connected as a series link in one of the power grid lines connected to the actual substation) AC machine as described in Patent Cooperation Treaty Publication PCT/EP 98/007744, the entire contents of which being incorporated herein by reference.

The rotating electric machine is able to perform the functions of providing start-up power for the power grid after major faults;

partly or wholly add active electric power that "primes" the wind power;

partly or wholly supplying reactive power to the power grid and optionally to the frequency converter which assists in priming the power and reducing the harmonic pollution from the frequency converter itself.

In one mode of operation the processor 500 controls the xM to produce priming energy that is added to the composite output from the various wind turbine devices that feed the collection and transmission grid 101. The co-active converter provides supplementary power to that provided from the wind turbine facility when the processor 500 determines that output from the wind turbine facility is insufficient to maintain the required output voltage or frequency. Visually, this priming energy may be considered to be the equivalent of the cooperation between the hydroelectric power and the premier wind power shown in FIG. 9. Moreover, the power provided by the xM will supplement the output from the wind power resources so as to provide a guaranteed level of service that permits the operators of wind turbine facilities to enter into forward contracts. Alternatively, the combination of wind generated electric power that is supplemented with the priming power from the xM, may be used in combination with a hydroelectric power so as to be able to offer for sale "hybrid" power units, at least a portion of which include electrical power generated from wind farm, having a premier power facility.

Functional features of the co-active converter aside from providing supplemental power also include providing a source of reactive power, suppressing harmonics (perhaps by way of a PWM control for an actively switched inverter), provisions for providing short circuit power in the event of a fault in the transmission grid, steady state symmetry, and optionally providing short term or continuous active power from the prime mover which is preferably adjusted using a power transformer. Other features describing the reactive power control by using a constant frequency machine as a motor or a generator is described in PCT Application PCT/SE 00/00724, filed Apr. 17, 2000, and a rotating system for providing power stabilization is described in PCT/SE 00/00781, filed Apr. 30, 1999, the entire of contents of each of which being incorporated herein by reference.

With regard to providing supplemental grid protection systems, one technique is to provide a system that is able to make use of time stamped quantities, as well as quantities derived therefrom as a base for protection decisions. This may be accomplished with a protection system that uses at least three system protection terminals that are introduced as suitable locations in the electric power system. The system protection terminals are interconnected by a communication system, using substantially dedicated communications resources. At least two of the system protection terminals are equipped to collect measurement signals associated with characteristics of the power system at that particular location. The measurements preferably include complex AC quantities and stability indicators. The signals are processed and data related to the measurements are spread on the dedicated communication resource to the other system protection terminals. At least two of the terminals are equipped to evaluate the condition of the local part of the power network and if necessary provide control signals to the power system units. The evaluation is based on selected parts of the data available on the communication resource, locally available data and/or externally entered data. The system protection terminals include memory for storing data and so the data provides a near history of system information as well as the older measurements. Each system protection terminal has access to at least two communication links of the communications system. Each system protection terminal includes a processor and communication mechanism, as well as a local database. This technique is described more fully in commonly owned, co-pending U.S. patent application serial No. (TBD), entitled "System Protection Scheme", filed in the US on Aug. 31, 2000, and also filed in Sweden on May 31, 2000 as application no. 0002050-3, each application having inventors L of and Gertmar in common with the present document (with the addition of Karlsson in the US application and Swedish application), the entire contents of which being incorporated herein by reference.

Power system analysis and protection have always developed interactively. Since the beginning of the electrification era, equipment protection has been very important, in order not to destroy the components in the power system in case of faults. Today the electric supply is so important to the entire society and the cost of interruptions so high that large efforts have to be made in order to keep up the electric power supply and mitigate wide area disturbances. Protective actions might therefore have to be taken, even in situations where no power system equipment is subject to be immediately damaged. One therefore often distinguishes between unit or equipment protection on one side and system protection on the other side. System Protection Scheme (SPS) is the common name used when the focus for the protection is on the power system supply capability rather than on a specific equipment. SPS was earlier the acronym for Special Protection Scheme, also known as Remedial Action Scheme (RAS), with basically the same meaning as System Protection Scheme is today. The word special is nowadays replaced by system, since it is more relevant to describe this type of protection.

A System Protection Scheme (SPS) or Remedial Action Scheme (RAS) is designed to detect abnormal system conditions and take predetermined, corrective action (other than the isolation of faulted elements) to preserve system integrity and provide acceptable system performance. SPS actions, include among others, changes in load (e.g. load shedding), generation, or system configuration to maintain system stability, acceptable voltages or power flows. SPS are preferably local equipment coordinated by overall system studies. Many SPS, however, rely on system-wide communication.

Transmission devices designed to provide dynamic control of electric system behaviour, which typically involve feedback control mechanisms using power electronics to achieve the desired electric system dynamic response, during normal operation conditions, must not be considered as SPS but instead as transmission control devices. Examples of such equipment and devices include: static var compensators, power system stabilisers, active or reactive power flow controllers and reactive power compensation. The word control means continuous action during normal conditions on the controlled equipment. Emergency control involves other control actions, (usually included in the main controller, but out of operation under normal situations), that handle the operation in abnormal situations. Shift of control mode from normal operation to emergency control can be classified as an SPS, e.g. normal HVDC control to Emergency Power Control for fast power change.

The processor of FIG. 11 may be used to perform a communications transport function for interfacing with different applications as part of a stacked protocol architecture. In such a configuration, the processor 500 performs signal creation, transmission and reception functions as a communications service to control applications that send data to the processor and receive data from the processor. Moreover, the processor 500 may be used to provide a wireless or wired communications function to any one of a variety of devices such as wind turbine facility 350, meteorlogic source/service 351, and control facility 353. Thus, the processor of FIG. 11 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

FIG. 11 illustrates a processor system 500 upon which an embodiment according to the present invention may be implemented. Of course the processor system 500 may also be implemented as a separate processor-based controller, different from the processor 500 (FIG. 5, or as a subcomponent of the processor in FIG. 5). The system 500 includes a bus 303 or other communication mechanism for communicating information, and a circuit-board based processor 305 coupled with the bus 303 for processing the information. The processor system 301 also includes a main memory 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, a main memory 307 may be used for storing temporary variables or other intermediate information during execution of instructions to be executed by the processor 305. The system 301 further includes a read only memory (ROM) 309 or other static storage device (e.g., programmable ROM (PROM), erasable PROM (EPROM), and electrically erasable PROM (EEPROM)) coupled to the bus 303 for storing static information and instructions for the processor 305. A storage device 311, such as a magnetic disk or optical disc, is provided and coupled to the bus 303 for storing information and instructions.

The processor system 301 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 301 may additionally include a compact disc reader, a compact disc reader-writer unit, or a compact disc juke box, each of which may be connected to the same device bus or another device bus.

The processor system 500 may be coupled via the bus 303 to a display 313, such as a cathode ray tube (CRT) or liquid crystal display (LCD) or the like, for displaying information to a system user. The display 313 may be controlled by a display or graphics card. The processor system 301 includes input devices, such as a keyboard or keypad 315 and a cursor control 317, for communicating information and command selections to the processor 305.

The cursor control 317, for example, is a mouse, a trackball, or cursor direction keys for communicating direction information and command selections to the processor 305 and for controlling cursor movement on the display 313. In addition, a printer may provide printed listings of the data structures or any other data stored and/or generated by the processor 500.

The processor 500 performs a portion or all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor 500 includes at least one computer readable medium or memory programmed according to the teachings of the invention and for containing data structures, tables, records, or other data described herein. Stored on any one or on a combination of computer readable media, the present invention includes software for controlling the processor 500, for driving a device or devices for implementing the invention, and for enabling the processor 500 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The processor 500 is also configured to perform an investment management function. In one instance, the processor 500 serves as a mutual fund portfolio management mechanism that keeps track of contributions (money or potential energy assets) from different investors, that have a monetary value. The processor 500 then assigns shares to the respective investors based on the amount of their contributions. With the pooled contributions, the processor 500 then purchases a portfolio of power units, for delivery at different times. Power units purchased on behalf of the mutual fund may be offered for sale on the renewable exchange, or via bilateral contracts with other purchasers. Whether purchased prior to a delivery date, or delivered to the power grid at the appropriate delivery date, the processor 500 keeps track of remuneration received in return for relinquishing ownership of the power unit or delivering the power unit to the power grid. Subsequently, the processor 500 distributes the remuneration among the outstanding shares, such that each share has a market value thereof adjusted based on the revenue received from the sale or delivery of the power unit. Calculation of factors such as profits, losses, and tax liability from a portfolio or group of funds is known, for example, from U.S. Pat. No. 5,193,056, the content of which is incorporated herein by reference.

The processor 500 may also be used as a mechanism for helping to manage an investment portfolio of renewable power production facilities. As in the case above, where power units are bought and sold/delivered, investors also provide contributions and are assigned shares. However, the assets that are purchased are not power units, but rather the renewable power production facilities themselves. The capital acquired from the contributions is used to purchase a predetermined number of renewable power production facilities, and to operate the facilities. Power units produced from the renewable power production units are sold, stored in a virtual energy storage facility, or delivered as part of a delivery contract. Remuneration received for the power units is distributed (apportioned) amongst the outstanding shares.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The processor 500 also includes a communication interface 319 coupled to the bus 303. The communications interface 319 provides a two-way data communication coupling to a network link 321 that is connected to a communications network 323 such as a local network (LAN) or personal area network (PAN) 323. For example, the communication interface 319 may be a network interface card to attach to any packet switched enabled personal area network (PAN) 323. As another example, the communication interface 319 may be an asymmetrical digital subscriber line (ADSL) card, an integrated services digital network (ISDN) card, or a modem to provide a data communication connection to a corresponding type of communications line. The communications interface 319 may also include the hardware to provide a two-way wireless communications coupling other than a wireless coupling, or a hardwired coupling to the network link 321.

The network link 321 typically provides data communication through one or more networks to other data devices. For example, the network link 321 may provide a connection through a LAN to a host computer 325 or to data equipment operated by a service provider, which provides data communication services through an IP (Internet Protocol) network 327. Moreover, the network link 321 may provide a connection through a PAN 323 to a control device 353 facility that communicates with an electrical energy production facility 352 that provides power to the grid 357. The LAN/PAN communications network 323 and IP network 327 both use electrical, electromagnetic or optical signals that carry digital data streams. The signals through the various networks and the signals on the network link 321 and through the communication interface 319, which carry the digital data to and from the processor 500, are exemplary forms of carrier waves transporting the information. The processor 500 can transmit notifications and receive data, including program code, through the network(s), the network link 321 and the communication interface 319.

The processor 500 in the premier power facilities 505 thus controls the priming energy source, which is the prime mover and the xM in the example shown in FIG. 10 and/or external sources so as to supplement the output power from the wind turbines when a lull in wind activity prevents the wind turbines from generating a sufficient amount of output power. The processor 500 also controls start-up procedures where the prime mover may be used to excite the xM to produce sufficient power, thus reducing the possibility that a harmonic-rich transient is applied to the transnational grid. The output power from the premier power facilities 505 is monitored by the processor 500 which can coordinate activities between locally generated power and virtual energy storage facilities that may be used to supplement power output from the premier power facilities 505. Furthermore, the processor 505 also handles fault procedures so as to be considered by system operators as being on equal footing with power that is provided from these other sources. One such fault procedure is to be able to provide a sufficient amount of current to trip circuit breakers used for protecting the transnational grid. In one embodiment in order to provide a high short circuit power level, the active power from the prime mover may be adjusted by charging a top setting on a power transformer.

FIGS. 12–18 show different data structures for messages used in various methods described in flowcharts of FIGS. 20–33.

FIG. 12 is a data structure for a message format for a signal that is sent from a wind turbine operator from the processor in the premier power facilities 505 when offering a predetermined amount of power as a power unit at a predetermined period of time. The offer is made, in reference to FIG. 5, on a renewable exchange 507. As previously discussed with regard to Nord Pool, forward contract bids are provided for units of power at some time in the future, for predetermined levels and for predetermined periods of time. The present message indicates the predetermined period of time and produces a power quantity in the single message as shown in FIG. 12, along with a statistical indicator, derived from meteorological data and past performance data so as to indicate a likelihood of actually providing that quantity of power. As previously discussed, with renewable energy sources such as wind power it is a stochastic process with regard to the actual amount of power that is produced, depending on the wind speed from time to time. The statistical indicator is provided by the meteorological data source/service 513, which either is in the form of data and then interpreted by the processor 500 so as to provide a statistical indicator, or alternatively, the data is provided on a wind farm-by-wind farm basis as a meteorological data service. In the present embodiment, the message is sent in the form of an Internet protocol message to the renewable power exchange 507.

The renewable power exchange is hosted on a secure Internet link, where a web interface is provided by the processor 500 addressing a URL over the Internet to the renewable power exchange web connection. The connection between the processor 500 and renewable power exchange 507, is known, as is described on pages 1–40, and 122-166 of Gralla, P., "How the Internet Works", Que, August 1999, ISBN 0-7897-2132-5, the entire contents of which being incorporated herein by reference. Furthermore, the link may be a secure link such as by way of a virtual private network and also may use encryption schemes so as to verify and authenticate different users who are authorized to use the system. Various safeguarding techniques including the use of fire walls, cryptography such as RSA cryptography and the like is found in pages 270–304 of Gralla. An operator of the processor 500 may receive continual bid streams from the renewable power exchange 507, by the renewable power exchange website downloading Java, Java Script or ActiveX files to the processor, so as to provide active content to the operator when considering bid and offer prices for particular renewable power units that are for sale. Furthermore, in one embodiment the processor 500 updates its message as shown in FIG. 12, to indicate that the meteorological data source/service 513 has updated the statistical indicator, thus increasing or decreasing the likelihood that the particular wind turbine would be able to produce a predetermined quantity of produced power.

FIG. 13 is another data structure for a message that is sent from the processor 500 or another market participant in the renewable power exchange 507, where a particular hybrid power unit is offered for sale for a particular power quantity (denomination), time period and offer price. The power unit may provide an indication that the type of power unit includes a "green" component, thus offering a premium over other types of power. The fields in the message shown in FIG. 13 include a power unit ID, quantity of power produced, time period and offer price. The type of power included in the power unit may include a primary component of wind power generated electricity, although supplemented or "guaranteed" by a virtual energy storage device in which the offerer of the power unit has a contractual agreement so as to be able to reliably provide the power if requested to do so or are contractually obligated to do so.

FIG. 14 is a data structure with fields of a message that is used by market participants in the renewable power exchange 507. The data fields include a power unit ID, quantity of produced power, time period and price. If the price equals the offer price, an agreement is made at the renewable power exchange 507 and both market participants (the offerer, as well as the seller of the power unit) are notified by way of E-mail (or other communication mechanism such as by the postal service or telephone) informing the parties that the agreement has been made. Once made, the purchaser is provided with the data regarding the sale and the offerer identifies the time period in which the offerer is required to deliver the power to the grid. After the offerer indicates that the power has been delivered according to the contract, the wind power provider provides a reporting message to the original purchaser of the wind power unit so that the purchaser is made aware of the fact that the contractual obligation has been met.

The data structure shown in FIG. 15 is like that shown in FIGS. 13 and 14, although it includes the actual sale price of the power unit that has been guaranteed by way of a virtual energy storage facility. One would expect that the price offered for a guaranteed power unit is greater than that for a power unit including a green power component that is not guaranteed.

FIG. 16 is a data structure corresponding with a message indicating that the guaranteed power unit was in fact delivered and includes data fields including the quantity of delivered power as well as confirmation of delivery.

FIG. 17 is a data structure of a digital message provided by the processor 500 which identifies an amount by which a voltage is below a predetermined threshold to be output by a wind farm operator (such as in the case of FIG. 10). In association with that amount of voltage threshold a corresponding tap setting or voltage control mechanism for the xM or transformer mechanism is stored in association therewith. Accordingly, when the processor 500 indicates that the output voltage has dropped below a predetermined threshold, a corresponding control signal may be formed by identifying the corresponding tap setting that may be needed to increase the voltage compensation by way of the xM or transformer, or other corrective action such as by exciting the xM so as to supplement the power to continue to make the power premium power in the event of a wind lull.

FIG. 18 is a data structure for a message sent between the processor 500 and one or more of the priming sources $511_1$ or $511_N$ as shown in FIG. 10. The purpose of this message is to indicate to the priming sources $511_1$, $511_N$ that the wind turbines have in fact produced a predetermined amount of power and identify the time period over which the power was provided. In this way, the priming sources $511_1$ and $511_N$ may for planning purposes be able to determine the level of output power that they need to produce in order to comply with budgeting optimization purposes.

Figure 19:
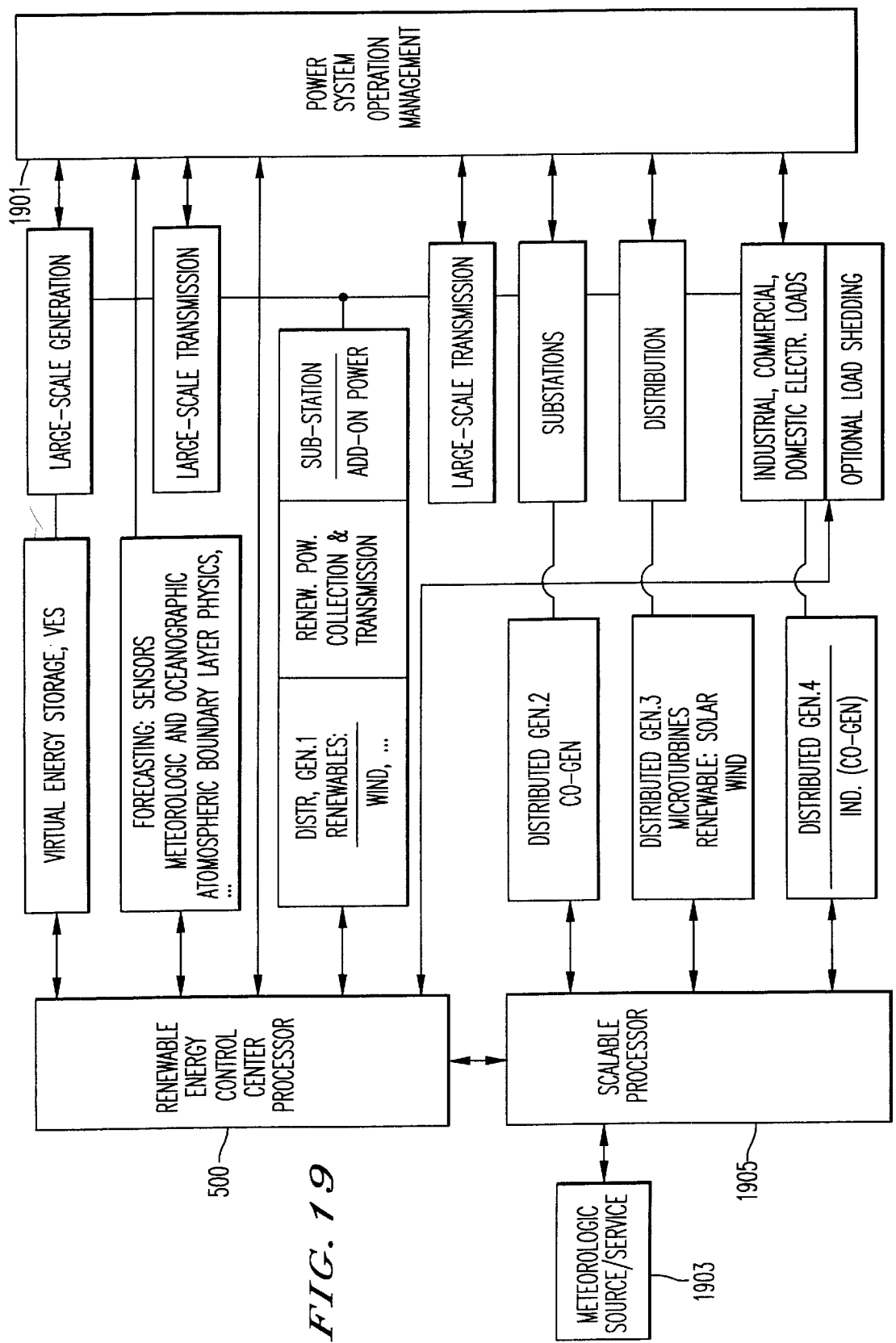
FIG. 19 is a block diagram related to FIG. 6, although showing how the system according to the present invention may be scaled to accommodate other distributed generation facilities.

FIG. 19 is a block diagram like that shown in FIG. 6 although it includes additional features to show that the system according to the present invention is scalable to incorporate control operations for a number of different generation facilities. For example, in FIG. 19 a scalable processor 1905 performs similar functions to that provided by control center processor 500 and in fact may be parallel processor, or a redundant processor so as to support the operations performed by the control center processor 500. Like with the control center processor 500, the scalable processor 1905 receives meteorological source and service information from a mechanism 1903 and uses the same to coordinate with renewable energy control center processor 500 controlling the distribution and coordination of distributed assets from multiple generation facilities, which in turn feed power to substations, distribution grids and specific industrial commercial loads as shown. The power system operation management mechanism 1901 provides communications to the scalable processor 1905 by way of proprietary and/or virtual private network, and secure communications by way of the renewable energy control center processor 500. A local bus interconnects the scalable processor 1905 with the control center processor 500 as shown.

Figure 20:
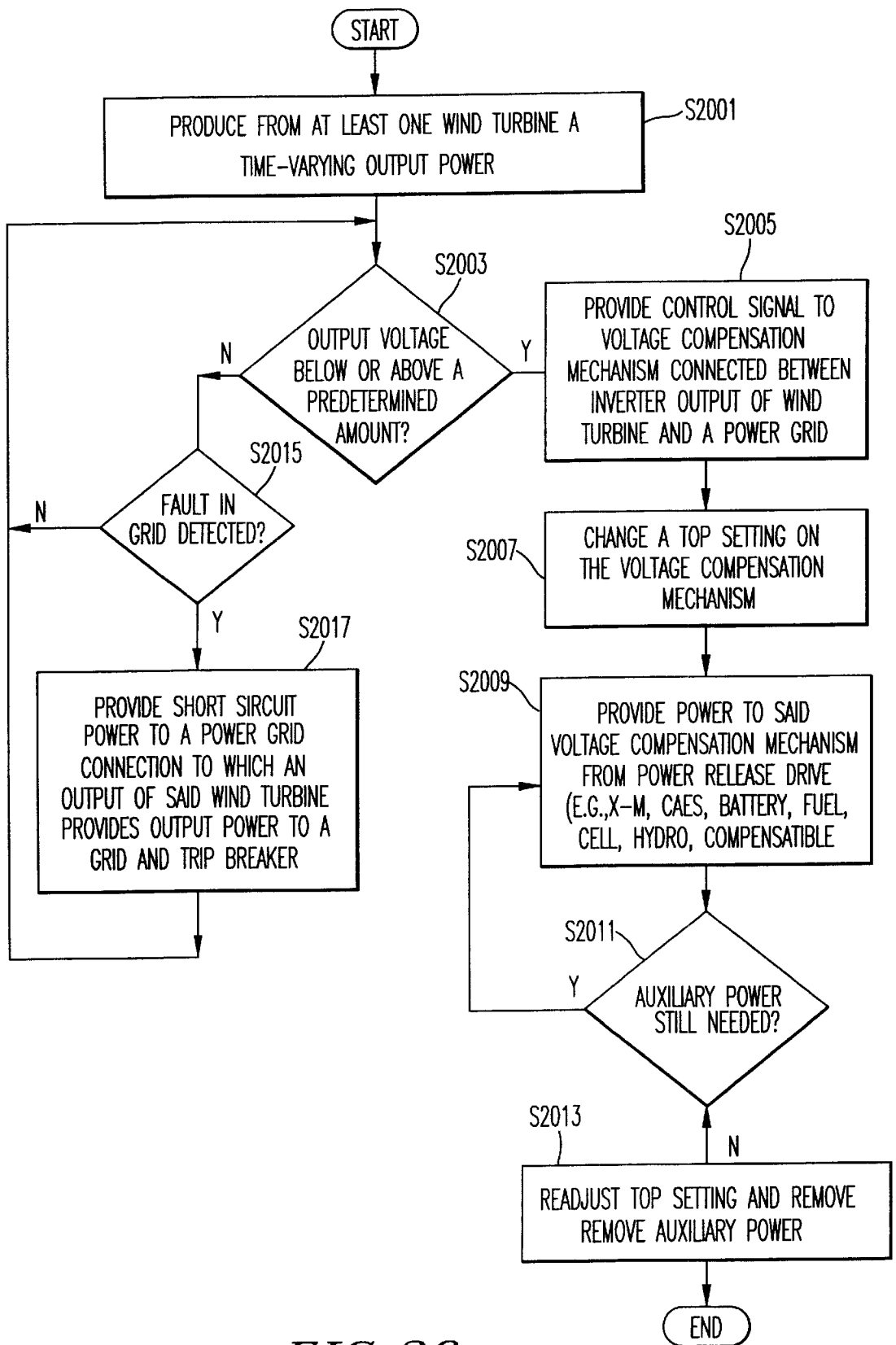
FIG. 20 is a flow chart of a method for how to convert electricity generated from wind power into "premier power" according to the present invention.

FIG. 20 is a flowchart describing a method for creating premier power from a wind turbine facility according to the present invention. The process begins in step S2001 where a wind turbine electric power production facility produces a time-varying output power. The process then proceeds to step S2001 where the output voltage (or alternatively the reactive power) can be determined to be above or below a predetermined level. This voltage determination may be made over a predetermined period of time such as one second, one minute, 10 minutes or greater. If the response to the inquiry in step S2003 is affirmative, the process proceeds to step S2005 where the control center processor provides a control signal to the voltage compensation mechanism that is connected between the inverter output of the wind turbine facility and the power grid. The process then proceeds to step S2007 where the change in a tap setting of the voltage compensation mechanism is actuated, or additional power is generated perhaps from the xM device in an alternative embodiment. A further alternative embodiment is to use energy that has been stored at a virtual energy storage mechanism such as a hydroplant that has relationship with the wind power provider. In this way, the composite power produced from the wind power facility and the virtual energy storage facility is made to provide the voltage necessary to support contractual requirements.

The process proceeds to step S2009 which provides power to the voltage compensation mechanism from the power release device which includes either the xM, compressed air system (CAES), battery, fuel cell, hydro or some other combustible fuel source. The process then proceeds to step S2011 where a determination is made regarding whether auxiliary power is still required. If the response to the inquiry in step S2011 is affirmative, the process returns to step S2009 where additional power is released. If the response to the inquiry in step S2011 is negative, the process proceeds to step S2013 where the process implemented in step S2007 or S2009 is removed so that all the power is provided by the wind turbine generation unit. Subsequently the process ends.

If the response to the inquiry in step S2003 is negative, the process proceeds to step S2015 where a determination is made regarding whether a fault is detected in the power grid. If the response to the inquiry in step S2015 is negative, the process returns to step S2003. However, if the response to the inquiry in step S2015 is affirmative, the process proceeds to step S2017 where the premier power facility produces a sufficient short circuit power to the grid connection so as to provide sufficient current to trip a circuit breaker, thus disconnecting the structure from the power grid and preventing any damage. After step S2017, the process returns to step S2003.

Figure 21A:
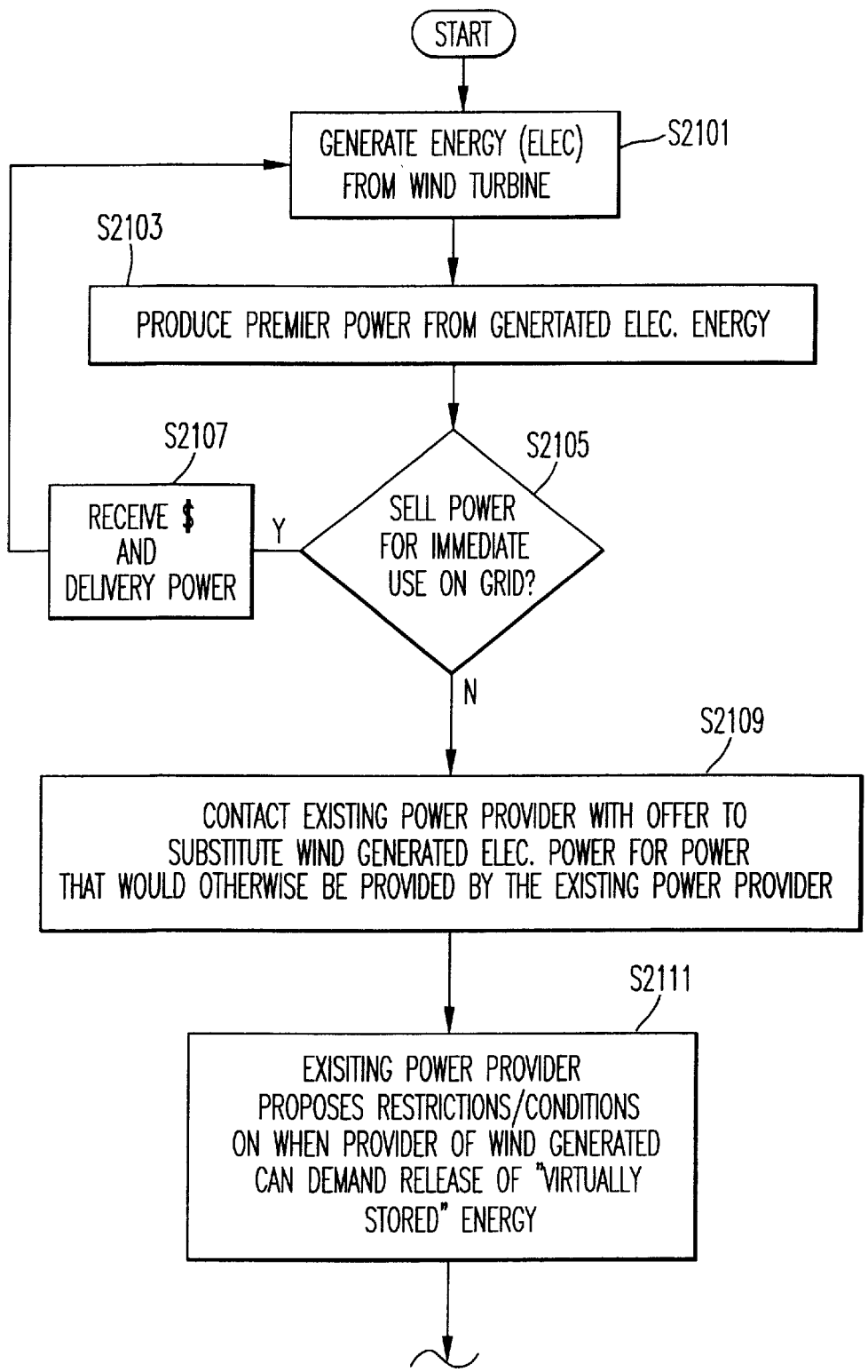
FIG. 21 is a flow chart of a method for showing how to virtually store electrical power generated from a wind production facility according to the present invention.
Figure 21B:
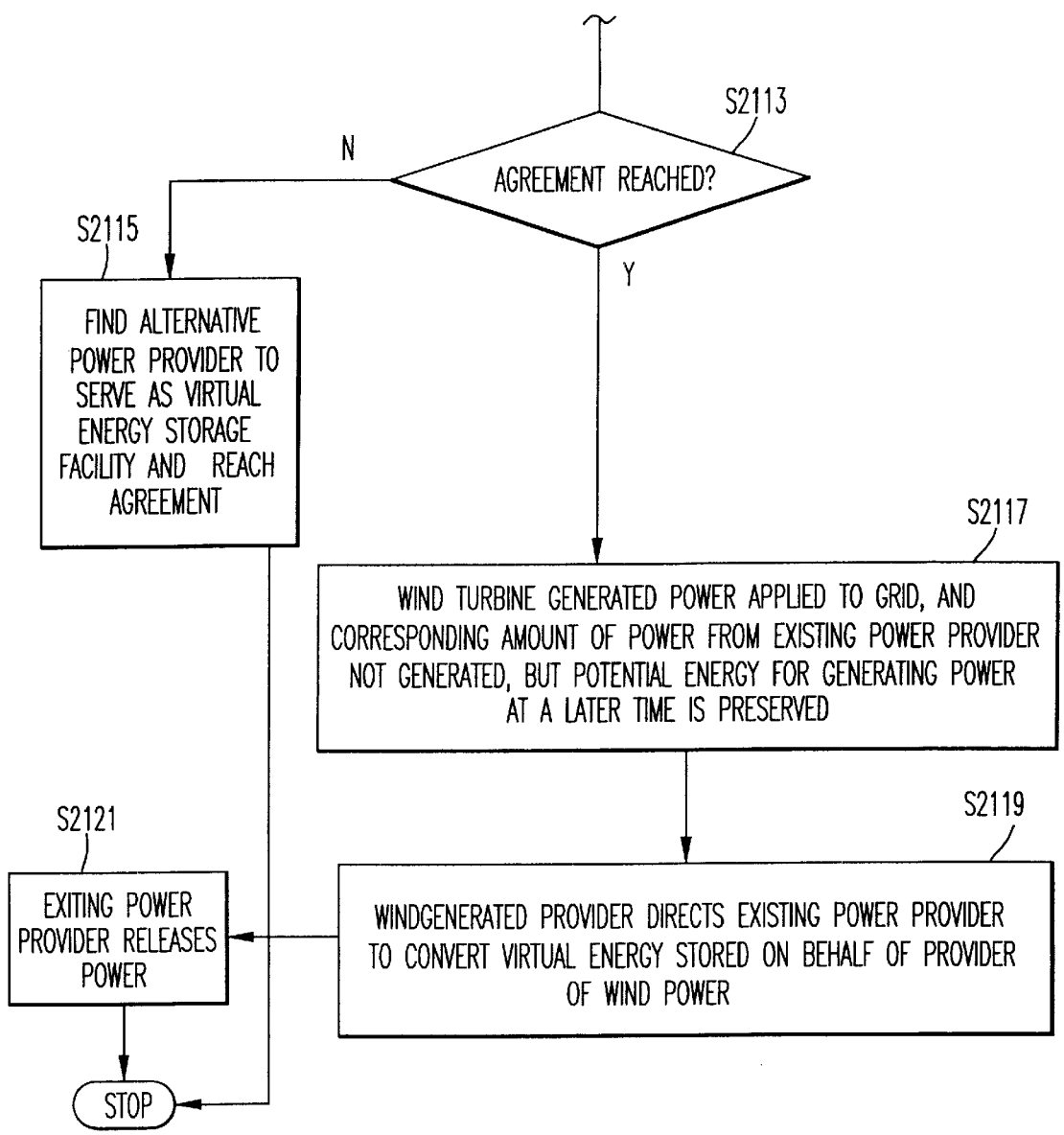

FIG. 21 is a flowchart showing a method for virtually storing electric power generated from wind turbines. The process begins in step S2101 where the electric energy is generated from a wind turbine facility (such as a single wind turbine facility or a farm of wind turbines). The process then proceeds to step S2103 where premier power is produced from the generated electric energy. The process then proceeds to step S2015 where an inquiry is made regarding whether the wind operator opts to sell power for immediate use on the grid. If the response to the inquiry in step S2105 is affirmative, the process proceeds to step S2107 where the operator delivers the power and receives money from the system operator for providing that power. The process then returns to step S2101. However, if the response to the inquiry in step S2105 is affirmative, the process proceeds to step S2109. In step S2109 the operator of the wind turbine facility contacts an existing power provider with an offer to substitute wind generated electric power for power that would otherwise be provided to the existing power provider.

After the wind turbine operator has contacted the existing power provider, the process proceeds to step S2111 where the existing power provider proposed restrictions and conditions on when the provider of the wind generated power can demand a release of "virtually stored" energy. The reason why the existing power provider would pose restrictions on the release of this energy is that the existing power provider has made its own optimization plan for reserved energy sources for release at predetermined times during the year. For example, an existing power provider would in all likelihood not be willing to allow a wind turbine operator to withdraw the last 10% of the hydro reserve if the existing power provider had unforeseen unforecasted and unplanned water reserves at that particular time during the year.

After step S2111 the process then proceeds to step S2113 where an inquiry is made regarding whether the existing power provider and the operator of the wind turbine facility reach agreement. If the response to the inquiry in step S2113 is negative, the process proceeds to step S2115 where the wind turbine operator finds an alternative power provider to serve as a virtual energy storage facility. Once agreement is reached, the process ends.

If the response to the inquiry in step S2113 is affirmative, the process proceeds to step S2117 where the wind turbine generated power is applied to the grid and a corresponding amount of power from existing power provider is not generated at that particular time. Rather, the potential or chemical energy stored in a virtual energy storage plant for generating power at a later time is preserved, which in the case of the hydroelectric plant, would mean that the water that would otherwise be used to generate a predetermined amount of power would not be used to turn a hydro turbine. After step S2117, the process proceeds to step S2119 where the wind generated power provider directs an existing power provider to convert the virtual energy stored on behalf of the provider of the wind power into electrical energy. The process then proceeds to step S2121 where the existing power provider releases the virtual energy so as to produce requisite power for meeting the wind turbine operator's energy requirements, and then the process ends.

Figure 22:
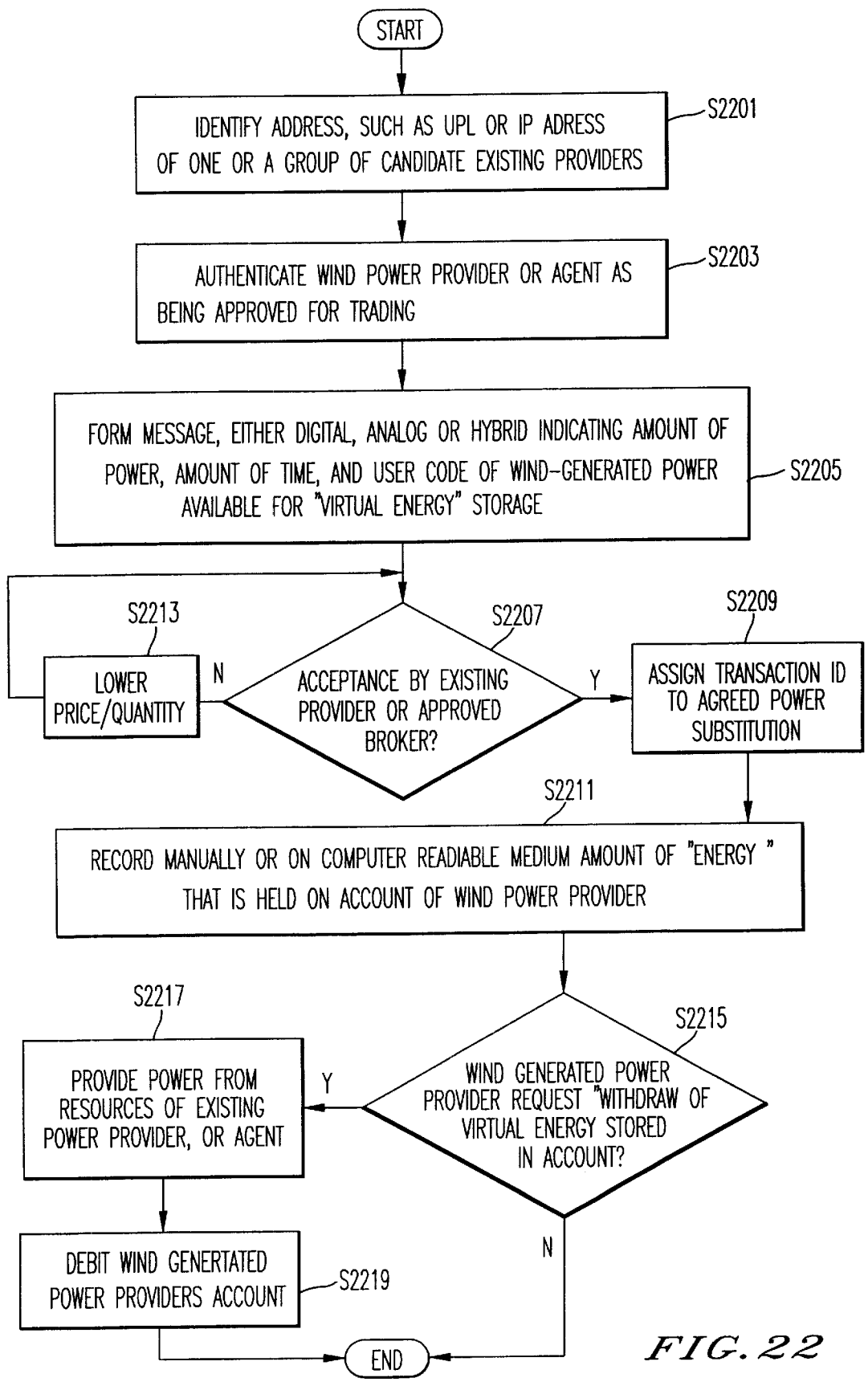
FIG. 22 is a flow chart of an Internet-based secure forum for providing virtual energy storage coordination and provide a mechanism for "contracting" to combine different types of energy sources so as to provide a hybrid unit of electrical power.

FIG. 22 is a flowchart of a method employed in an Internet-based secure form for providing virtual energy storage trading of renewable energy resources. The process begins in step S2001 where an administrator, or owner, of a participant in a renewable trading market identifies an address such as a URL or IP address of one or a group of candidate existing providers. Alternatively, the address identified may be that of a URL of a website hosted by a renewable power exchange website that may be hosted by the control center processor 500 (FIG. 5). The process then proceeds to step S2203 where the operator of the renewable power exchange (automatically or manually) determines whether the wind provider or agent is approved for offering for sale or even trading on the renewable power exchange. Only predetermined entities who are licensed or otherwise agreed upon as being viable trading entities are authorized to trade on the renewable power exchange 507. The process then proceeds after authentication to step S2205 where a message is formed, either digitally, analog or a hybrid message (digital and analog or some hybrid combination) so as to indicate the amount of power, amount of time and user code of the wind generated power system that requests "virtual energy" storage. The process then proceeds to step S2207 where an inquiry is made regarding whether there is an acceptance of the virtual storage from existing providers or approved brokers. If the response to the inquiry in step S2207 is negative, the process proceeds to step S2213 where the wind generated power provider can lower the asking price in step S2213 and the process returns to step S2207. After acceptance the process proceeds to step S2209 where the transaction is assigned by the renewable power exchange mechanism a transaction ID to the agreed upon power substitution. Once again, this power substitution is an agreement between the wind power provider and the virtual energy storage provider for the wind power provider to provide a predetermined amount of energy to the power grid in agreement at a certain time, in substitution for an obligation provided by the existing provider, who has a present obligation to provide a predetermined amount of power to the power grid. After assigning the transaction ID, the process proceeds to step S2211 where a record is recorded manually on a computer readable medium that indicates an amount of "energy" that is held on account of the wind power provider. Subsequently the process proceeds to step S2215 where the wind power provider requests to "withdraw" a certain amount of the virtual energy that is stored on the account of the wind power provider. If the response to the inquiry in step S2215 is negative, the process ends. On the other hand, if this response to the inquiry in step S2215 is affirmative, the process proceeds to step S2217 where the existing power provider or agent actually delivers the power to the grid and then in step S2219 debits the wind generated power provider's account held in memory and subsequently the process ends.

Figure 23:
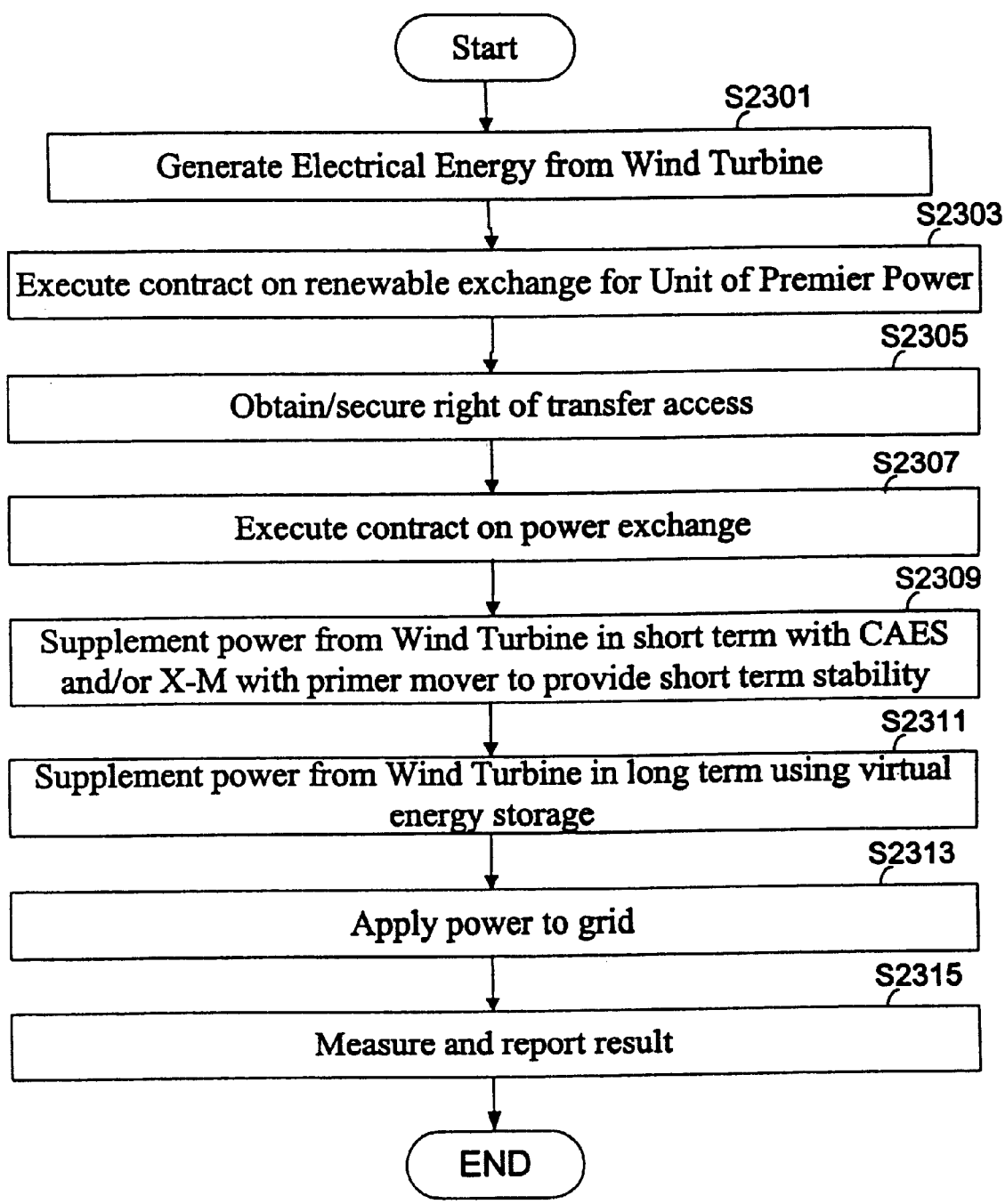
FIG. 23 is a flow chart showing how premier power is applied to a power grid after first securing a contract on a renewable exchange.

FIG. 23 is a flowchart describing a process for priming power before delivery to the power grid. The process begins in step S2301 where the electrical power is generated from a wind turbine energy generation facility. The process then proceeds to step 2303 where an operator of the wind turbine facility executes a contract on a renewables exchange for delivering a unit of premier power, which is handled on an exchange basis and on delivery basis just as if it were from another type of electrical power generation facility. The process then proceeds to step S2305 where the wind turbine provider obtains or secures rights of transfer access for delivering electric power to the grid in the region that is required by the purchaser of the premier power unit. It should be noted that the unit of premier power may include a unit of power that at least includes a portion is generated from a wind turbine facility, and may include additional power from a local xM device, or a virtual energy storage device. The process then proceeds to step S2307 where the seller of the premier power unit executes a contract on a power exchange with a purchaser of the unit of premier power.

Subsequently the process proceeds to step S2309 where the wind turbine operator, by way of the processor, controls an actuation of supplementing the power generated by the wind turbine device by using short-term energy from a compressed air storage device and/or with a xM device having a prime mover so as to provide short-term stability. The process then proceeds to step S2311, where for a longer term usage the power from the wind turbine operation is supplemented in a longer duration using virtual energy storage that has been accumulated on behalf of the wind turbine operator. Alternatively, the wind turbine operator may contract for purchasing power from a virtual energy storage facility without having included an existing account with that service provider, but rather just purchases the power so as to supplement the wind turbine generated power. The process then proceeds to step S2113 where the power provided from the premier power provider is supplied to the grid, and perhaps as supplemented by the virtual energy storage facility. Subsequently in step S2315 the amount of power that is provided to the grid from the wind storage generation facility is measured and reported so that an accurate accounting may be made of the energy. Subsequently, the process ends.

Figure 24:
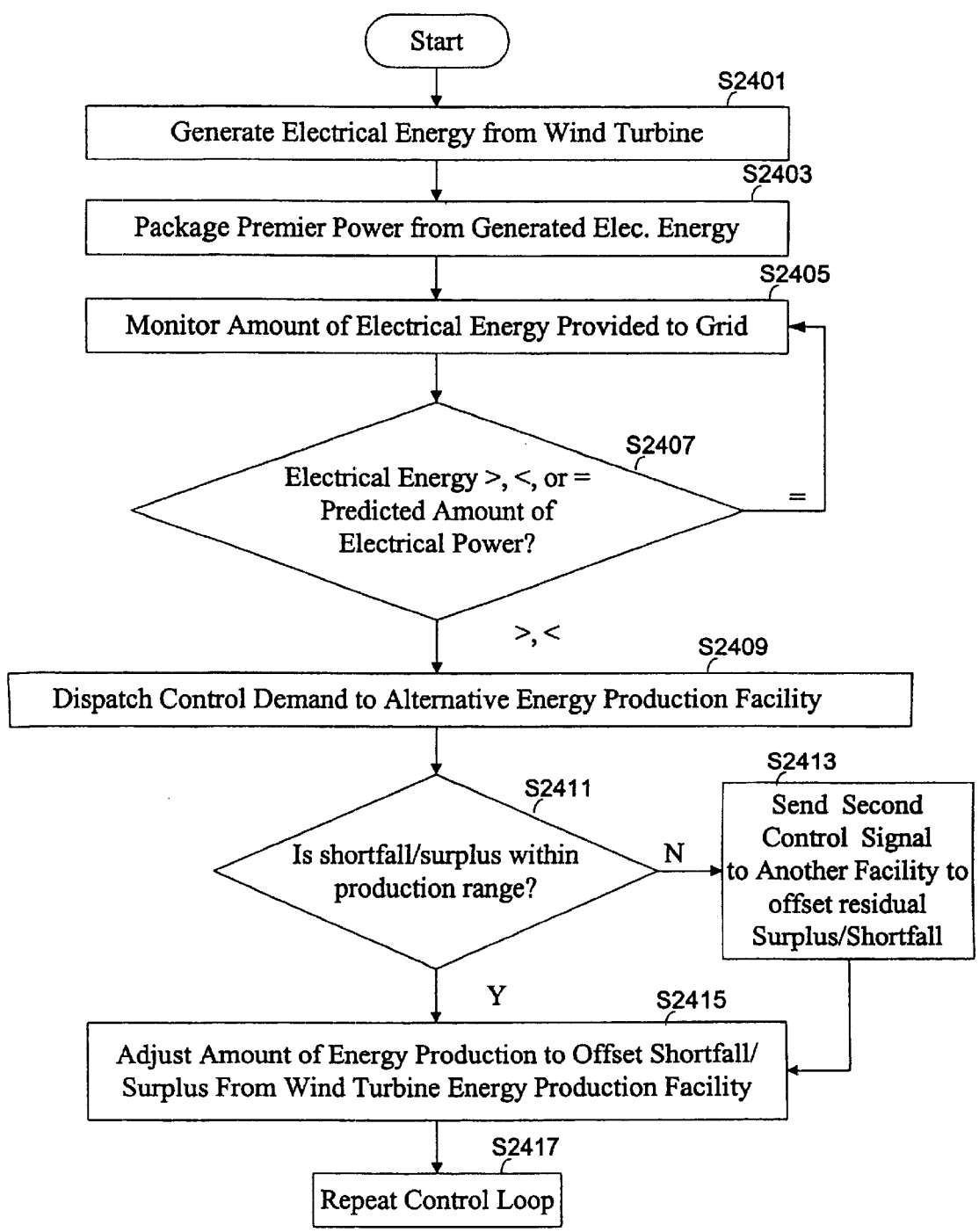
FIG. 24 is a flow chart showing how coordination is performed between a wind power production facility and a virtual energy storage facility according to the present invention.

FIG. 24 is a flowchart describing a process for linking a wind turbine electrical power production facility with an alternative energy production facility so that shortfalls or surpluses provided by the wind turbine may be compensated for directly in real time with the alternative energy production facility. A description of such an operation may exist like that shown in FIG. 5 where the premier power facility 505 uses the control processor 500 to coordinate with hydroelectric plant 511 or even thermoelectric plant 515. The process begins in step S2401 where the electric power is generated from the wind turbine based production facility. The process then proceeds to step S2403 where the power is converted to premier power, and then the process proceeds to step S2405 where an amount of electrical power provided to the grid is monitored.

In step S2407 an inquiry is made regarding whether the electrical power as monitored is greater than, less than, or equal to a predicted amount of electrical power. If the response to the inquiry in step S2407 is equal the process returns to step S2405 as part of a control loop. However, if the response to the inquiry in step S2407 indicates that the electrical power is above or below a predetermined electric power level, the process continues to step S2409 where a control message is sent to the alternative energy production facility. An inquiry is made in step S2411 so as to identify whether the shortfall or surplus is within the production dynamic range of the alternative energy production facility. For example, it may be that the requested amount of power from the wind turbine production facility is greater than that which can be produced by the alternative energy production facility. If the shortfall or surplus is not within the production range, then the process proceeds to step S2413 where a second control signal is sent to yet another facility so as to offset the residual surplus, or shortfall, that was outside the production range of the alternative energy production facility. Subsequently, the process proceeds to step S2415, which is also the next process step if the inquiry in step S2411 is determined to be affirmative. In step S2415 the amount of energy production is adjusted so as to offset the shortfall/surplus from the wind turbine energy production facility and then the process for the control loop is repeated in step S2417.

In order to implement the control loop in the process of FIG. 24, the control center processor 500 coordinates activities by way of a dedicated link between the premier power facilities 505 and the hydroelectric plant 511 would include a similar processor. For example the hydroelectric plant 511 would include a control processor, that upon indication from the premier power facilities that the output power production level is below a certain level, the message from the control center processor 500 is sent to the hydroelectric plant 511 so that the processor contained therein can adjust the flow gates in the hydroelectric plant. This control is done in real time so that the an accurate balance is made between the hydroelectric plant 511 and the premier power facilities 505. Thus, the aggregate output power production between the two facilities equals the contractually obligated power production requirements for the two facilities, albeit perhaps not in the same proportions that the two facilities had originally contracted to provide. In this way, the hydroelectric plant 511 will receive some leeway to use its reserved hydro assets. Current optimization programs are based on meteorological predictions for relatively long time periods, based on the seasonal use of hydro resources. Thus, adjustments may be needed if the hydro resources are either used at a lesser rate than what was originally planned for, or at an increase rate depending on the demands and predictions of how much electrical power is produced by the wind turbine facility with which it has a contractual agreement.

It should be noted that the process employed in FIG. 24 need not be performed by separately owned entities, but rather can be implemented by a single power production facility that incorporates both a renewable energy source such as a wind turbine energy production facility or solar energy based electrical production facility in cooperation with the hydroelectricity plant or the like.

Figure 25:
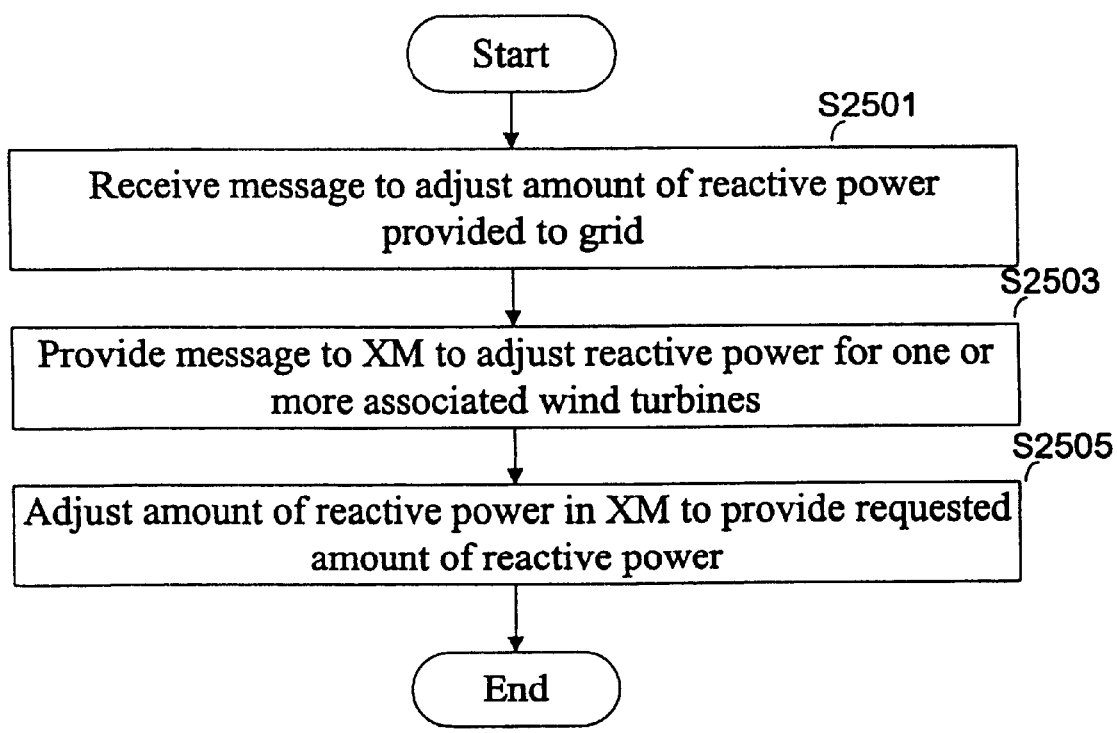
FIG. 25 is a flow chart showing how messages are exchanged from a processor to a rotating machine compensator as part of a cogenerative facility according to the present invention.

FIG. 25 is a flowchart showing how the control center processor 500 is used to control an amount of reactive power provided from the xM device (see, e.g., FIG. 10) or other compensation device employed in the co-active converter so as to adjust an amount of reactive power requested by a system operator. The process begins in step S2501 where a message or request is received by a system operator to adjust an amount of reactive power provided to the grid. The process then proceeds to step S2503 where the processor generates a control command to be supplied to the xM device (or other compensation device employed by the co-active generator) so as to adjust an amount of reactive power for one or more of associated wind turbines that are coupled to the co-active generator that employs the xM device, or other compensator. The process then proceeds to step S2505 where an amount of reactive power in the xM device is provided based on the requested amount of reactive power. Subsequently the process ends.

Figure 26:
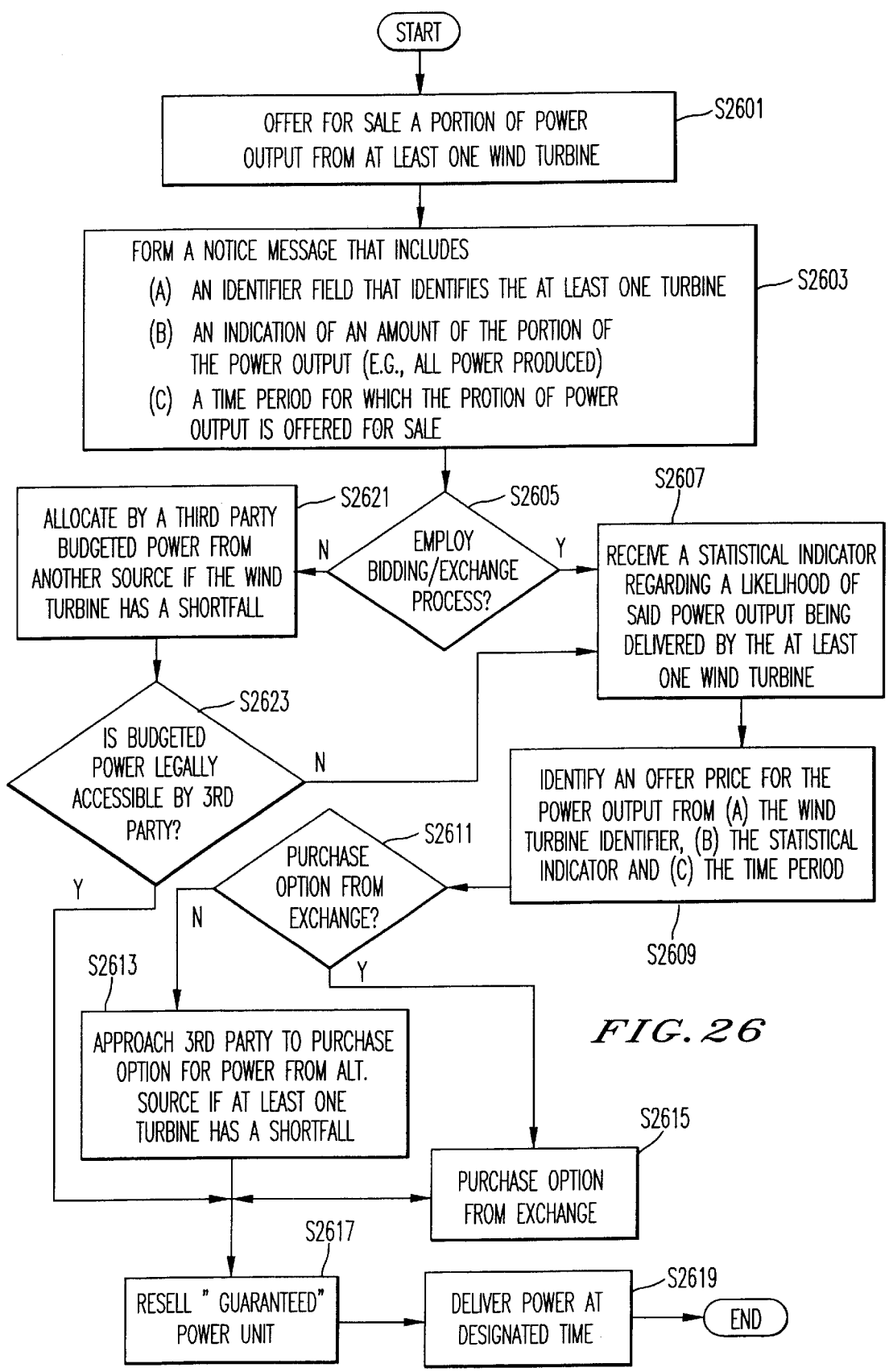
FIG. 26 is a flow chart of a method for guaranteeing a "power unit" that includes at least a portion of wind power generated electrical power according to the present invention.

FIG. 26 is a flowchart of a method for guaranteeing a "power unit", at least a fraction of which is generated from a wind turbine electrical power production facility. The process begins in step S2601 where an operator or trader offers for sale a unit of power to be provided by a wind turbine electrical power production facility in a virtual market. The process proceeds to step S2603 where the processor 500 forms a notice message that includes an identifier field that identifies the wind turbine facility, an indication of an amount of the portion of the power output (e.g., all the power produced), and a time period for which the portion of power output is offered for sale. A data structure for this message format is seen in FIG. 18 for example.

Once the notice message is formed, the process proceeds to step S2605 when an inquiry is made regarding whether a bidding exchange process will be used for selling the unit of power. If the response to the inquiry is negative, the process proceeds to step S2621 where a third party allocates a budgeted amount of power from another source if the wind turbine has a shortfall so as to compensate for the shortfall from that wind power facility. The process then proceeds to step S2623 where an inquiry is made regarding whether the budgeted amount of power is legally accessible by the third party. If the response to the inquiry is negative, the process proceeds to step 2607 as will be discussed below. However, if the response to the inquiry in step S2623 is affirmative, the process proceeds to step S2617 where the unit of wind turbine generated electric power is resold as a "guaranteed" power unit. The "guaranteed" power unit is a hybrid unit of power that at least includes wind generated electric power that if is insufficient at the time of delivery, is supplemented with a contractual obligation for energy to be supplied from another power production facility. The process then proceeds to step S2619 where the required unit of power is delivered at a designated time before the process ends.

If the response to the inquiry in step S2605 is affirmative, the process proceeds to step S2607 where the control center processor 500 generates a statistical indicator regarding a likelihood that the power output from the wind turbine facility will be deliverable at the appointed time. This statistical indicator is included in a message having data fields like that shown in FIG. 12. The process then proceeds to step S2609 where an offer price is identified for the power output from the wind turbine identifier, the statistical indicator and the time period indicated in the message. The process then proceeds to step S2611 where an inquiry is made regarding whether the purchaser of the power from the wind turbine facility wishes to purchase an option from the exchange so as to guarantee the delivery of the power unit at the appointed period of time even if the wind turbine generation facility cannot produce the entire unit of power. If the response to the inquiry in step S2611 the process proceeds to step S2613 where a third party is approached to enable the purchase of an option for power from an alternative source if the wind turbine in fact has a shortfall at the time of delivery. Subsequently, the process proceeds to steps S2617 and S2619 as previously discussed. However, if the response to the inquiry in step S2611 is affirmative, the process proceeds to step S2615 or an option is purchased from the exchange. Subsequently, the process ends after performing steps S2617 and S2619 as previously discussed.

Figure 27A:
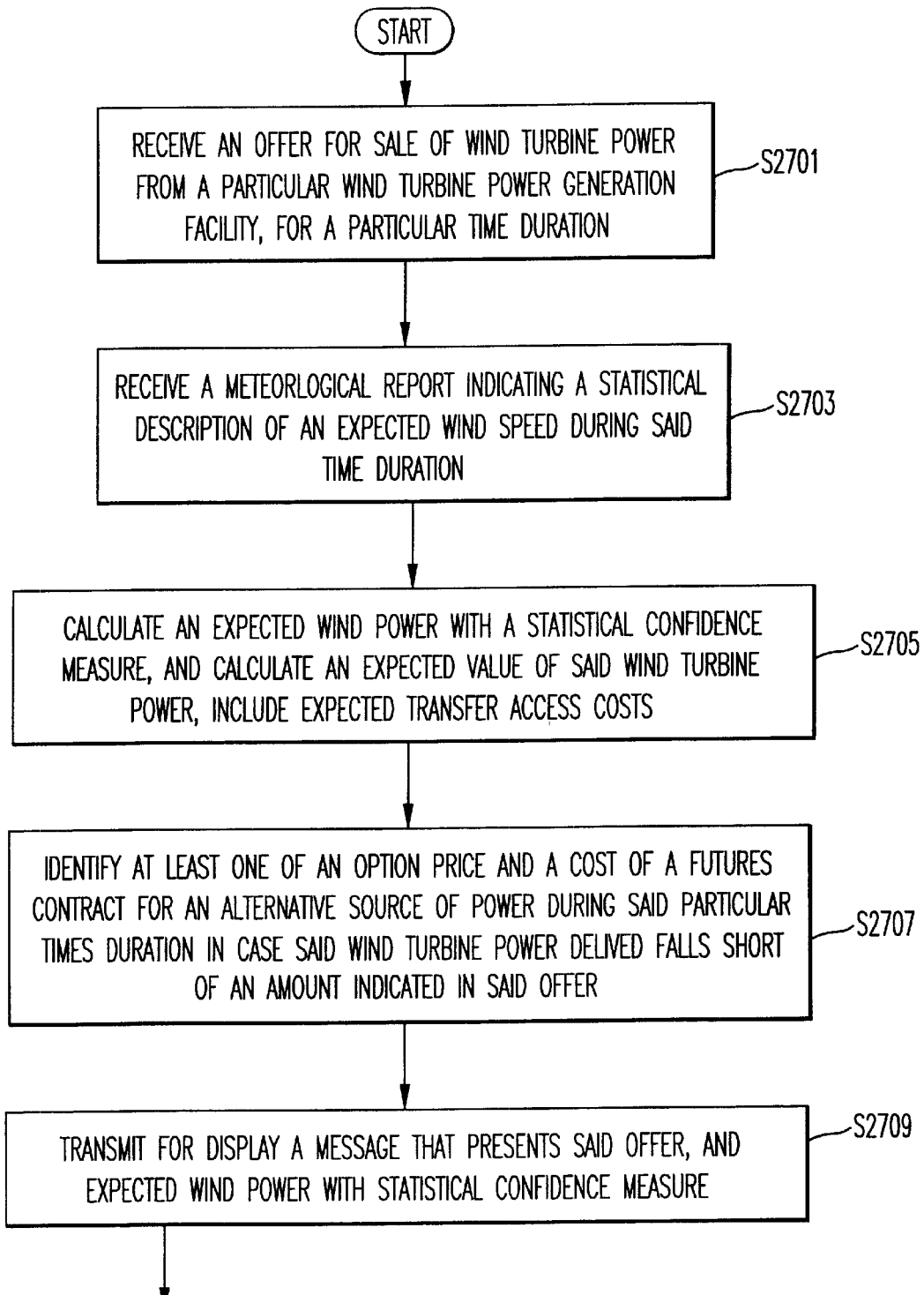
FIG. 27 is a flow chart showing steps employed for initiating and maintaining a renewable exchange according to the present invention.
Figure 27B:
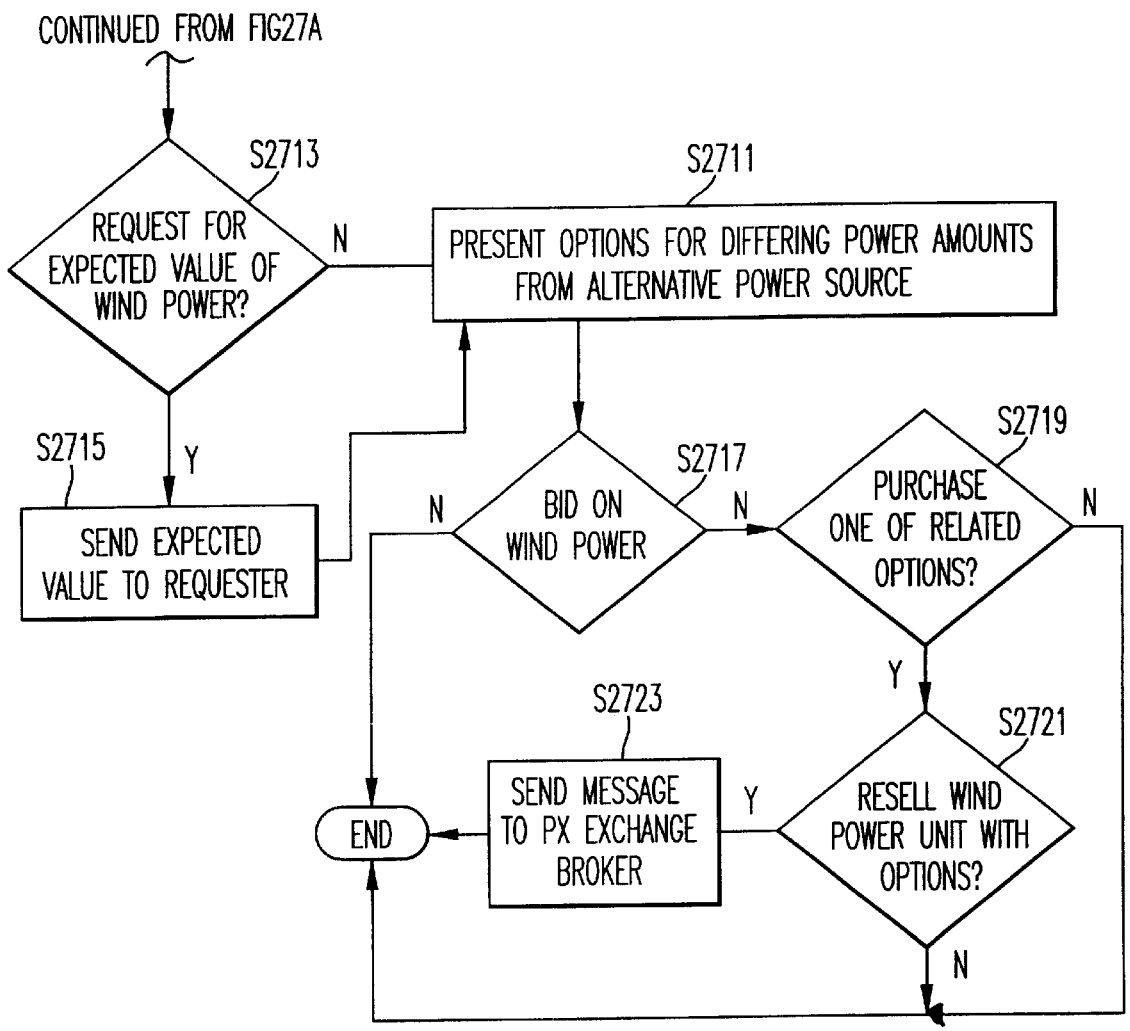

FIG. 27 is a flowchart describing a process for initiating and operating a renewable exchange. The process begins in steps S2701 where an offer for sale of wind turbine generated electric power is received from a particular wind turbine electric power generation facility. The offer of sale includes a particular time duration as well as an amount of power. The process proceeds to step S2701 where a meteorological report is prepared from meteorological sensor data and meteorological forecasting data. The report enables the prediction of a statistical description of the likelihood of actually delivering the expected wind power unit during the time duration. The process then proceeds to step S2705 where an estimated amount of electrical power generated from the wind speed is calculated with a particular statistical confidence measure. Also, an expected value of the wind turbine power is calculated based on the confidence measure. Furthermore, an expected transfer access fee is also identified so as to provide a basis set of fees and expected values for delivering a unit of power to the power grid.

In step S2707, either the option price or a cost of a futures contract for an alternative source of power is identified during the particular times when the wind power is to be delivered to the grid. The option price and the futures contract are identified in case the wind turbine is not driven with sufficient speed so as to create the wind power needed to provide the unit of power originally obligated. The process then proceeds to step S2709 where a message is transmitted for display to an operator that presents the offer and expected wind power unit with the statistical confidence measure in the renewable exchange forum, which in the present embodiment is a website, although it should be recognized that other forums may be used as well, including a secure network of computers linked to one another with a defined protocol for exchanging bid and ask prices on units of power. After step S2709, the process proceeds to step S2713 where an inquiry is made regarding whether there has been a request for the expected value of wind power. If the response to the inquiry in step S2713 is affirmative, the process proceeds to step S2715 where the expected value is sent to the requester and then the process proceeds to step S2711, which is the same step that would be performed if the response to the inquiry in step S2713 is negative.

In step S2711 options for different amounts of power from alternative power sources are presented for purchase. The process then proceeds to step S2717 where an inquiry is made regarding whether a bid has been made on the wind power unit. If the response is negative, the process ends. On the other hand, if the response to the inquiry in step S2717 is affirmative, the process proceeds to step S2719 where another inquiry is made regarding whether there has been a purchase of one of related options. If the response to the inquiry is negative, the process ends. On the other hand, if the response to the inquiry in step S2719 is affirmative, the process proceeds to step S2721 where another inquiry is made regarding whether the operator wishes to resell the wind power unit with an option associated therewith. If the response to the inquiry is negative, the process ends. On the other hand if the response to the inquiry in step S2721 is affirmative, the process proceeds to step S2723 where a message is sent to the power exchange broker indicating that there is a guaranteed power unit including both wind generated power backed-up by power from an alternative energy production facility.

Figure 28A:
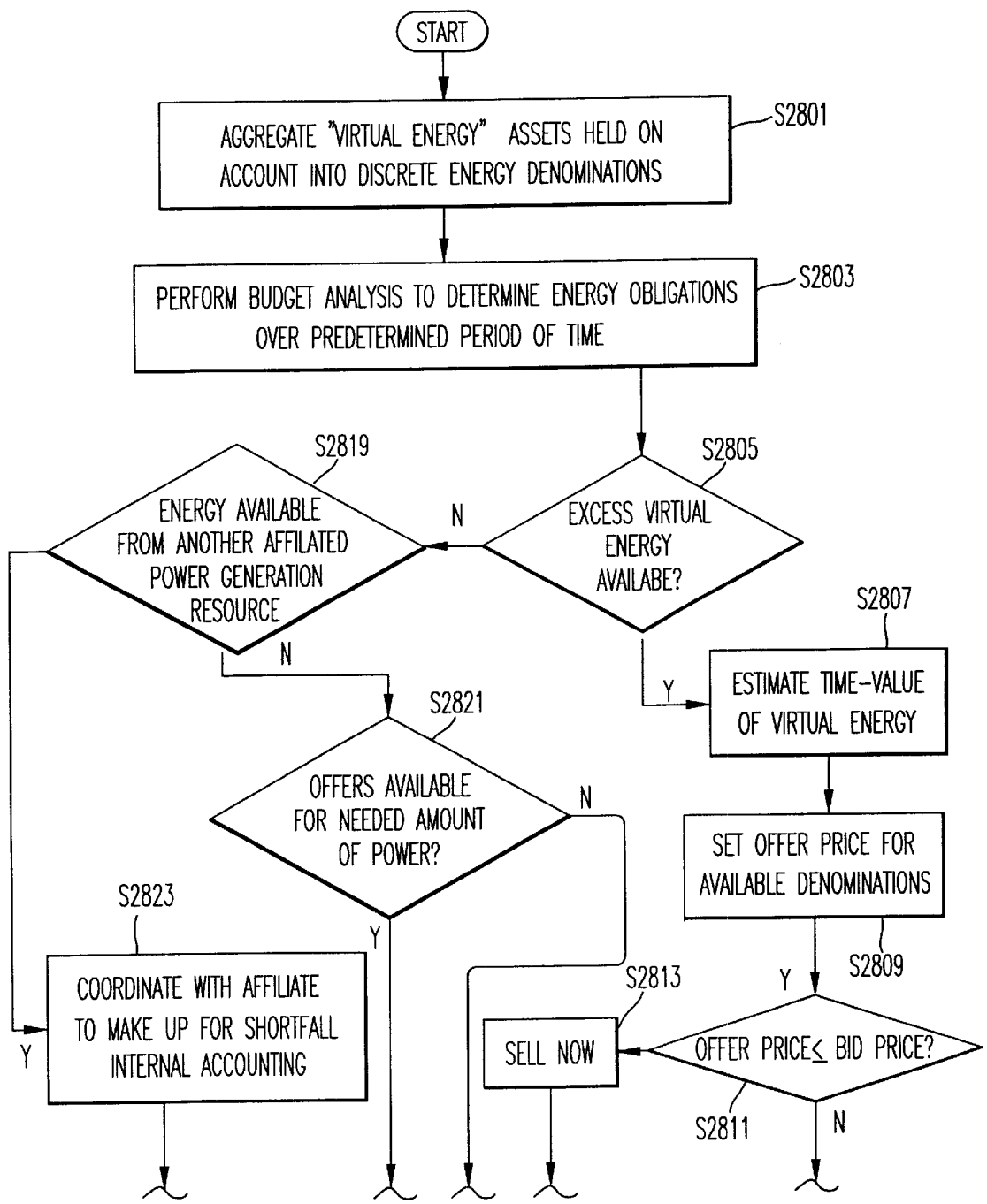
FIG. 28 is a flow chart showing how to pool assets together to create a fungible "energy currency" that employs virtual energy storage according to the present invention.
Figure 28B:
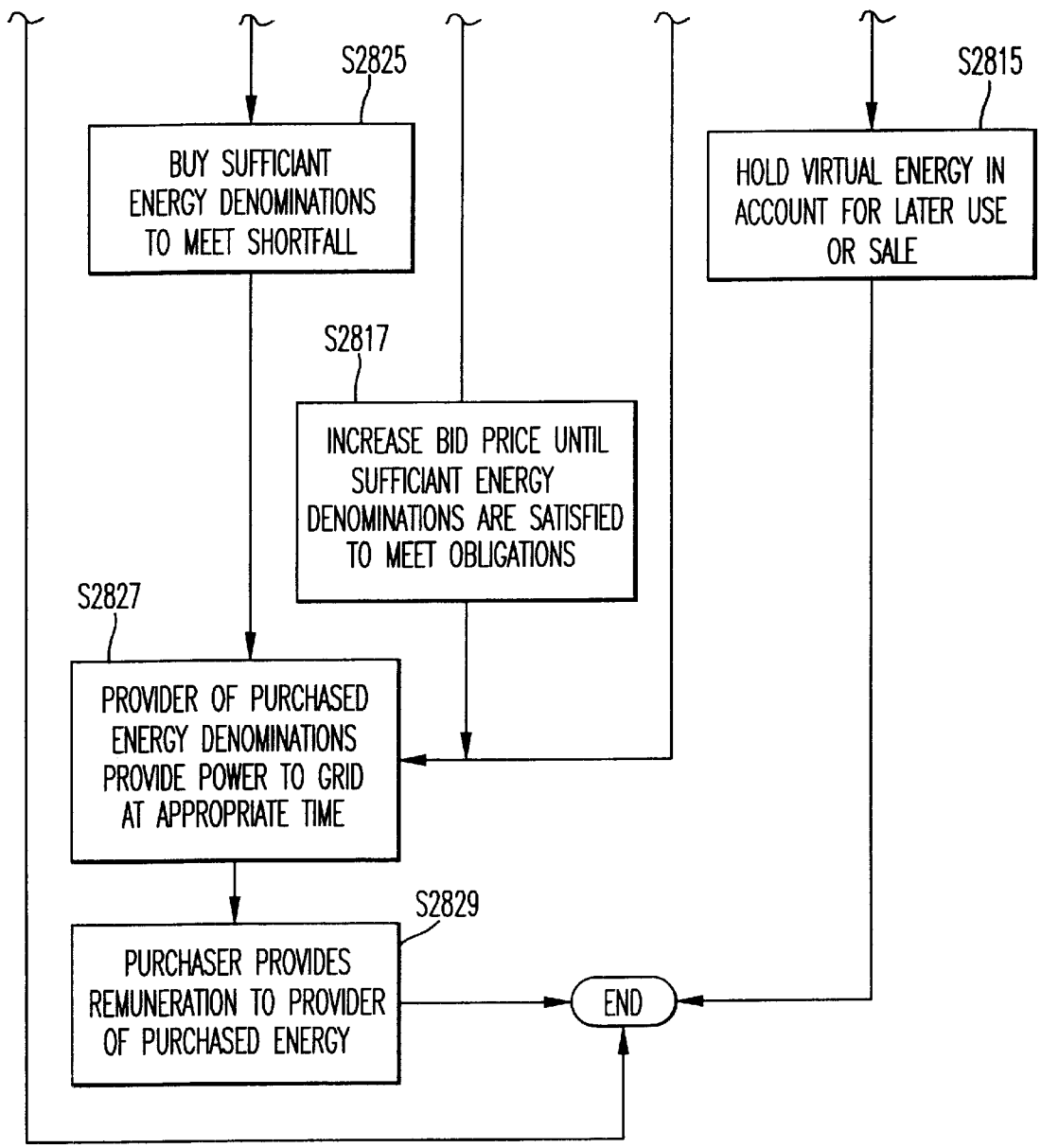

FIG. 28 is a flowchart that describes how various power resources and investment funds may be aggregated through the use of communication links and through a trading exchange according to the present invention. The process begins in step S2801 where "virtual energy" storage assets are aggregated with one another in an account so as to form discrete energy denominations. The process then proceeds to step S2803 where a budget analysis is performed to determine energy obligations over a predetermined period of time for a particular energy provider for the power grid. The process then proceeds to step S2805 where an inquiry is made regarding whether there is an excess of virtual energy available at a predetermined period of time. If the response to the inquiry in step S2805 is affirmative, the process proceeds to step S2807 where an estimate of the time value of the virtual energy is made. The process then proceeds to step S2809 where an offer price is set for available denominations and then in the inquiry in step S2811, it is determined whether the offer price is less than or equal to the bid price. If the response to the inquiry is negative, the process proceeds to step S2815 where the virtual energy is held in account for later use or sold at a later time. On the other hand, if the offer price is less than or equal to the bid price, a determination is made in step S2813 to sell the denomination of power at this time and the process proceeds to step S2827 where the provider of the purchased energy denomination provides power to the grid at the appropriate time and then in step S2829 the purchaser provides remuneration to the provider of the purchased energy before the process ends.

Figure 29:
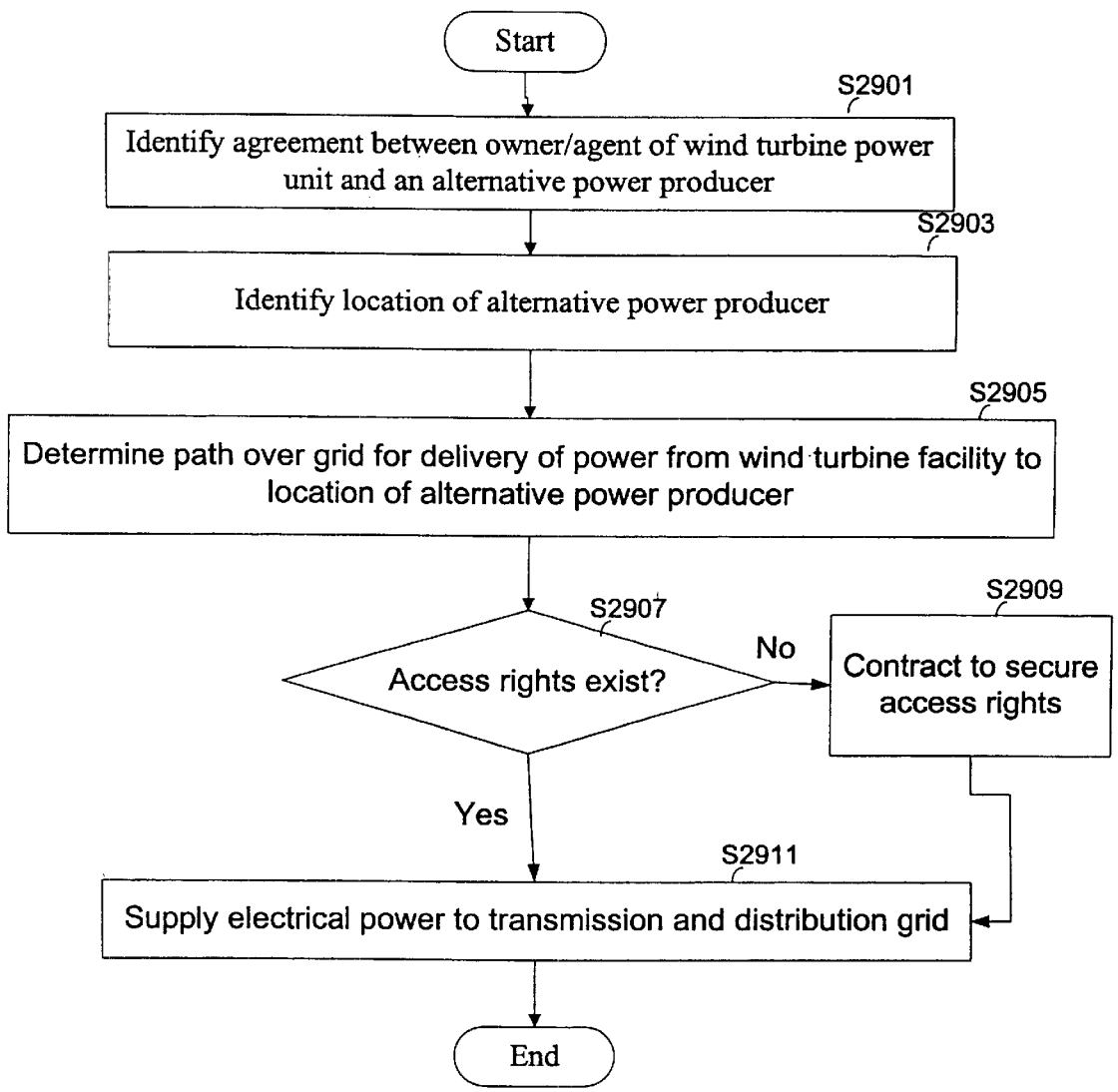
FIG. 29 is a flow chart showing steps for creating and determining whether access rights are provided for providing electrical power between a virtual energy storage location and a wind power production facility.

On the other hand, if the inquiry in step S2805 is negative, the process proceeds to step S2819 where an inquiry is made regarding whether the energy that is available for another affiliated power generation resource exists. If the response is affirmative, a message coordination is made with the affiliate so as to make up for the shortfall using internal accounting measures and then the process ends. On the other hand if the response to the inquiry in step S2819 is negative, the process proceeds to step S2821 where another inquiry is made regarding whether offers are available for a needed amount of power. If the response to the inquiry in step S2821 indicates that there is an offer available for the needed amount of power, the process proceeds to step S2825 where the sufficient amount of energy in the predetermined amount of denominations is purchased so as to meet the shortfall. The process then proceeds to step S2827 and subsequently S2829, which were previously discussed. However, if the response to the inquiry in step S2821 is negative, the process proceeds to step S2817 where an increase in the bid is made until sufficient energy denominations are satisfied to meet the obligations. Subsequently, the process proceeds to steps S2827 and S2829 as previously discussed before the process ends. FIG. 29 is a flowchart describing a process for obtaining transfer assets which may be needed to coordinate energy "substitution" operations with a virtual energy storage unit and a wind turbine electrical power production facility. The process begins in step S2901 where an agreement is identified between an owner or agent of a wind turbine power facility and an alternative power producer. After the agreement is made, the process proceeds to step S2903 where the location of the alternative power producer is identified. The process then proceeds to step S2905 where a physical path over a grid (perhaps including a distribution or collection grid) is identified, for delivery of power from the wind turbine facility to the location of the alternative power producer, or vice versa. Subsequently the process proceeds to step S2907 where an inquiry is made regarding whether access rights exist for the transfer of power across those facilities. If the response to the inquiry in step S2907 is affirmative, the process proceeds to step S2911 where the electrical power is supplied to the transmission and distribution grid before the process ends. However, if the response to the inquiry in step S2907 is negative, the process proceeds to step S2909 where a contract is let so as to secure access rights before the power is passed over the necessary path portion of the grid before continuing to step S2911 and concluding the process.

Figure 30:
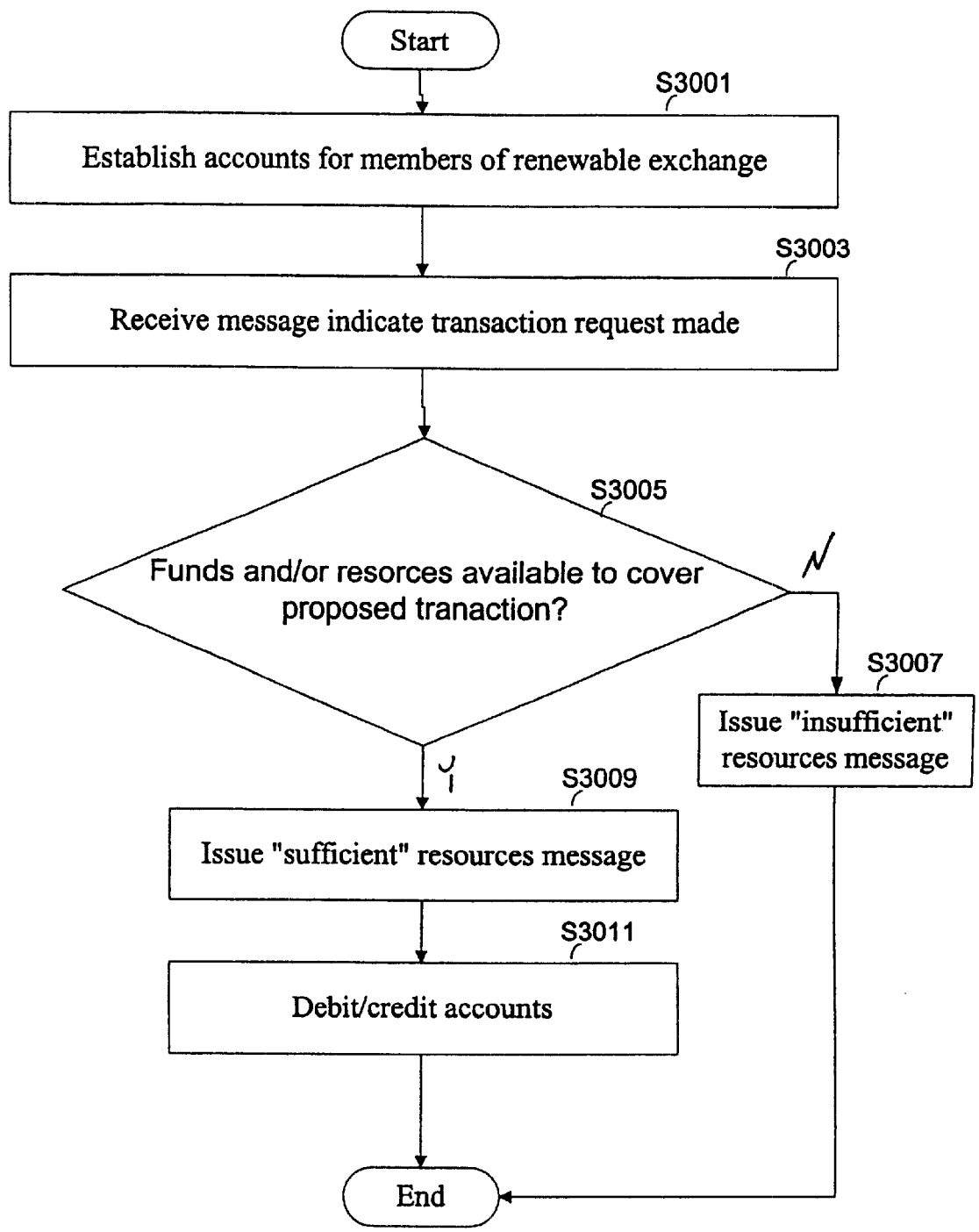
FIG. 30 is a flow chart for showing how a renewable exchange according to the present invention provides guarantees that there are sufficient resources available for providing guaranteed renewable energy contracts.

FIG. 30 is a flowchart that describes whether, in the context of a virtual forum for implementing the renewables exchange, sufficient funds are available for authenticating whether transactions may be financially backed or not. The process begins in step S3001 where accounts are established for different members of the renewable exchange. The process then proceeds to step S3003 where a message is received indicating that a transaction request has been made by one of the market participants in the renewables exchange. The process then proceeds to an inquiry in step S3005 requesting whether there are sufficient funds and/or resources available to cover the proposed transaction. If the response to the inquiry in step S3007 is negative, a message is issued to the requester indicating that there are insufficient resources to transact the deal. On the other hand if the response to the inquiry in step S3005 is affirmative, a message indicating that sufficient resources exist and in step S3011 the transacting parties have their respective accounts debited or credited depending on whether they are a buyer or a seller of the particular power unit.

Figure 31:
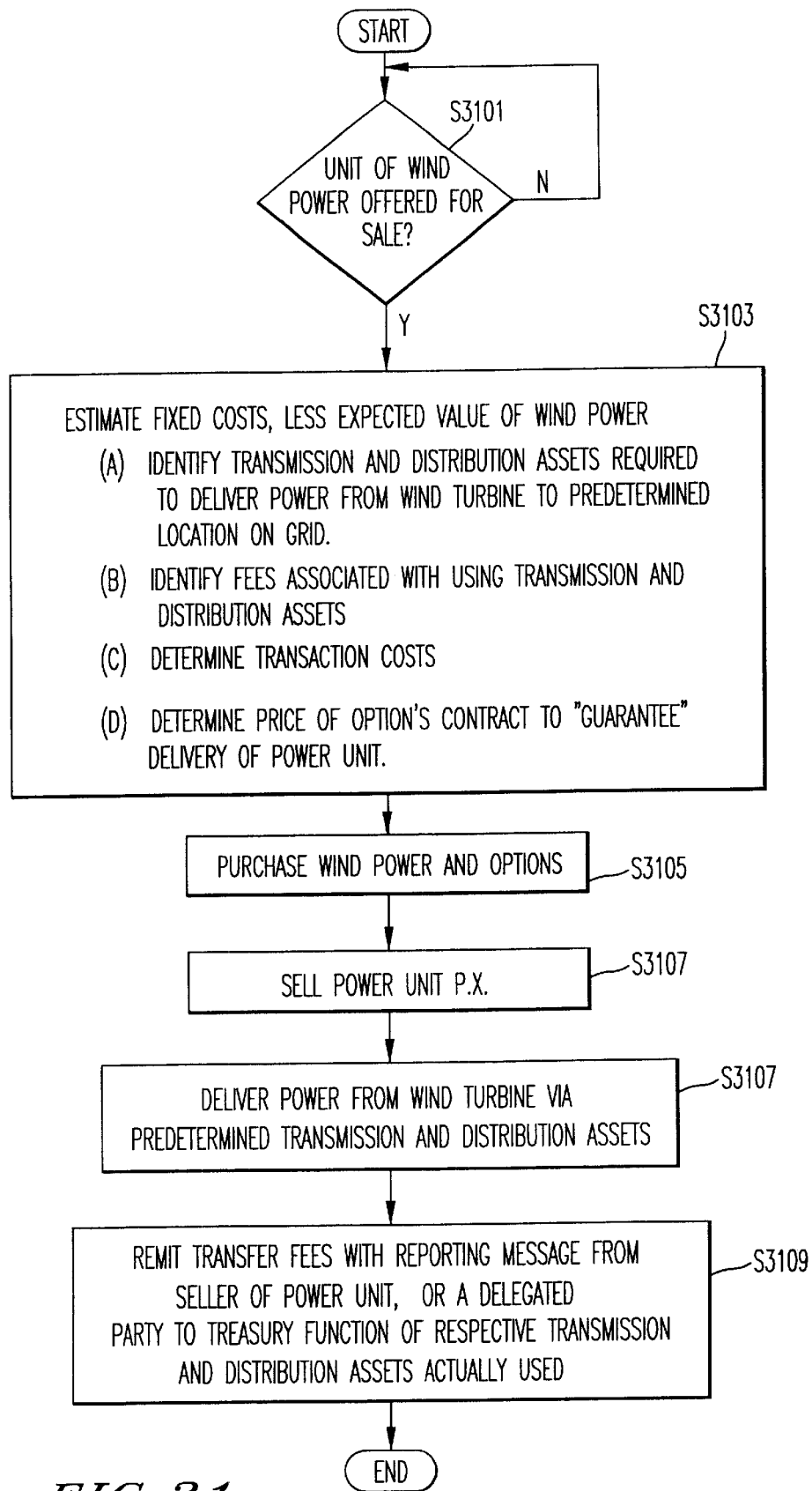
FIG. 31 is a method for showing how costs are tracked according to the present invention.

FIG. 31 is a flowchart describing a method for tracking costs for parties who participate in a renewable exchange or use a virtual energy storage facility to supplement the output electric power from a wind turbine electric power production facility. The process begins in step S3101 where an inquiry is made regarding whether the unit of wind power is being offered for sale. If the response to the inquiry is negative, the process returns. On the other hand if the response to the inquiry is affirmative, the process proceeds to step S3103 where an estimate is made whether the fixed costs is less the expected value of the wind power. Steps in this process include identifying the transmission and distribution assets required to deliver power from the wind turbine electrical power production facility to predetermined locations on the grid. Also included are the identification of fees associated with using the transmission and distribution assets, as well as determining transaction costs. Furthermore, a determination is made regarding the price of an options contract to "guarantee" the delivery of the power unit, recognizing that the reliability of delivering power unit from a wind turbine based system is based on a stochastic process.

After the costs are estimated in step S3103, the process proceeds to step S3105 where a particular wind power unit is purchased along with an option so as to guarantee the adequacy of the power provided by the unit of power that is based at least in part on the wind turbine power production facility. The process then proceeds to step S3107 where the unit of power is sold on the power exchange as a guaranteed unit, such as that which is offered by way of a fossil fuel electrical power production facility. The process then proceeds to step S3107 where the power is delivered from the wind turbine via predetermined transmission and distribution assets. Subsequently, in step S3109 the transfer fees are remitted with a reporting message from the seller of the power unit or a delegated power to a treasury function of the respective transmission and distribution assets that were actually used. Subsequently the process ends.

Figure 32:
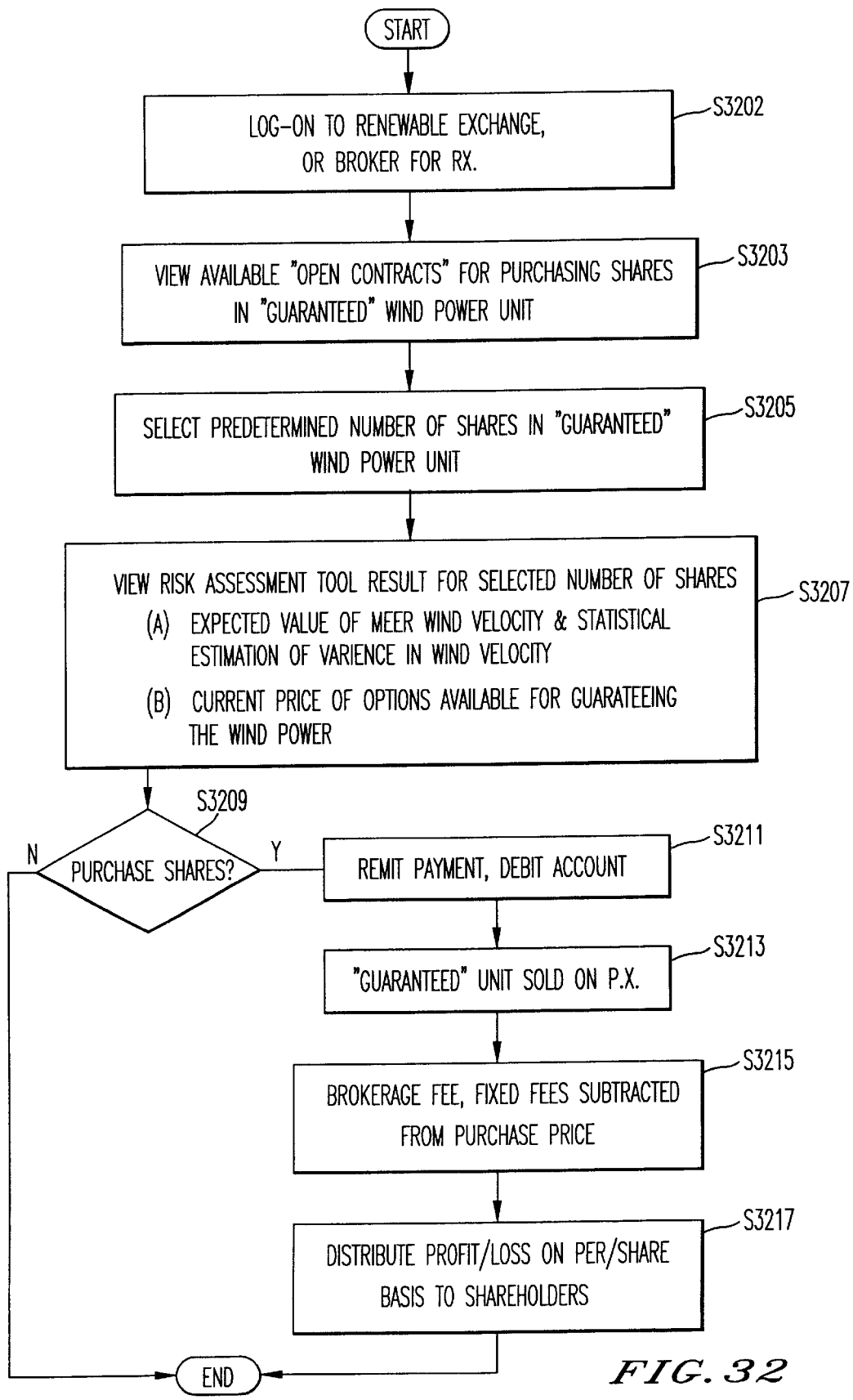
FIG. 32 is a flow chart showing how a method for investing is performed according to the present invention.

FIG. 32 is a flowchart describing a method for investing for multiple people in power units that include at least a predetermined amount of power produced from a wind turbine electric power production facility. The process begins in step S3202 where the investor logs onto a renewable exchange or perhaps a broker for the investor logs onto the renewable exchange. The process then begins to step S3203 where the investor/broker is able to view "open contracts" for purchasing shares and "guaranteed" wind power units. The process then proceeds to step S3205 which enables the investor/broker to select a predetermined number of shares in the "guaranteed" wind power units. Each share covers only a fraction of ownership for a group (one or more) guaranteed wind power units. Subsequently the process proceeds to step S3207 where the investor/broker is able to view and use a risk assessment tool that helps assess the financial risk associated with investing a selected number of shares. The tools provide an expected value of the wind power produced electricity and statistical estimation of the fluctuations therein for that predetermined period of time. Meteorological data in the present document should be interpreted herein to include the predicted wind power produced electricity. It should also be understood that the sensor data, and or partially analyzed meteorological data may be used in other processor-based methods and systems according to the present invention to provide the corresponding prediction of the amount of wind power produced electricity. Furthermore, the tool provides a current price of the options available for guaranteeing the wind power. Based on this estimated risk, the investor/broker is able to make a reasonable determination as to whether the value of the wind power unit is believed to be warranted in view of the expected cost and the likelihood of delivery of that particular wind power unit.

The tools for forecasting wind speed (or another energy source, such as ocean current) employ Multivariate data analysis, and/or neural networks and/or Fuzzy Control methods and mechanisms.

After assessing the risks associated with purchasing the wind power unit, the process proceeds to step S3209 where an inquiry is made regarding whether shares were actually purchased. If the response to the inquiry is negative, the process ends. However if the response to the inquiry in step S3209 is affirmative, the process proceeds to step S3211 where the investor/broker remits a payment and the investor's/broker's account is subsequently debited. The process then proceeds to step S3213 where the unit of power which is now "guaranteed" by way of an option for purchasing power sold on the power exchange. The process then proceeds to step S3215 where brokerage fees and fixed fees are subtracted from the purchase price and then in step S3217 the profit or loss is distributed on a per share basis to the respective shareholders and subsequently the process ends.

Figure 33:
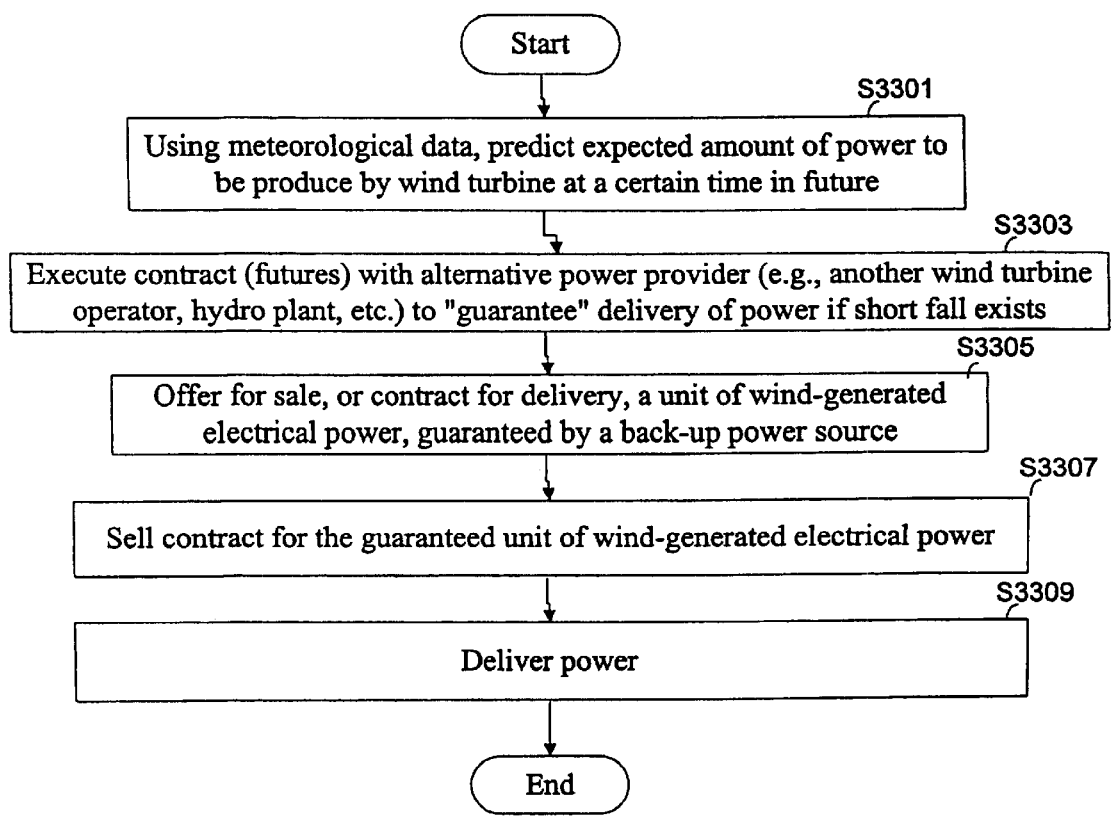
FIG. 33 is a flow chart showing how meteorological data is employed so as to assist in coordinating activities between a wind power production facility and a virtual energy storage facility.

FIG. 33 is a flowchart showing how meteorological data may be used to help determine the process for "guaranteeing" units of power that include electrical power produced from a wind turbine facility. While the present document refers to both a wind turbine facility and a wind farm, the invention applies to both circumstances. Furthermore the terminology used in the present document generally uses both terms interchangeably, especially when referring to power produced from a wind-based power production facility since the power may be from a single wind turbine unit or a plurality of wind turbine units. Thus it should be understood that the electrical power produced may be from one or more wind turbines even if the text refers to a wind turbine facility. The process begins in step S3301 where meteorological data is used to predict an expected amount of power to be produced by a wind turbine at a certain time in the future. The process then proceeds to step S3303 where a futures contract is executed with an alternative power provider such as another wind turbine operator or hydroplant operator or the like so as to "guarantee" the delivery of the electrical power unit if a shortfall exists at the wind turbine power production facility. The process then proceeds to step S3305 where a unit of wind-generated electric power, as guaranteed by a back-up power resource is offered for sale or under a delivery contract made available for sale at a future time. The process then proceeds to step S3307 where the contract for the guaranteed unit of wind-generated electric power is sold to a purchaser, and then in step S3309 the sold power is actually delivered to the grid as requested in the quantity and power as defined by the particular unit of power sold. Subsequently the process ends.

Figure 34:
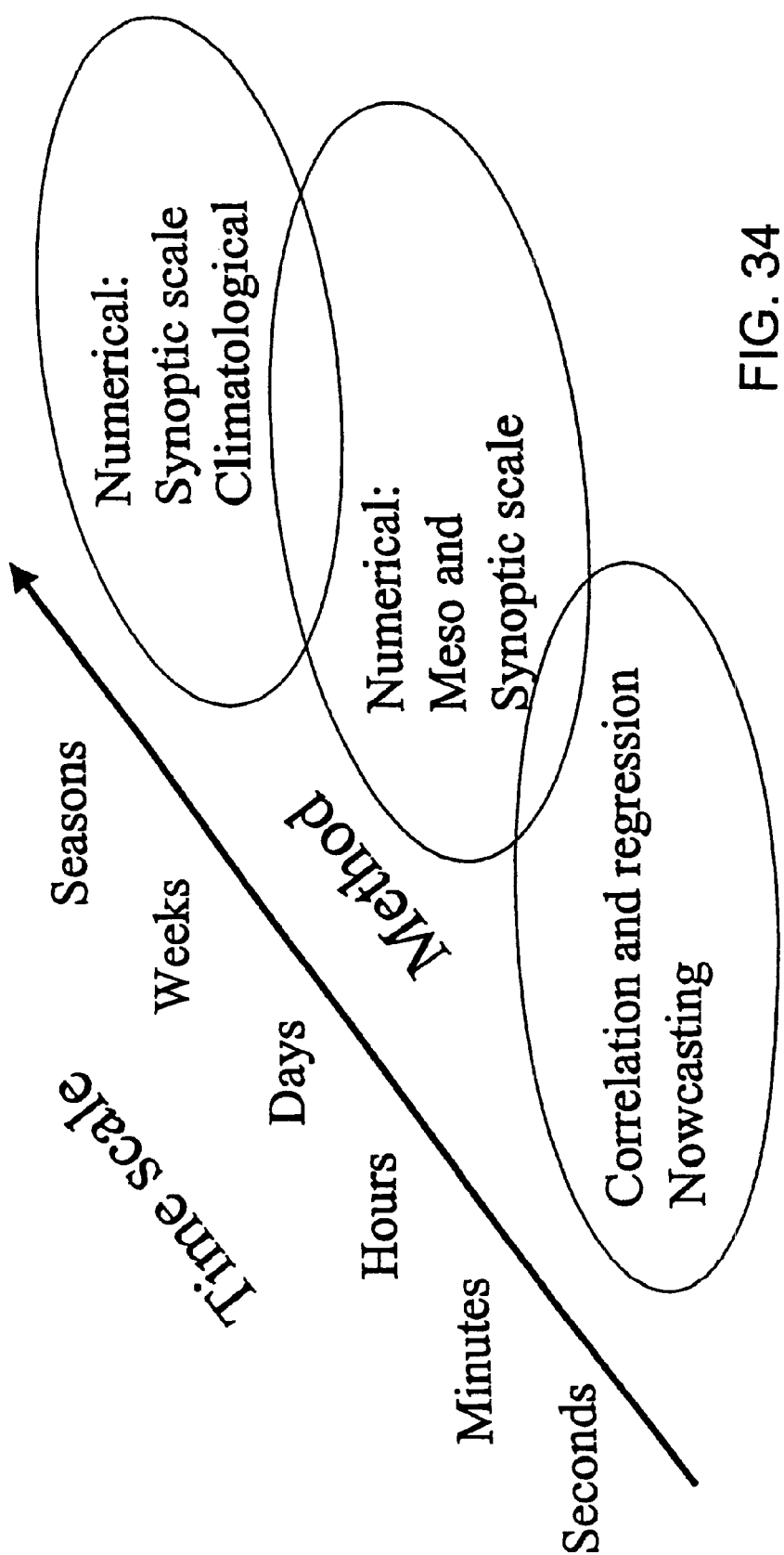
FIG. 34 is a block diagram showing how forecasting technology is used to improve coordination between a wind power generation facility and a virtual energy storage facility according to the present invention.

FIG. 34 is a graph showing appropriate types of weather prediction and wind forecasting methodology employed according to the present invention based on the time interval for which the wind power prediction is to be done. As previously discussed, the pricing and planning for providing "premier" power according to the present invention uses meteorological data to provide a statistical indication (see, e.g., the message format of FIG. 12) regarding the likelihood of the wind turbine power production facility actually delivering the predefined unit of power. As shown in FIG. 34, for intervals on the order of seconds, minutes, and fractions of an hour wind predictions may be based on the output of near term correlation and regression in combination with nowcasting weather prediction techniques. Near by standard meteorological observation stations output are, according to the present invention, profitably combined with wind measurement/measurements at the turbines in the wind farm for which a wind power prediction is to be done. Techniques for nowcasting and wind correlation and regression are described for example in Browning, K. A., "Now Casting", Academic Press, London, 1982, ISBN 0-12-137760-1, and in Brown, Katz, and Murphy, Journal of Climate and Applied Meteorology, Vol. 23, No. 8, pp. 1184–95, the entire contents of which being incorporated herein by reference. From the perspective of renewable power plant operators, the meteorological predictions for short terms are used to estimate an amount of AC power that a particular set of wind turbines will provide to the AC power grid. When sufficient investment funds are combined in a renewable energy portfolio investment instrument, it is possible to predict a return on investment to be expected by harnessing wind energy in relatively short time intervals.

For longer term predictions, on the order of hours, days and up to a week in advance numerical prediction and dynamic meteorology techniques as well as meso-scale meteorological modeling forms the basis for extraction of wind data for wind power prediction. A typical prediction length of 5 days may limit this range, corresponding to a typical lifetime of a mid-latitude atmospheric motion system. These techniques are described e.g. in Haltiner, G., "Numerical Prediction and Dynamic Meteorology", sec. ed., John Wiley & Sons, as well as Pielke, R., "Mesoscale Meteorological Modeling", Harcourt Brace Jovanovich, Academic Press, 1984, the entire contents of which being incorporated herein by reference. Wind prediction output from these modeling techniques may be used for something other than the spot-type trading which is more appropriate for regression or nowcasting or even dynamic ganged control between a wind power facility and a hydroelectric plant for example. By having this mid-term meteorological forecast data regarding expected wind energy, actors who participate in a power exchange are able to predict with some degree of accuracy the level of risk/reward that the actor is engaged in when entering bilateral transactions for "power units," (i.e., specific amounts of energy that are traded, purchased, sold, stored etc. as a power unit).

Even longer term prediction includes also synoptic scale numerical prediction and climatological statistical analysis performed on the order of weeks or even seasons. Such modeling prediction services are available from e.g. the European Center for Medium-Range Weather Forecast (ECMWF), the National Weather Service operated by NOAA in USA, and similar national and international organizations. Having this meteorological data enables operators of renewable energy resources to handle the power produced therefrom in a more fungible way that in the past. For example, renewable operators, based on the meteorological forecast, may opt to sell units of energy in advance by borrowing the energy asset from the virtual energy storage facility during the week, and then reliably "replenish" the energy supply over the weekend when low-load periods are routinely observed.

Figure 35:
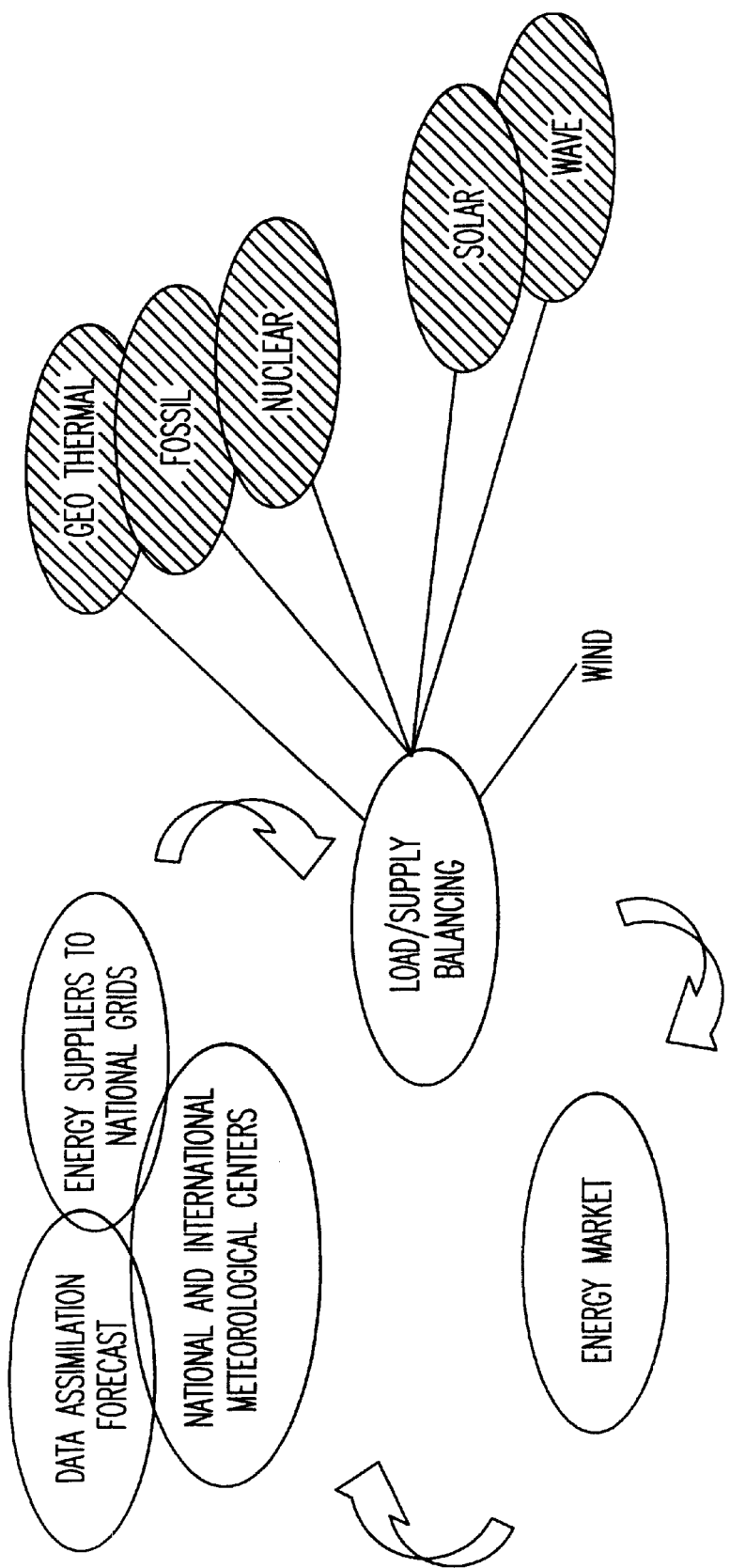
FIGS. 35–36 are block diagrams showing how wind forecasting techniques is used to enhance the commercial value of electric power produced by a wind power facility according to the present invention.

FIG. 35 is a block diagram explaining how according to the present invention a chain of interactions between the energy suppliers, the actor performing load/supply balancing, the energy market, and meteorological information, here represented by, but not limited to the wind predictions done by the national weather services, can be set up to enhance the commercial value of electric power produced by e.g. wind energy technology. The method that is presently described to enhance the commercial value of electric power produced by wind energy may equally well be used to enhance the value of other renewable energy sources with variable characteristic such as e.g. solar and wave. By linking the load/balancing supply with wind prediction operations and wind power forecasting techniques estimates and business-level cost analyses may be performed when pricing the different units of electrical power generated from renewable sources, e.g. wind, that are sold in the energy market.

Figure 36:
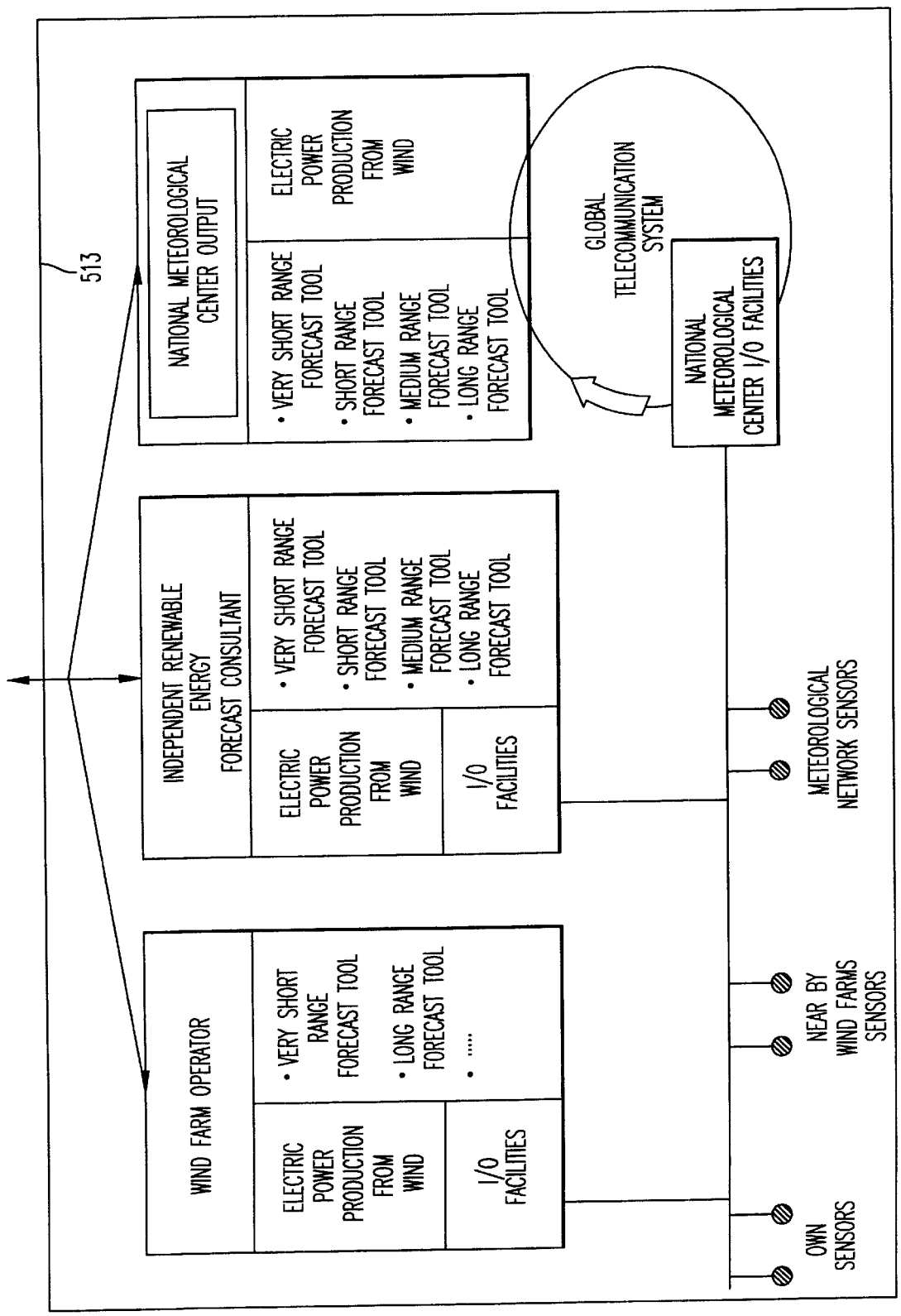

FIG. 36 is a block diagram that shows how the renewable energy control center processor 500 shown in FIG. 5 may receive meteorological data services, 513 in FIG. 5. Wind sensors at a wind farm are connected to the wind farm operator's processor system through an I/O bus, as shown. Near-by located sensors at other farms are equally connected to the operator's processor system. I/O links are through the bus established with independent renewable energy forecast consultant's systems as well as with the system outputs from National Meteorological Centers. The wind farm operator's processor system may include, but is not be limited to, wind prediction forecasting tools for the very short range and for the long range. For very short-term forecasts, on the order of seconds to minutes (such as two minutes which should provide sufficient reaction time for a virtual energy storage facility or other energy source to act in response to a request for output production increase or decrease in the case of a wind gust or lull), methods based on statistical analysis of a time series from nearby located wind sensors may be used, in combination with known probability distributions of the wind itself. These distributions and their characteristics are known at many sites and are obtained in real time and updated while a wind farm is operated. Presently used wind energy siting tools in combination with statistical regression and correlation methods are used by the inventive system to predict the wind. This data may be complimented by atmospheric boundary layer parameterization schemes as stand alone or as integrated into numerical wind energy siting tools so as to provide profiles of wind data over the disk of the wind turbine or the disks of the turbines in a wind farm. Available wind generated electric power is extracted from predicted wind by integrating over the area or volume swept by turbines. The data is also processed to include effects of nearby wind turbine wakes. Multi Variate Data Analysis (MVDA) techniques and/or Neural Network methods may here be used to continuously improve the predictive skill. Long range forecasts are here calculated by statistical methods using previously measured and collected data. This data may be from local sensors in combination with climatological data received from the National Meteorological Center. Wind power predictions by the processor system are transferred to the renewable energy control center processor 500 in FIG. 5.

The renewable energy control center processor 500 shown in FIG. 5 may also receive meteorological data services from an I/O link established with the output systems at a National Meteorological Center. The meteorological center receives meteorological data through its links to global telecommunication systems used by the World Meteorological Organization for transfer of raw and refined meteorological data between its member states. Data links are established to meteorological sensors at wind farms either directly or through the I/O buses of the wind farm processor systems. Very short-term and long-term forecasts of available wind power may be calculated by the meteorological center using methods as described above. For short-term forecasting, intervals of minutes to an hour, the prediction is based on nowcasting techniques possibly in combination with statistical methods. Nowcasting here refers to methods for objectively analyzing observed meteorological data covering a restricted geographical area (i.e., meso-scale area). Observations techniques may include but not be limited to radar, satellite, balloon or ground-based sensors or other suitable methods.

The objective analysis tools include available meteorological numerical analysis tools in combination with wind energy siting tools. Preferable output of the numerical nowcasting tools is a three-dimensional time series of data at intervals of minutes. Predictions of available wind power is obtained from this data by trend fitting using data from the geographic upwind area, data from several time intervals, as well as combined with the influence of the local characteristics as described by atmospheric boundary layer physics. Electric power production is calculated from predicted wind speed and direction as described above including effects of wakes from nearby turbines. Predictive skill may be enhanced by combining observational data and measured electric power output through MVDA or Neural Network and Fuzzy Logic methodologies. For medium range forecasts on the order of hours to days, the methods are based on post-processing output from meteorological synoptic and meso-scale numerical forecast models. Methods include a combination of discrete output data on wind speed and direction from numerical forecast models combined with meso-scale objective analysis tools. This is performed by national meteorological centers as part of their operations. The three-dimensional time series output of these numerical models may be post-processed as described above to include wake effects of nearby turbines to obtain available wind power at a site, including consideration of wake effects of nearby turbines. For long range forecasts, a week or longer, for example, statistics on wind speed and direction are used to produce probabilities of available wind power for a given geographic area. Statistics are based on data from the meteorological observation network and sensors mounted on wind turbines. This data may be combined with past numerical forecasting results to fill gaps in the observation network.

The renewable energy control center processor 500 shown in FIG. 5 may also receive meteorological data services through an I/O link established with the output systems of processors operated by a renewable energy forecasting consultant. The consultant agency may be independent or formed as an alliance between e.g. wind farm operators and national meteorological centers. The renewable energy forecasting consultant processor system may include calculation tools and methods as described above for forecasting over very short to long range.

The control processor 500 in FIG. 5 may hold a database that is set up to be automatically populated by wind power prediction information transferred from the meteorological data services 513 in FIG. 5 (corresponding to the diagram in FIG. 36).

Each of the actors providing meteorological data services 513 in FIG. 5 may also provide input to the renewal power exchange 507 so that traders and investors may make informed decisions regarding the likelihood of a wind turbine facility actually being able to deliver the required power levels with a certain degree of probability. Based on the statistical indicators associated with the likely delivery of those power levels, the investor may choose to execute more expensive or least costly options for guaranteeing the delivery of the wind power units for sale as premier power.

As opposed to conventional systems and methods, selected features of the present invention that characterize aspects of the invention include the following:

There is a commerce-based entity like a power exchange to deal with wind power as "green power" with a distinguished value.

There is an identity associated with the wind power-based units of electrical power transferred from a predetermined number of wind farms to other power grid facilities, like consumers or energy storage units or the like, thus identifying wind power as "green power" with a distinguished value.

There is an economic-based mechanism, such as a data processing system for managing a financial services configuration of a portfolio established as a partnership between stakeholders.

There is a method and mechanism for prognosticating the wind energy output, based on meteorological forecasting and data analysis techniques as well as improving the forecast with signals from local sensors not only to deal with wind power as "green power" with a distinguished value but enabling "green power" to become equally commercially competitive with other power sources at this time.

There is one connection (preferably), "the co-active converter", from "a predetermined number of wind farms", via a C&T grid" to "the power grid."

Obviously, numerous modifications and variations of the present invention are possible in light of the above teachings. From the above description, it will be apparent that the invention disclosed herein provides novel and advantageous methods and mechanisms to operate and control wind turbines, wind farms and their co-operation with the electrical power grid and its stakeholders aiming at long-term business operations. For example, some aspects of the priming procedure can be performed in various ways equivalent to those disclosed herein, including transmission, upon a direct request between two stakeholders, i.e., outside the power exchange, point-to-point, of wind power-based units of electrical power to a storage facility that may be embodied as so called "pumped hydro" or other energy storage facilities. Similar priming procedures can be performed on other renewables, such as solar electric power where hydro might be accompanied or substituted by gases that hold energy. Those gases might be not only a simple source, such as air, which is compressed but also a more complicated source like hydrogen which is produced by hydrolysis from temporarily available surplus electrical power and which is burned in a gas turbine used as a prime mover, all to stay within "renewables" regime. LNG, liquid natural gas, is of course a strategic option to complement "renewables" to form another type of "hybrid," but still with fairly low environmental impact due to its low carbon content, or more precise low $CO_2$ per kWh. It is therefore to be understood that within the scope of the appended claims, the invention may be practiced otherwise than as specifically described herein.

What is clamed as new and desired to be secured by Letters Patent of the United States is:

1. A method for managing an investment portfolio of premier power units, comprising steps of:
   receiving contributions in various amounts from respective investors;
   assigning shares to said investors based on respective contributions made by the respective investors;
   purchasing a portfolio of premier power units with the contributions; and
   receiving payment for delivery of respective of said premier power units, wherein said contributions being at least one of money and potential energy.

2. The method of claim 1, further comprising a step of allocating fund assets in increments after respective of said premier power units are sold.

3. The method of claim 1, further comprising a step of receiving meteorological data to assist in determining which premier power units to purchase as part of said portfolio.

4. A system for managing an investment portfolio of premier power units, comprising:
   means for receiving contributions in various amounts from respective investors;
   means for assigning shares to said investors based on respective contributions made by the respective investors;
   means for purchasing a portfolio of premier power units with the contributions; and
   means for receiving payment for delivery of respective of said premier power units, wherein respective of said contributions having a monetary value.

5. A computer-based method for managing an investment portfolio of renewable power production facilities, comprising steps of:
   receiving contributions in various amounts from respective investors;
   assigning shares to said investors based on respective contributions made by the respective investors;
   financing a purchase of a predetermined number of renewable power production facilities with said contributions;
   receiving a plurality of payments for delivery of premier power units from said predetermined number of renewable power production facilities; and
   apportioning said plurality of payments among said shares, wherein said contribution having a monetary value.

* * * * *